(12) United States Patent
Marie et al.

(10) Patent No.: US 12,493,755 B2
(45) Date of Patent: Dec. 9, 2025

(54) METHOD FOR TRAINING MACHINE TRANSLATION MODEL FOR GENERATING PSEUDO PARALLEL TRANSLATION DATA, METHOD FOR OBTAINING PSEUDO PARALLEL TRANSLATION DATA, AND METHOD FOR TRAINING MACHINE TRANSLATION MODEL

(71) Applicant: National Institute of Information and Communications Technology, Koganei (JP)

(72) Inventors: Benjamin Marie, Koganei (JP); Atsushi Fujita, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 316 days.

(21) Appl. No.: 18/017,938

(22) PCT Filed: Aug. 5, 2021

(86) PCT No.: PCT/JP2021/029060
§ 371 (c)(1),
(2) Date: Jan. 25, 2023

(87) PCT Pub. No.: WO2022/039031
PCT Pub. Date: Feb. 24, 2022

(65) Prior Publication Data
US 2023/0274102 A1 Aug. 31, 2023

(30) Foreign Application Priority Data
Aug. 17, 2020 (JP) .................... 2020-137323

(51) Int. Cl.
*G06F 40/58* (2020.01)
*G06N 3/09* (2023.01)

(52) U.S. Cl.
CPC ............... *G06F 40/58* (2020.01); *G06N 3/09* (2023.01)

(58) Field of Classification Search
None
See application file for complete search history.

(56) References Cited

U.S. PATENT DOCUMENTS

2014/0067361 A1* 3/2014 Nikoulina ............... G06F 40/44
704/2
2021/0027026 A1* 1/2021 Imamura ................. G06F 40/58

FOREIGN PATENT DOCUMENTS

JP 2018-116324 A 7/2018
JP 2020-112915 A 7/2020

OTHER PUBLICATIONS

Official Communication issued in International Patent Application No. PCT/JP2021/029060, mailed on Oct. 12, 2021.
(Continued)

*Primary Examiner* — Quynh H Nguyen
(74) *Attorney, Agent, or Firm* — Keating & Bennett, LLP

(57) ABSTRACT

Provided is a pseudo parallel translation data generation apparatus for generating pseudo parallel translation data for accurately performing machine translation in an adaptation target domain even when there exists no parallel translation data for the adaptation target domain. Using other-domains parallel translation data D0(L1-L2), other-domains first language data D0(L1), other-domains second language data D0(L2), adaptation target domain first language data D0(R1), and adaptation target domain second language data D0(R2), the pseudo parallel translation data generation apparatus 100 performs optimization processing for a cross-lingual language model including an input data embedding unit 2 and an XLM processing unit 3, and performs parameter optimization processing for a pseudo parallel translation data generation NMT model including the input data embedding (Continued)

unit after the optimization processing and a machine translation processing unit 5. Performing processing using the pseudo parallel translation data generation machine translation model obtained by the parameter optimization processing allows for obtaining pseudo parallel translation data for the adaptation target domain for which no parallel translation data sets exist.

7 Claims, 16 Drawing Sheets

(56) References Cited

OTHER PUBLICATIONS

Artetxe et al., "Unsupersized Statistical Machine Translation", Proceedings of the 2018 Conference on Empirical Methods in Natural Language Processing, Oct. 31-Nov. 4, 2018, pp. 3632-3642.
Conneau et al., "Cross-lingual Language Model Pretraining", 33rd Conference on Neural Information Processing Systems, 2019, 11 pages.
Morita et al., "A Study of Iterative Unsupervised Adaptation of Bidirectional Neural Machine Translation", The Association for Natural Language Processing, Mar. 2019, pp. 1451-1454.
Vaswani et al., "Attention Is All You Need", In Proceedings of the 30th Neural Information processing Systems Conference (NeurIPS), 2017, pp. 1-11.

* cited by examiner

| Original sentence | #COVID19 in NYC, plz dont go out and stay @home!!! |
| Without domain adaptation | #NYCのCOVID19、PLZは外出せず@home! |
| Present invention | #COVID19 NYC、外出しない、家にいてください！！！ |

FIG. 15

METHOD FOR TRAINING MACHINE TRANSLATION MODEL FOR GENERATING PSEUDO PARALLEL TRANSLATION DATA, METHOD FOR OBTAINING PSEUDO PARALLEL TRANSLATION DATA, AND METHOD FOR TRAINING MACHINE TRANSLATION MODEL

TECHNICAL FIELD

The present invention relates to the technology of neural machine translation.

BACKGROUND ART

Neural machine translation (NMT) is a machine translation technology using a multilayer neural network. A neural machine translation system includes a neural network (encoder) that transforms each word and entire sentence in a source language into a vector or tensor, and a neural network (decoder) that generates a sequence of words in a target language from the resulting vector or tensor; it trains a neural network model (optimizes parameters) based on parallel translation data. The achievable translation performance of the neural machine translation system strongly depends on the scale of a parallel translation data set for a source language and a target language and/or a target domain. Building a practical neural machine translation system requires large-scale parallel translation data sets (parallel translation data sets including at least hundreds of thousands of pieces of parallel translation data are required, depending on what language pairs and domains are to be set). It is difficult for the neural machine translation system to achieve high-quality machine translation processing when only small-scale parallel translation data sets exist.

In a case where there exist parallel translation data sets whose language pair is the same language pair to be processed in machine translation to be achieved (a language pair to be processed), the parallel translation data sets being for other domains (domain(s) other than an adaptation target domain of machine translation), or in a case where there exist parallel translation data sets whose language pair is not the same language pair to be processed in machine translation to be achieved, but is included in the same domain as the domain for machine translation, machine translation target domain adaptation technology using the above-mentioned parallel translation data sets or multilingual machine translation technology using the above-mentioned parallel translation data sets can sometimes achieve machine translation in the target domain.

In addition, instead of relying on parallel translation data sets, technologies have been developed to utilize monolingual data sets, which can be obtained inexpensively and in large quantities.

Also, in recent years, unsupervised machine translation technologies have been proposed that builds a machine translation system only from monolingual data sets without using parallel translation data sets in other domains or parallel translation data sets for other language pairs (e.g., see Non-Patent Document 1).

PRIOR ART DOCUMENTS

Non-Patent Document 1: Mikel Artetxe, Gorka Labaka, Eneko Agirre (2018). Unsupervised Statistical Machine Translation. In Proceedings of the 2018 Conference on Empirical Methods in Natural Language Processing (EMNLP), pp. 3632-3642.

DISCLOSURE OF INVENTION

Technical Problem

However, in any of the above technologies, it is premised on the existence of parallel translation data sets including about several thousand sentences for the target language pair and the target domain; if this premise does not hold, the machine translation system provided by using the above technologies is not able to achieve high machine translation performance. In addition, to create parallel translation data sets including about several thousand sentences for the target language pair and target domain required by the above technologies, considerable human and financial costs are required.

In this way, when adapting a neural machine translation system for a new domain, a certain amount of parallel translation data in the domain targeted for machine translation with the neural machine translation system (target domain) is required; without such parallel translation data, it is difficult to improve the performance of machine translation.

In view of the above problems, it is an object of the present invention to provide a pseudo parallel translation data generation apparatus for accurately performing machine translation in an adaptation target domain (a domain targeted for machine translation) even when there exists no parallel translation data for the adaptation target domain (the domain targeted for machine translation). It is also an object of the present invention to provide a machine translation system that accurately performs machine translation in the adaptation target domain using the pseudo parallel translation data generated by the pseudo parallel translation data generation apparatus, a method of training a machine translation model for generating pseudo parallel translation data used in the machine translation system, a pseudo parallel translation data obtaining method, and a method of training a machine translation model.

Solution to Problem

To solve the above problems, a first aspect of the present invention provides a training method for a machine translation model for generating pseudo parallel translation data including an initialization step and an optimization step.

The initialization step performs training processing for the machine translation model for generating pseudo parallel translation data using:

an other-domains parallel translation data set Dsetp(L1-L2) containing a plurality of pieces of parallel translation data including other-domains first language data, which is data for domain(s) other than an adaptation target domain that is a domain for which pseudo parallel translation data is to be generated, and other-domains second language data, which is translated data in a second language of other-domains first language data, an other-domains monolingual data set Dsetm(L1) containing a plurality of pieces of first language data for a domain other than the adaptation target domain, an other-domains monolingual data set Dsetm(L2) containing a plurality of pieces of second language data for domain(s) other than the adaptation target domain, an adaptation target-domains monolingual data set Dsetm (R1) containing a plurality of pieces of data of the first language of the adaptation target domain, and an adaptation target-domain monolingual data set Dsetm (R2) containing a plurality of pieces of data of the second language of the adaptation target domain.

The initialization step sets parameters that have been set for the machine translation model for generating pseudo parallel translation data after performing the training processing to initial parameters.

The optimization step obtains optimum parameters for the machine translation model for generating pseudo parallel translation data by performing training processing using at least one of:

(1) auto-encoding processing that sets correct data to the same data as input data and then performs training processing for the machine translation model for generating pseudo parallel translation data with the initial parameters set, (2) zero-shot round-trip machine translation processing that inputs again output data from the machine translation model for generating pseudo parallel translation data for the input data into the machine translation model for generating pseudo parallel translation data, and then performs training processing for the machine translation model for generating pseudo parallel translation data so that the output from the machine translation model for generating pseudo parallel translation data becomes the same data as the input data, for the machine translation model for generating pseudo parallel translation data with the initial parameters set, and (3) supervised machine translation processing that sets one of first language data and second language data included in an other-domains translation data set Dsetp (L1-L2) to an input into the machine translation model for generating pseudo parallel translation data and sets the other to correct data, and then performs training processing for the machine translation model for generating pseudo parallel translation data, for the machine translation model for generating pseudo parallel translation data with the initial parameters set.

The training method for the machine translation model for generating pseudo parallel translation data initializes the machine translation model for generating pseudo parallel translation data by pre-training processing (processing by the initialization step) using:

(1) a parallel translation data set (Dsetp(L1-L2) (preferably large scale (the number of pieces of parallel translation data is preferably large))) with high reliability for other domains;

(2) a first language data set (Dsetm(L1)) for other domains;

(3) a second language data set (Dsetm(L2)) for other domains;

(4) a first language data set (Dsetm(R1)) for the adaptation target domain; and (5) a second language data set (Dsetm(R2)) for the adaptation target domain.

The training method for the machine translation model for generating pseudo parallel translation data further performs parameter optimization processing (processing by the optimization step), thereby allowing for training the machine translation model for generating pseudo parallel translation data including first language data and second language data for the adaptation target domain even when there exists no parallel translation data for the adaptation target domain.

Also, the machine translation model for generating pseudo parallel translation data after training (trained model) makes it possible to generate pseudo parallel translation data in the adaptation target domain even when there exists no parallel translation data in the adaptation target domain (target domain). Furthermore, training a machine translation model using the generated pseudo parallel translation data of the adaptation target domain and performing machine translation processing with the trained machine translation model allows for precisely performing machine translation for the adaptation target domain even when there exists no parallel translation data in the adaptation target domain.

Note that a target to be initialized by the pre-training processing may be only the portion for obtaining embedding representation data from the input data. For example, when the machine translation model consists of an embedding layer (for example, provided by the input data embedding unit) that obtains embedding representation data from the input data and a neural network model for machine translation (MT neural network model), as pre-training processing, the embedding layer that obtains embedding representation data from the input data (for example, provided by the input data embedding unit) and a neural network model for a cross-lingual language model (a neural network model for XLM, XLM: Cross-lingual language model) are set, and then parameter optimization processing for the embedding layer and the cross-lingual language model is performed. Then, the parameter optimization processing for the embedding layer and the machine translation model may be performed with the machine translation model set to a model consisting of the embedding layer (for example, provided by the input data embedding unit) after optimization processing of the cross-lingual language model and the MT neural network model, and with the state of the cross-lingual language model after the optimization processing set to the initial state.

A second aspect of the present invention provides is a pseudo parallel translation data obtaining method for obtaining pseudo parallel translation data for an adaptation target domain using the machine translation model for generating pseudo parallel translation data obtained by training processing for the machine translation model for generating pseudo parallel translation data of the first aspect of the present invention; the pseudo parallel translation data obtaining method includes a first machine translation step, a second machine translation step, and a pseudo parallel translation data obtaining step.

The first machine translation step performs machine translation processing on first language data obtained from the other-domains parallel translation data set Dsetp(L1-L2) using the machine translation model for generating pseudo parallel translation data with a type of an output set to the adaptation target domain second language to obtain pseudo parallel translation data for the adaptation target domain second language, which is a machine translation processing resultant data for the other-domains first language data.

The second machine translation step performs machine translation processing on second language data obtained from the other-domains parallel translation data set Dsetp (L1-L2) using the machine translation model for generating pseudo parallel translation data with a type of an output set to the adaptation target domain first language to obtain pseudo parallel translation data for the adaptation target domain in the first language, which is machine translation processing resultant data for the other-domains second language data.

The pseudo parallel translation data obtaining step pairs second language pseudo translated data of the adaptation target domain obtained in the first machine translation step with first language pseudo translated data of the adaptation target domain obtained in the second machine translation step to obtain pseudo parallel translation data of the adaptation target domain.

This allows the pseudo parallel translation data obtaining method to obtain pseudo parallel translation data in the adaptation target domain even when there exists no parallel translation data in the adaptation target domain (target domain).

Note that the first machine translation step and the second machine translation step may be performed in parallel.

A third aspect of the present invention provides is a pseudo parallel translation data obtaining method for obtaining pseudo parallel translation data for an adaptation target domain using the machine translation model for generating pseudo parallel translation data obtained by training processing for the machine translation model for generating pseudo parallel translation data of the first aspect of the present invention; the pseudo parallel translation data obtaining method includes a monolingual language data machine translation step and a pseudo parallel translation data obtaining step.

The monolingual language data machine translation step performs machine translation processing on first language data obtained from the adaptation target domain monolingual language data set Dsetm(R1) or second language data obtained from the adaptation target domain monolingual language data set Dsetm(R2) using the machine translation model for generating pseudo parallel translation data with a type of an output set to the adaptation target domain first language or the adaptation target domain second language to obtain pseudo parallel translation data for the adaptation target domain second language, which is a machine translation processing resultant data for the adaptation target domain first language data or pseudo parallel translation data for the adaptation target domain first language data, which is a machine translation processing resultant data for the adaptation target domain second language data.

The pseudo parallel translation data obtaining step pairs first language data of the adaptation target domain that has been set to the input into the machine translation model for generating pseudo parallel translation data with the adaptation target domain second language pseudo translated data obtained in the monolingual language data machine translation step, or pairing second language data of the adaptation target domain that has been set to the input into the machine translation model for generating pseudo parallel translation data with the adaptation target domain first language pseudo translated data obtained in the monolingual language data machine translation step, thereby obtaining pseudo parallel translation data of the adaptation target domain.

This allows the pseudo parallel translation data obtaining method to obtain pseudo parallel translation data in the adaptation target domain even when there exists no parallel translation data in the adaptation target domain (target domain).

A fourth aspect of the present invention provides the pseudo parallel translation data obtaining method of the second or third aspect of the present invention, further includes a filter processing step of obtaining a confidence degree indicating reliability of a result of machine translation processing for each sentence pair of the adaptation target domain pseudo parallel translation data obtained in the pseudo parallel translation data obtaining step, selecting only pseudo parallel translation data including sentence pairs whose confidence degrees are greater than or equal to a predetermined value, and outputting the selected data.

As a result, with the pseudo parallel translation data obtaining method, it is guaranteed that pseudo parallel translation data with a predetermined reliability or higher is obtained.

The "confidence degree" is an index indicating that the higher the value, the higher the degree of trust. Further, when the data (processing resultant data) obtained by the machine translation processing is word sequences or token data, it is preferable that the confidence degree is assigned to each of the word sequences or the token data.

A fifth aspect of the present invention provides a method for training a machine translation model and obtaining data in a second language by performing machine translation on data in a first language for an adaptation target domain, the method including a machine translation model training step.

The machine translation model training step performs the machine translation model training using:

pseudo translation data of the adaptation target domain obtained by the pseudo parallel translation data obtaining method of any one of the second to the fourth aspects, and an other-domains parallel translation data set Dsetp(L1-L2) containing a plurality of pieces of translation data including other-domains first language data that is data in the first language for a domain other than the adaptation target domain, and other-domains second language data that is translated data in the second language for the other-domains first language data.

As a result, the method for training the machine translation model allows for training the machine translation model using pseudo translated data in the adaptation target domain obtained by the pseudo parallel translation data obtaining method of any one of the second to the fifth aspects of the present invention even when there exists no parallel translation data in the adaptation target domain. Performing machine translation processing using the trained machine translation model allows for accurately performing machine translation for the adaptation target domain (target domain) even when no parallel translation data exists in the adaptation target domain (target domain).

A sixth aspect of the present invention provides a machine translation apparatus that performs machine translation processing using a trained machine translation model obtained by the training method for the machine translation model for generating pseudo parallel translation data of the first aspect of the present invention or a trained machine translation model obtained by the method for training a machine translation model of the fifth aspect of the present invention.

This allows the machine translation apparatus to perform machine translation processing using the trained machine translation model obtaining by the method for training the machine translation model for generating pseudo parallel translation data of the first aspect of the present invention or the trained machine translation model obtaining by the method for training the machine translation model of the fifth aspect of the present invention.

The present invention also includes a program for causing a computer to execute the training method of the machine translation model for generating pseudo parallel translation data, which is the first aspect of the present invention.

The present invention also includes a program for causing a computer to execute the pseudo parallel translation data obtaining method of any one of the second to fourth aspects of the present invention.

The present invention also includes a program for causing a computer to execute the machine translation model training method of the fifth aspect of the present invention.

Furthermore, the present invention also includes the machine translation method that performs machine translation processing using the trained machine translation model obtained by the training method of the machine translation model of the fifth aspect of the present invention and a program for causing a computer to execute the above-mentioned machine translation method.

Advantageous Effects

The present invention provides a pseudo parallel translation data generation apparatus for accurately performing machine translation in an adaptation target domain (a domain targeted for machine translation) even if there is no parallel translation data for the adaptation target domain (the domain targeted for machine translation). The present invention also provides a machine translation system that accurately performs machine translation in the adaptation target domain using the pseudo parallel translation data generated by the pseudo parallel translation data generation apparatus, a method of training a machine translation model for generating pseudo parallel translation data used in the machine translation system, a pseudo parallel translation data obtaining method, and a method of training a machine translation model.

BRIEF DESCRIPTION OF THE DRAWINGS

FIG. 15 is a diagram showing an example of data obtained by a machine translation apparatus MT1.

DESCRIPTION OF THE PREFERRED EMBODIMENTS

First Embodiment

A first embodiment will now be described with reference to the drawings.

1.1: Configuration of Machine Translation System

Figure 1:
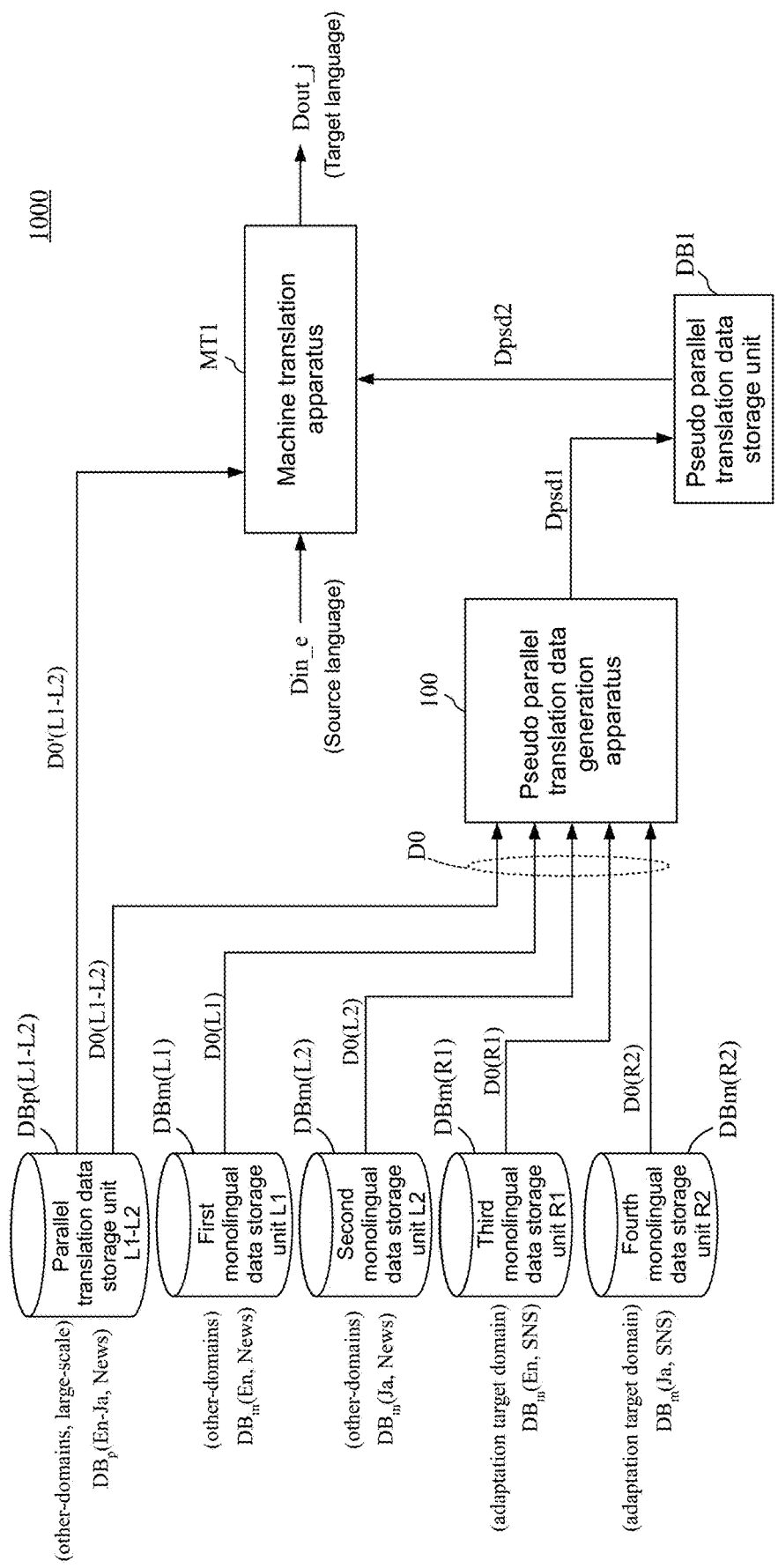
FIG. 1 is a schematic configuration diagram of a machine translation system 1000 according to a first embodiment.

FIG. 1 is a schematic configuration diagram of a machine translation system 1000 according to a first embodiment.

Figure 2:
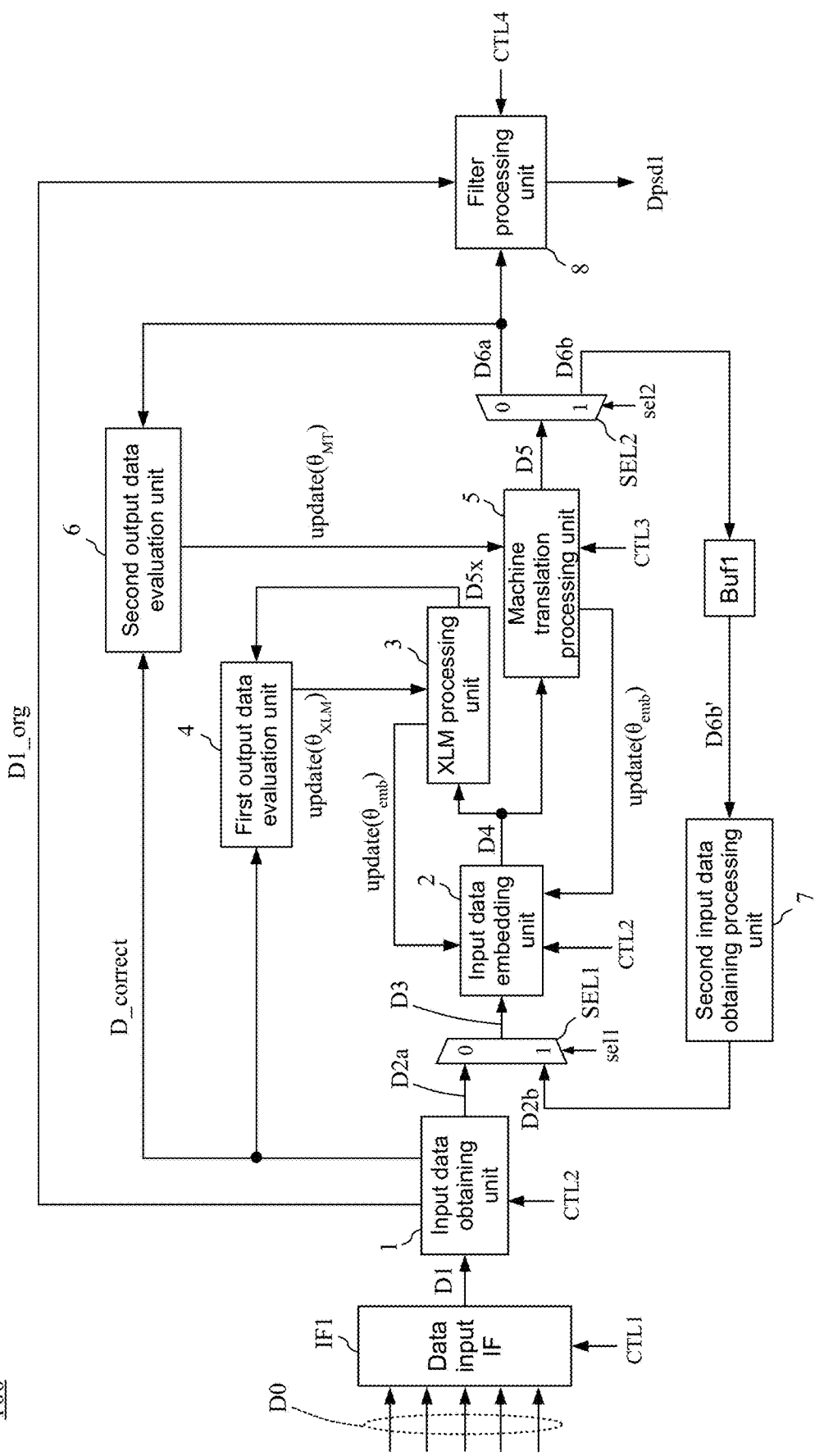
FIG. 2 is a schematic configuration diagram of a pseudo parallel translation data generation apparatus 100 according to the first embodiment.

FIG. 2 is a schematic configuration diagram of a pseudo parallel translation data generation apparatus 100 according to the first embodiment.

Figure 3:
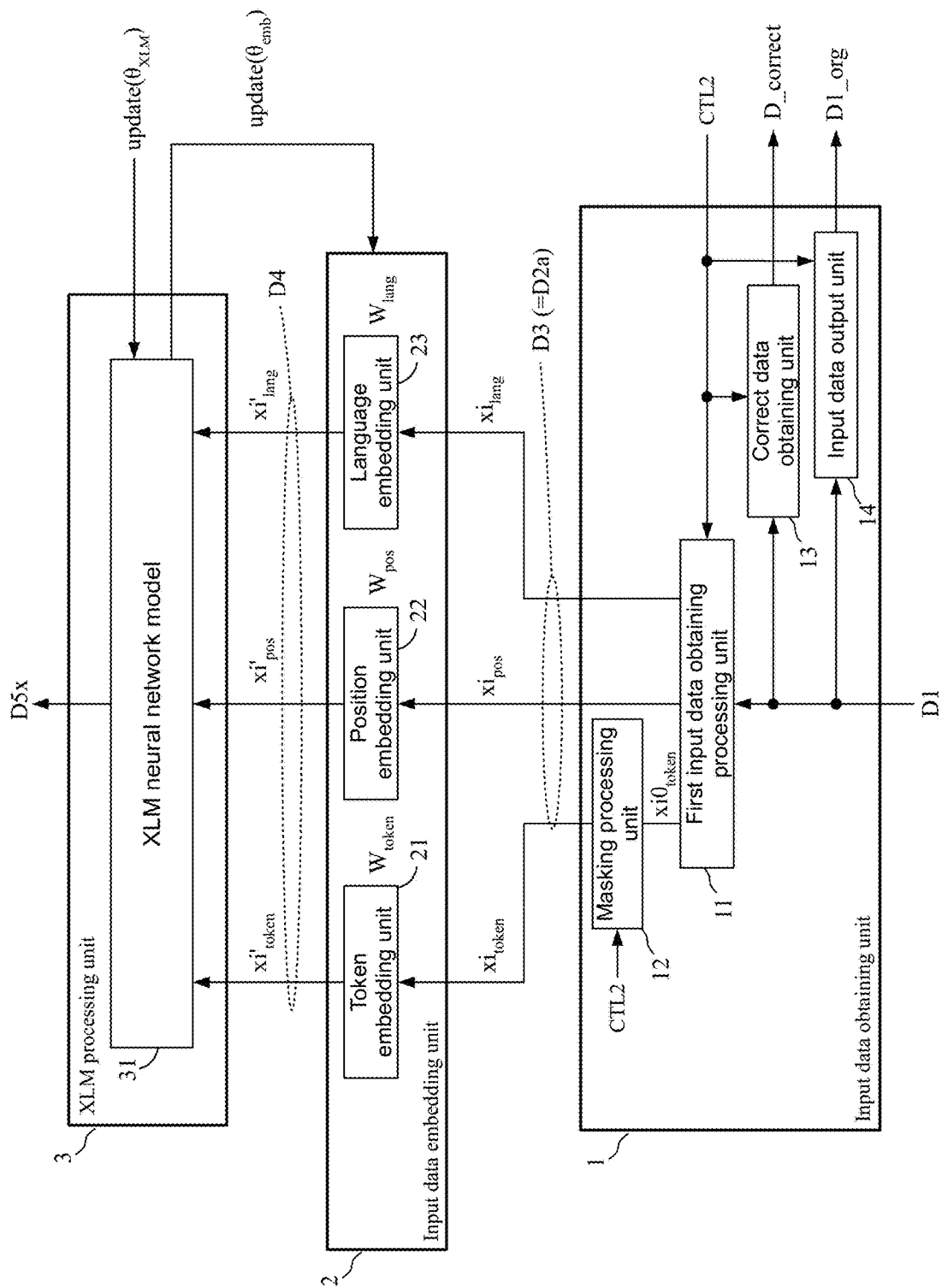
FIG. 3 is a schematic configuration diagram of an input data obtaining unit 1, an input data embedding unit 2, and an XLM processing unit 3 of the pseudo parallel translation data generation apparatus 100 according to the first embodiment.

FIG. 3 is a schematic configuration diagram of an input data obtaining unit 1, an input data embedding unit 2, and an XLM processing unit 3 of the pseudo parallel translation data generation apparatus 100 according to the first embodiment. Note that FIG. 3 is shown with the first selector SEL1 omitted.

Figure 4:
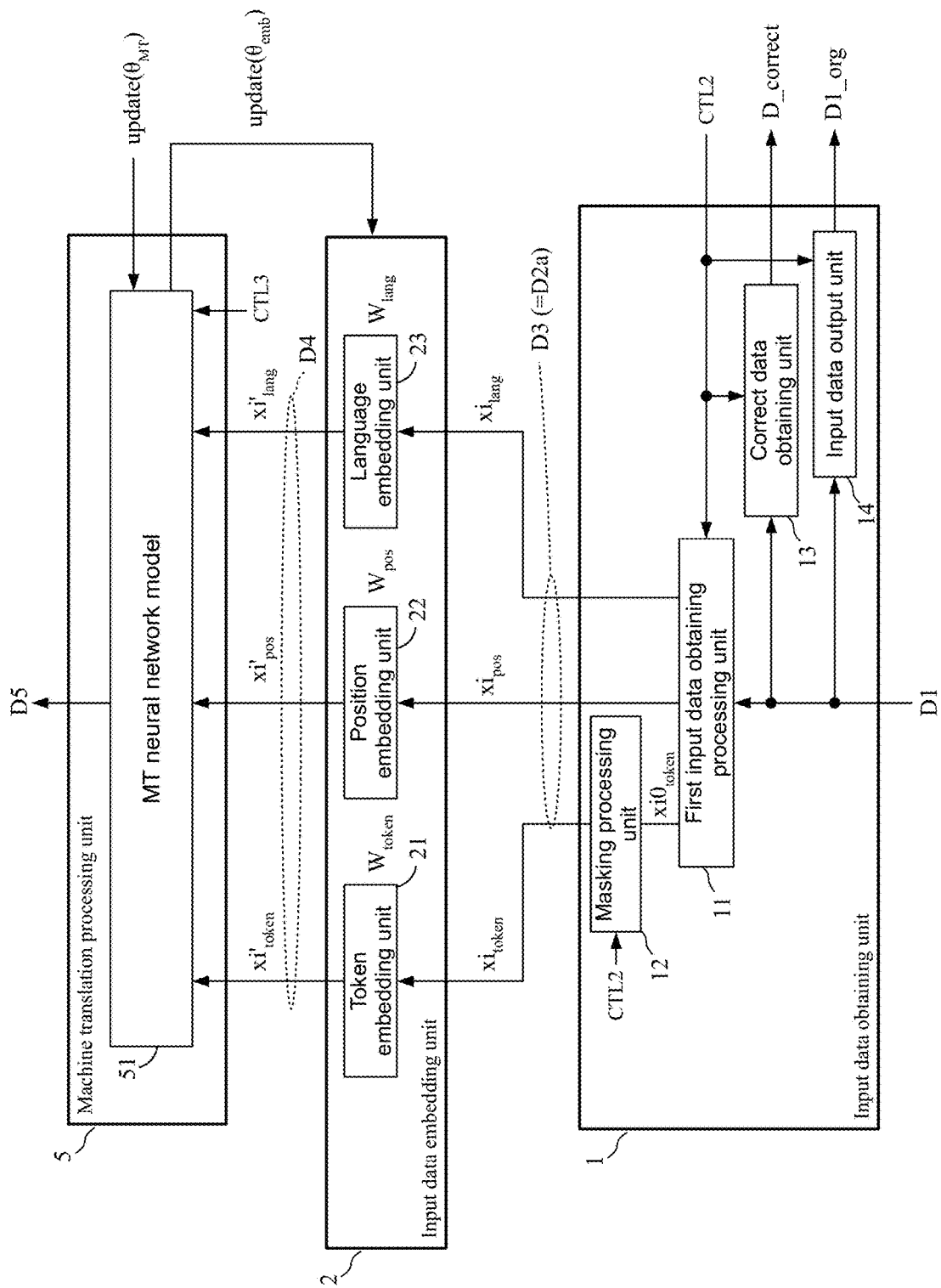
FIG. 4 is a schematic configuration diagram of the input data obtaining unit 1, the input data embedding unit 2, and a machine translation processing unit 5 of the pseudo parallel translation data generation apparatus 100 according to the first embodiment.

FIG. 4 is a schematic configuration diagram of the input data obtaining unit 1, the input data embedding unit 2, and a machine translation processing unit 5 of the pseudo parallel translation data generation apparatus 100 according to the first embodiment. Note that FIG. 4 is shown with the first selector SEL1 omitted.

As shown in FIG. 1, the machine translation system 1000 includes a parallel translation data storage unit DBp(L1-L2), a first monolingual data storage unit DBm(L1), and a second monolingual data storage unit DBm(L2), a third monolingual data storage unit DBm(R1), a fourth monolingual data storage unit DBm(R2), a pseudo parallel translation data generation apparatus 100, a pseudo parallel translation data storage unit DB1, and a machine translation apparatus MT1.

In the following description, the target domain for parallel translation data generated by the pseudo parallel translation data generation apparatus 100 is referred to as an "adaptation target domain", and domain(s) other than the adaptation target domain are referred to as "other domains".

The parallel translation data storage unit DBp(L1-L2) stores an other-domains parallel translation data set Dsetp (L1-L2) containing a plurality of pieces of parallel translation data consisting of other-domains first-language data, which is first-language data of a domain (other-domains) other than the adaptation target domain, and other-domains second-language data, which is second language data translated from the other-domains first-language data. The parallel translation data storage unit DBp(L1-L2) reads out parallel translation data D0(L1-L2) stored in the parallel translation data storage unit DBp(L1-L2), in accordance with a read-out instruction, from the pseudo parallel translation data generation apparatus 100, and then transmits the parallel translation data D0(L1-L2) to the pseudo parallel translation data generation apparatus 100. For example, the parallel translation data storage unit DBp(L1-L2) is provided by using a database. It is preferable that the number of pieces of parallel translation data stored in the parallel translation data storage unit DBp(L1-L2) is large (it is preferable that the parallel translation data storage unit DBp(L1-L2) stores a large-scale parallel translation data set).

The first monolingual data storage unit DBm(L1) stores other-domains first language monolingual data set Dsetm (L1) containing a plurality of pieces of other-domains first language data, which is monolingual data in the first language of domain(s) (other-domains) other than the adaptation target domain. The first monolingual data storage unit DBm(L1) reads out monolingual data D0(L1) of the first language stored in the first monolingual data storage unit DBm(L1), in accordance with a read-out instruction, from the pseudo parallel translation data generation apparatus 100, and then transmits the monolingual data D0(L1) to the pseudo parallel translation data generation apparatus 100. For example, the first monolingual data storage unit DBm (L1) is provided by using a database.

The second monolingual data storage unit DBm(L2) stores an other-domains second language monolingual data set Dsetm(L2) containing a plurality of pieces of other-domains second language data, which is monolingual data of the second language for domain(s) (other-domains) other than the adaptation target domain. The second monolingual data storage unit DBm (L2) reads out monolingual data D0(L2) of the second language stored in the second monolingual data storage unit DBm(L2), in accordance with a read-out instruction, from the pseudo parallel translation data generation apparatus 100, and then transmits the monolingual data D0(L2) to the pseudo parallel translation data generation apparatus 100. For example, the second monolingual data storage unit DBm(L2) is provided by using a database.

The third monolingual data storage unit DBm(R1) stores an adaptation target domain first language monolingual data set Dsetm(R1) containing a plurality of pieces of adaptation target domain first language data, which is monolingual data of the first language for the adaptation target domain. The third monolingual data storage unit DBm(R1) reads out monolingual data D0(R1) of the first language stored in the third monolingual data storage unit DBm(R1), and then transmits the monolingual data D0(R1) to the pseudo parallel translation data generation apparatus 100. For example, the third monolingual data storage unit DBm(R1) is provided by using a database.

The fourth monolingual data storage unit DBm(R2) stores an adaptation target domain second language monolingual data set Dsetm(R2) containing a plurality of pieces of adaptation target domain second language data, which is monolingual data of the second language for the adaptation target domain. The fourth monolingual data storage unit DBm(R2) reads out second language monolingual data D0(R2) stored in the fourth monolingual data storage unit DBm(R2), in accordance with a read-out instruction, from the pseudo parallel translation data generation apparatus 100, and then transmits the monolingual data D0(R2) to the pseudo parallel translation data generation apparatus 100. For example, the fourth monolingual data storage unit DBm(R2) is provided by using a database.

As shown in FIG. 2, the pseudo parallel translation data generation apparatus 100 includes a data input interface IF1, an input data obtaining unit 1, a first selector SEL1, an input data embedding unit 2, an XLM processing unit 3, a first output data evaluation unit 4, machine translation processing unit 5, a second selector SEL2, a second output data evaluation unit 6, a first buffer Buf1, a second input data obtaining processing unit 7, and a filter processing unit 8.

The data input interface IF1 receives a control signal CTL1 from a control unit (not shown) that controls each functional unit of the pseudo parallel translation data generation apparatus 100; in accordance with the control signal CTL1, the data input interface IF1 reads out data from one of the parallel translation data storage unit DBp(L1-L2), the first monolingual data storage unit DBm(L1), the second monolingual data storage unit DBm(L2), the third monolingual data storage unit DBm(R1), and the fourth monolingual data storage unit DBm(R2), and then transmits the read-out data to the input data obtaining unit 1 as data D1.

As shown in FIG. 3, the input data obtaining unit 1 includes a first input data obtaining processing unit 11, a masking processing unit 12, a correct data obtaining unit 13, and an input data output unit 14. The input data obtaining unit 1 includes a buffer (not shown) capable of storing and holding all or part of received data for a predetermined period of time, and can use data stored in the buffer.

The first input data obtaining processing unit 11 receives data D1 transmitted from the data input interface IF1 and a control signal CTL2 transmitted from the control unit. The first input data obtaining processing unit 11 obtains (generates) data to be inputted into the masking processing unit 12 and the input data embedding unit 2 from the data D1 in accordance with the control signal CTL2. Specifically, the first input data obtaining processing unit 11 obtains (1) token data $xi0_{token}$, which is data representing a token (the token may represent a sequence of characters), (2) position data $xi_{pos}$ for specifying the position of the token, and (3) language data $xi_{lang}$ for specifying the language of the token, from the received data D1 (e.g., a sequence of subwords (or a sequence of words) data, or index string data corresponding to each subword (or each word)). The first input data obtaining processing unit 11 then transmits the token data $xi0_{token}$ obtained as described above to the masking processing unit 12, and transmits the position data $xi_{pos}$ and the language data $xi_{lang}$ to the first selector SEL1.

The masking processing unit 12 receives the token data $xi0_{token}$ transmitted from the first input data obtaining processing unit 11 and the control signal CTL2 transmitted from the control unit.
(1) When the control signal CTL2 instructs to perform masking processing, the masking processing unit 12 performs masking processing on the token data $xi0_{token}$, and transmits the data after masking processing as the token data $xi_{token}$ to the first selector SEL1.
(2) When the control signal CTL2 does not instruct to perform masking processing, the masking processing unit 12 transmits the received token data xi0 token as token data $xi_{token}$ to the first selector SEL1.

Note that data including (1) token data $xi_{token}$, (2) position data $xi_{pos}$, and (3) language data $xi_{lang}$ which are transmitted from the input data obtaining unit 1 to the first selector SEL1, is denoted as data D2a.

The correct data obtaining unit 13 receives data D1 transmitted from the data input interface IF1 and the control signal CTL2 transmitted from the control unit. In accordance with the control signal CTL2, the correct data obtaining unit 13 generates correct data D_correct used in training processing for a cross-lingual language model (XLM)(a model including the input data embedding unit 2 (corresponding to a embedding layer) and an XLM neural network model 31 of the XLM processing unit3) or for the machine translation model (a neural network model including the input data embedding unit 2 and the machine translation processing unit5), and then transmits the correct data D_correct to the first output data evaluation unit 4 and the second output data evaluation unit 6.

The input data output unit 14 receives data D1 transmitted from the data input interface IF1 and the control signal CTL2 transmitted from the control unit. The input data output unit 14 transmits the input data D1 to the filter processing unit 8 as data D1_org in accordance with the control signal CTL2.

The first selector SEL1 receives data D2a transmitted from the first input data obtaining processing unit 11 of the input data obtaining unit 1, data D2b transmitted from the second input data obtaining processing unit 7, and a selection signal sel1 transmitted from the control unit. The first selector SEL1 selects data D2a or data D2b in accordance with the selection signal sel1 and transmits the selected one to the input data embedding unit 2 as data D3.

As shown in FIGS. 3 and 4, the input data embedding unit 2 includes a token embedding unit 21, a position embedding unit 22, and a language embedding unit 23.

The token embedding unit 21 receives token data $xi_{token}$ included in the data D3, obtains embedding representation data of the received token data $xi_{token}$, and then transmits the obtained embedding representation data as embedding representation data $xi'_{token}$ to the XLM processing unit 3 and the machine translation processing unit 5. Note that, for example, the token embedding unit 21 performs a matrix operation on the token data $xi_{token}$ using a matrix for obtaining the embedding representation data, thereby obtaining the embedding representation data $xi'_{token}$ For example, the token embedding unit 21 performs the following matrix operation processing to obtain the embedding representation data $xi'_{token}$ Note that each element of a matrix $W_{token}$ (corresponding to a weighting factor) is part of parameters $\theta_{emb}$. The parameters $\theta_{emb}$ are updated with parameter update data update ($\theta_{emb}$) inputted from the XLM processing unit 3 or the machine translation processing unit 5 into the input data embedding unit 2.

$$xi'_{token} = xi_{token} \cdot W_{token}$$

$xi_{token}$: a vector representing each token (input data) or each sequence of characters (for example, a 1×n1 matrix (n1—vector) (n1 is a natural number))

$W_{token}$: a matrix for obtaining embedding representation data (for example, an n1×m1 matrix (n1, m1 are each natural numbers))

$xi'_{token}$: embedding representation data of input data $xi_{token}$ (for example, a 1×m1 matrix (m1—dimensional vector) (m1 is a natural number))

The position embedding unit 22 receives the position data $xi_{pos}$ included in the data D3, obtains the embedding representation data of the received position data $xi_{pos}$, and transmits the obtained embedding representation data as an embedding representation data xi' pos to the XLM processing unit 3 and the machine translation processing unit 5. Note that, for example, the position embedding unit 22 performs a matrix operation on the position data $xi_{pos}$ using a matrix for obtaining the embedding representation data, thereby obtaining the embedding representation data $xi'_{pos}$. For example, the position embedding unit 22 performs the following matrix operation processing to obtain the embedding representation data $xi'_{pos}$. Note that each element of a matrix $W_{pos}$ (corresponding to a weighting factor) is part of the parameters $\theta_{emb}$ The parameters $\theta_{emb}$ are updated with parameter update data update ($\theta_{emb}$) inputted from the XLM processing unit 3 or the machine translation processing unit 5 into the input data embedding unit 2.

$$xi'_{pos} = xi_{pos} \cdot W_{pos}$$

$xi_{pos}$: a vector representing the position of each token (input data) (for example, a 1×n2 matrix (n2—dimensional vector) (n2 is a natural number))

$W_{pos}$: matrix for obtaining embedding representation data (for example, n2×m2 matrix (n2, m2 are each natural numbers))

$xi'_{pos}$: embedding representation data of input data $xi_{pos}$ (for example, 1×m2 matrix (m2—dimensional vector) (m2 is a natural number))

The language embedding unit 23 receives the language data $xi_{lang}$ included in the data D3, obtains the embedding representation data of the received language data $xi_{lang}$, and transmits the obtained embedding representation data as an embedding representation data $xi'_{lang}$ to the XLM processing unit 3 and the machine translation processing unit 5. Note that the language embedding unit 23 performs a matrix operation on the language data $xi_{lang}$ using a matrix for obtaining the embedding representation data to obtain the embedding representation data $xi'_{lang}$. For example, the language embedding unit 23 performs the following matrix operation processing to obtain the embedding representation data $xi'_{lang}$. Note that each element of a matrix $xi_{lang}$ (corresponding to a weighting factor) is part of the parameters $\theta_{emb}$. The parameters $\theta_{emb}$ are updated with parameter update data update ($\theta_{emb}$) inputted from the XLM processing unit 3 or the machine translation processing unit 5 into the input data embedding unit 2.

$$xi'_{lang} = xi_{lang} \cdot W_{lang}$$

$xi_{lang}$: a vector representing the language of each token (input data) (for example, a 1×n3 matrix (n3—dimensional vector) (n3 is a natural number))

$W_{lang}$: a matrix for obtaining embedding representation data (for example, n3×m3 matrix (n3, m3 are each natural numbers))

$xi'_{lang}$: embedding representation data of input data $xi_{lang}$ (for example, 1×m3 matrix (m3—dimensional vector) (m3 is a natural number))

The input data embedding unit 2 transmits the embedding representation data obtained as described above to the XLM processing unit 3 and the machine translation processing unit 5 as data D4.

As shown in FIG. 3, the XLM processing unit 3 includes an XLM neural network model 31.

The XLM neural network model 31 is, for example, a neural network model disclosed in Document A below, and is provided by, for example, a neural network model that employs the architecture of the transformer model disclosed in Document B below.

(Document A): Alexis Conneau and Guillaume Lample (2019). Cross-Lingual Language Model Pretraining. In Proceedings of the 32nd Neural Information Processing Systems Conference (NeurIPS), pp. 7057-7067.

(Document B): Ashish Vaswani, Noam Shazeer, Niki Parmar, Jakob Uszkoreit, Llion Jones, Aidan N. Gomez, Lukasz Kaiser, and Illia Polosukhin (2017). Attention is All You Need. In Proceedings of the 30th Neural Information Processing Systems Conference (NeurIPS), pp. 5998-6008.

The XLM neural network model 31 receives the embedding representation data D4 (={$xi'_{token}$, $xi'_{pos}$, $xi'_{lang}$}) transmitted from the input data embedding unit 2.

The XLM neural network model 31 updates parameters of the XLM neural network model 31 based on the parameter update data update ($\theta_{XLM}$) transmitted from the first output data evaluation unit 4. In addition, after updating the parameters of the XLM neural network model, the XLM neural network model 31 generates the parameter update data update ($\theta_{emb}$) for updating parameters of the embedding layers (corresponding to the token embedding unit 21, the position embedding unit 22, and the language embedding unit 23 of the input data embedding unit 2), and then transmits the parameter update data update ($\theta_{emb}$) to the input data embedding unit 2.

Also, the XLM neural network model 31 performs XLM processing on the data D4 transmitted from the input data embedding unit 2 to obtain data D5x.

The XLM processing unit 3 then transmits the data D5x obtained as described above to the first output data evaluation unit 4.

As shown in FIG. 2, the first output data evaluation unit 4 receives data D5x transmitted from the XLM processing unit 3 and correct data D_correct transmitted from the input data obtaining unit 1. To evaluate loss, the first output data evaluation unit 4 obtains data D_correct' for loss evaluation from the correct data D_correct for the data D5x, which is an output transmitted from the XLM processing unit 3, and then obtains loss from the from the data D5x and the data D_correct' (described in detail later). The first output data evaluation unit 4 generates data update ($\theta_{XLM}$) for updating the parameters $\theta_{XLM}$ of the XLM neural network model 31 of the XLM processing unit 3 based on the loss (training loss) for predetermined training data, and then transmits the data update ($\theta_{XLM}$) to the XLM processing unit 3.

As shown in FIG. 4, the machine translation processing unit 5 includes an MT neural network model 51.

The MT neural network model 51 is a neural network model with an encoder/decoder architecture, and is a neural network model that employs an encoder/decoder configuration based on the transformer model architecture disclosed in the above-mentioned Document B, for example.

The MT neural network model 51 receives the embedding representation data D4 (={xi'$_{token}$, xi'$_{pos}$, xi'$_{lang}$}) transmitted from the input data embedding unit 2 and a control signal CTL3 transmitted from the control unit. The MT neural network model 51 transmits data of the language indicated by the control signal CTL3.

The MT neural network model 51 also updates the parameters of the MT neural network model 51 based on the parameter update data update ($\theta_{MT}$) transmitted from the second output data evaluation unit 6.

The MT neural network model 51 also performs machine translation processing on the data D4 transmitted from the input data embedding unit 2 to obtain data D5. Note that the MT neural network model 51 performs machine translation processing so that the type of data specified by the control signal CTL3 is outputted as the data D5. The type specified by the control signal CTL3 is one of (1) L1 (other domains, first language), (2) L2 (other domains, second language), (3) R1 (adaptation target domain, first language), and (4) R2 (adaptation target domain, second language).

The machine translation processing unit 5 transmits the data D5 obtained by the MT neural network model 51 to the second selector SEL2.

When obtaining pseudo parallel translation data, the machine translation processing unit 5 pairs data (e.g., data R2) obtained by performing machine translation processing on data (e.g., other-domains first language data D3(L1)) inputted into the input data embedding unit 2 and data (e.g., data R1) by performing machine translation processing on data (e.g., data D3(L2) corresponding to translated sentence in other-domains second language of other-domains first language data D3(L1)) inputted into the input data embedding unit 2, and then transmits the paired data to the second selector SEL2 as data D5 (e.g., data D5(R1-R2)(i.e., parallel translation data D5(R1-R2) obtained by pairing adaptation target domain first language machine translation sentence (machine-translated result of the inputted data L2) and adaptation target domain second language machine translation sentence (machine-translated result of the inputted data L1))).

The second selector SEL2 is a one-input two-output switch, and receives data D5 transmitted from the machine translation processing unit 5 and a selection signal sel2 transmitted from the control unit. In accordance with the selection signal sel2, the second selector SEL2 outputs the data D5 (1) to the second output data evaluation unit 6 and the filter processing unit 8 as data D6a, or (2) to the first buffer Buf1 as data D6b.

As shown in FIG. 2, the second output data evaluation unit 6 receives data D6a transmitted from the second selector SEL2 and the correct data D_correct transmitted from the input data obtaining unit 1. To evaluate loss, the second output data evaluation unit 6 obtains the data D_correct' for loss evaluation from the correct data D_correct for the data D6a, which is an output transmitted from the machine translation processing unit 5, and then obtains loss from the data D6a and the data D_correct' (described in detail later). The second output data evaluation unit 6 generates data update ($\theta_{MT}$) for updating the parameters $\theta_{MT}$ of the MT neural network model 51 of the machine translation processing unit 5 based on the loss (training loss) for the predetermined training data.

The second output data evaluation unit 6 then transmits the data update ($\theta_{MT}$) to the machine translation processing unit 5.

The first buffer Buf1 is a buffer for storing and holding data D6b transmitted from the second selector SEL2. The first buffer Buf1 transmits the stored data to the second input data obtaining processing unit 7 as data D6b'.

The second input data obtaining processing unit 7 is a functional unit similar to the first input data obtaining processing unit 11, receives the data D6b' transmitted from the first buffer Buf1, and obtains (generates) data for inputting into the input data embedding unit 2 from the data D6b'. The second input data obtaining processing unit 7 then transmits the obtained data to the first selector SEL1 as data D2b.

The filter processing unit 8 receives the data D6a transmitted from second selector SEL2, the data D1_org transmitted from input data obtaining unit 1, and a control signal CTL4 transmitted from the control unit.

Further, (1) when the data D6a is parallel translation data (pseudo parallel translation data), the filter processing unit 8 assigns confidence to each parallel translation data, and performs filtering processing based on the confidence; (2) when the data D6a is machine-translated data, the filter processing unit 8 assigns confidence to parallel translation data (pseudo parallel translation data) obtained by pairing the machine-translated data and the data D1_org, and performs filtering processing based on the confidence.

The filter processing unit 8 then transmits the filtered parallel translation data to the pseudo parallel translation data storage unit DB1 as data Dpsd1.

As shown in FIG. 1 the pseudo parallel translation data storage unit DB1 is a storage unit for storing and holding the data Dpsd1 transmitted from the pseudo parallel translation data generation apparatus 100. Further, the pseudo parallel translation data storage unit DB1 reads out the stored data, in accordance with a read-out instruction, from the machine translation apparatus MT1, and transmits the read-out data as data Dpsd2 to the machine translation apparatus MT1.

As shown in FIG. 1, the machine translation apparatus MT1 reads out data from the parallel translation data storage unit DBp(L1-L2) and/or the pseudo parallel translation data storage unit DB1, and performs training processing for a machine translation model using the read-out data. The machine translation apparatus MT1 then performs machine translation processing using the trained model of the machine translation model obtained by the training processing. In other words, the machine translation apparatus MT1 receives source language data Dine, and performs machine translation processing on the source language data Din_e to obtain target language data Dout_j.

1.2: Operation of Machine Translation System

The operation of the machine translation system 1000 configured as above will be described.

Figure 5:
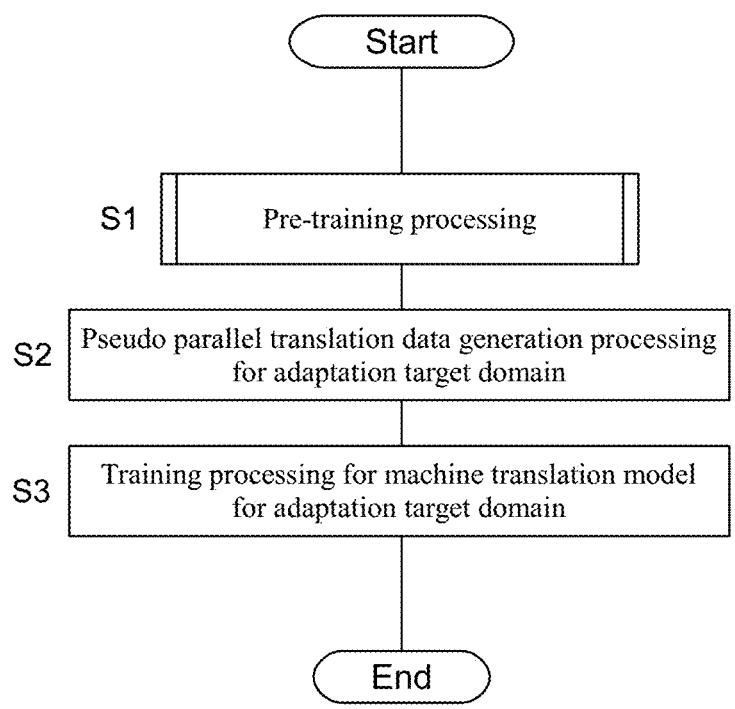
FIG. 5 is a flowchart of processing performed by the machine translation system 1000.

FIG. 5 is a flowchart of processing performed by the machine translation system 1000.

Figure 6:
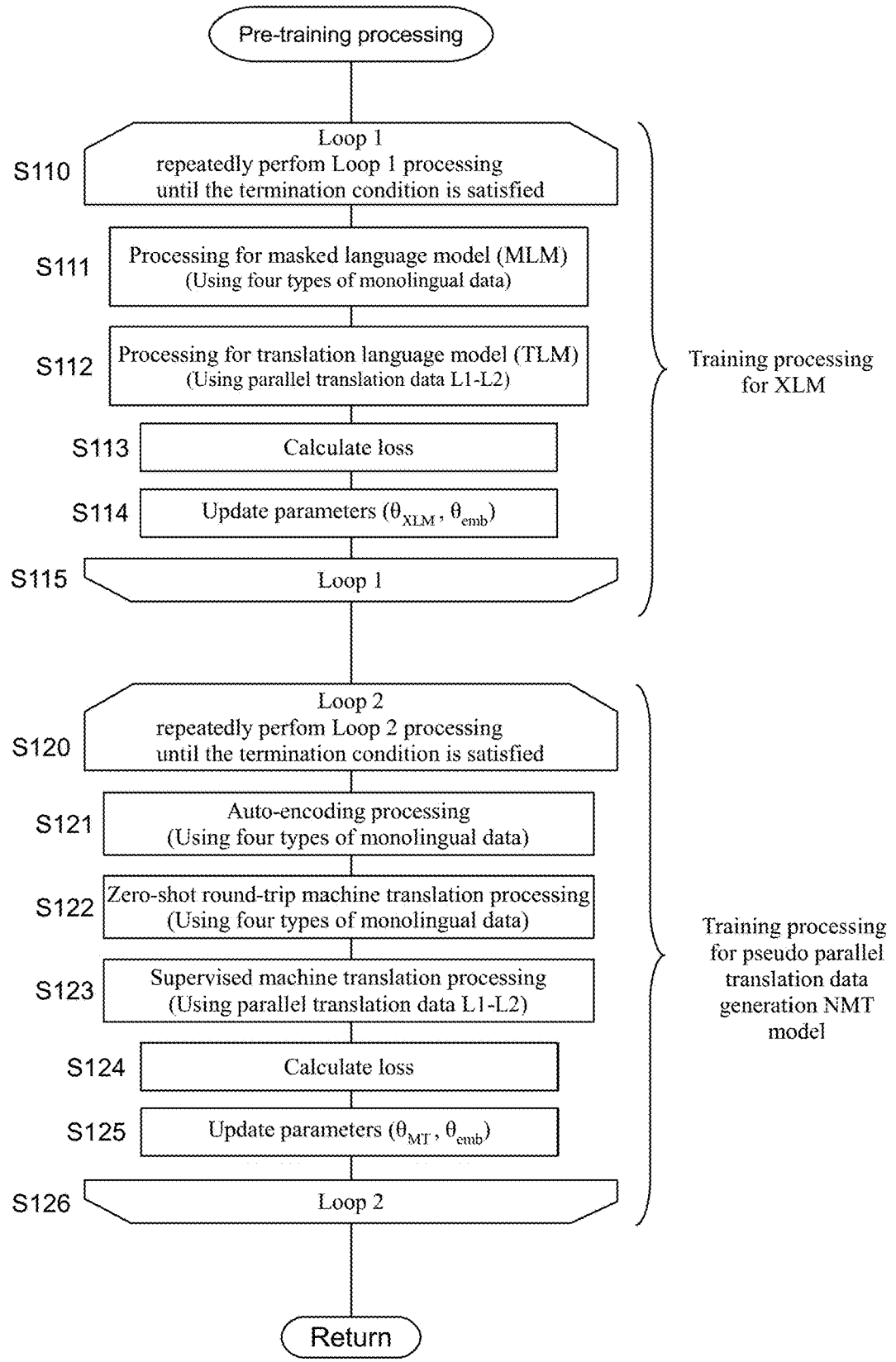
FIG. 6 is a flowchart of processing performed by the pseudo parallel translation data generation apparatus 100.

FIG. 6 is a flowchart of processing (pre-training processing) performed by the pseudo parallel translation data generation apparatus 100.

FIGS. 7 to 11 are diagrams for explaining the processing (pre-training processing) performed by the pseudo parallel translation data generation apparatus 100.

Figure 12:
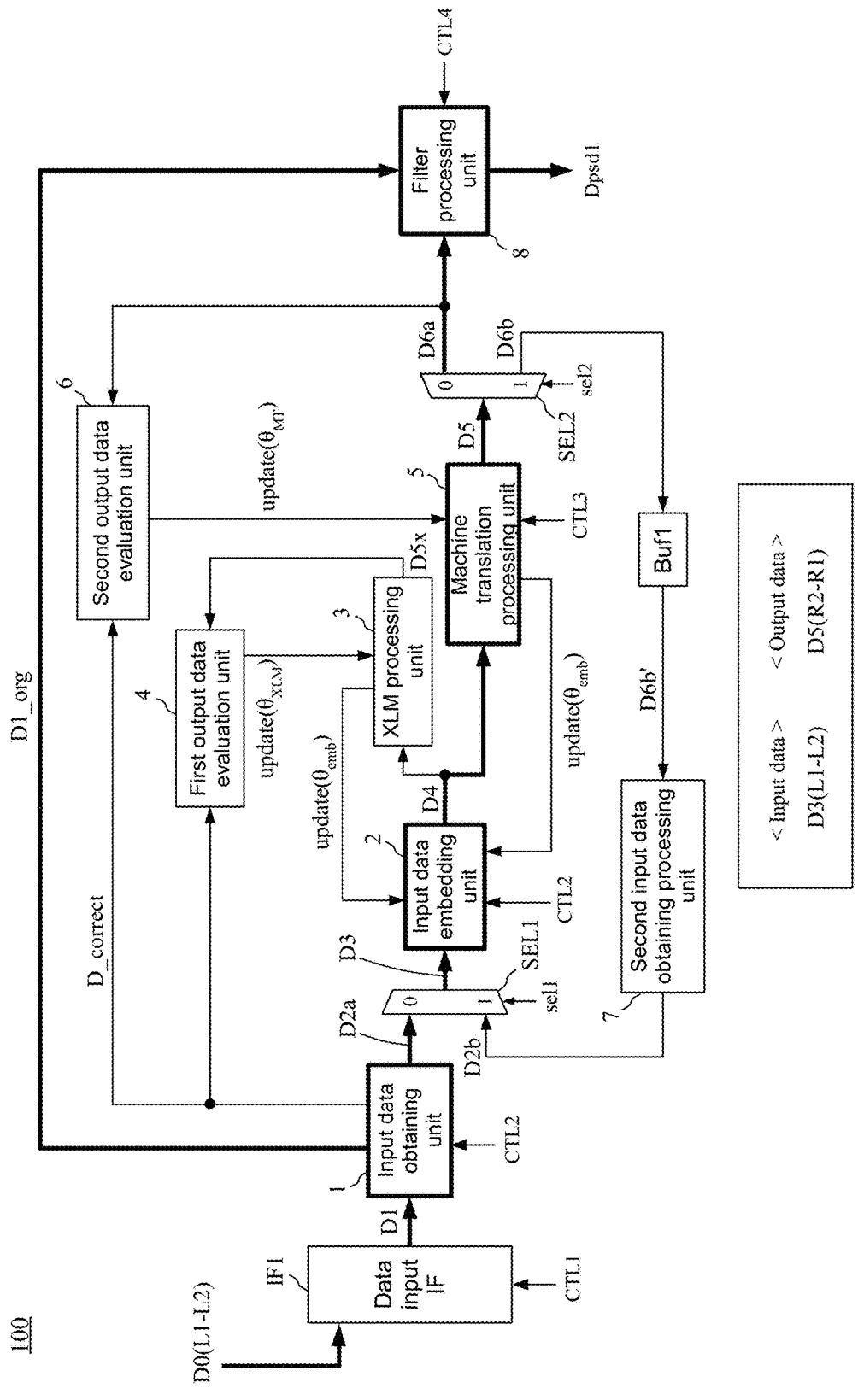
FIG. 12 is a diagram for explaining processing performed by the pseudo parallel translation data generation apparatus 100.
Figure 13:
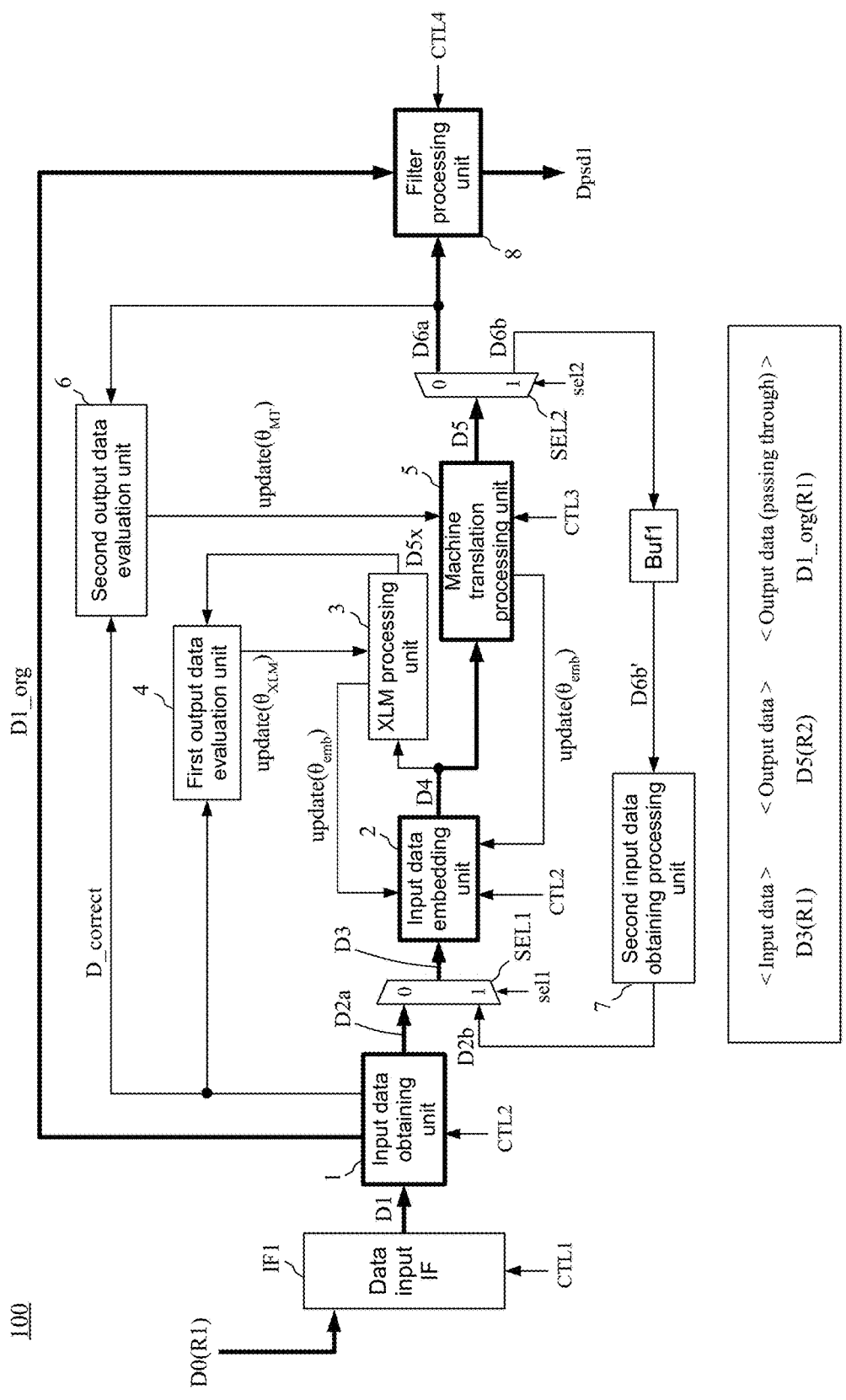
FIG. 13 is a diagram for explaining processing performed by the pseudo parallel translation data generation apparatus 100.
Figure 14:
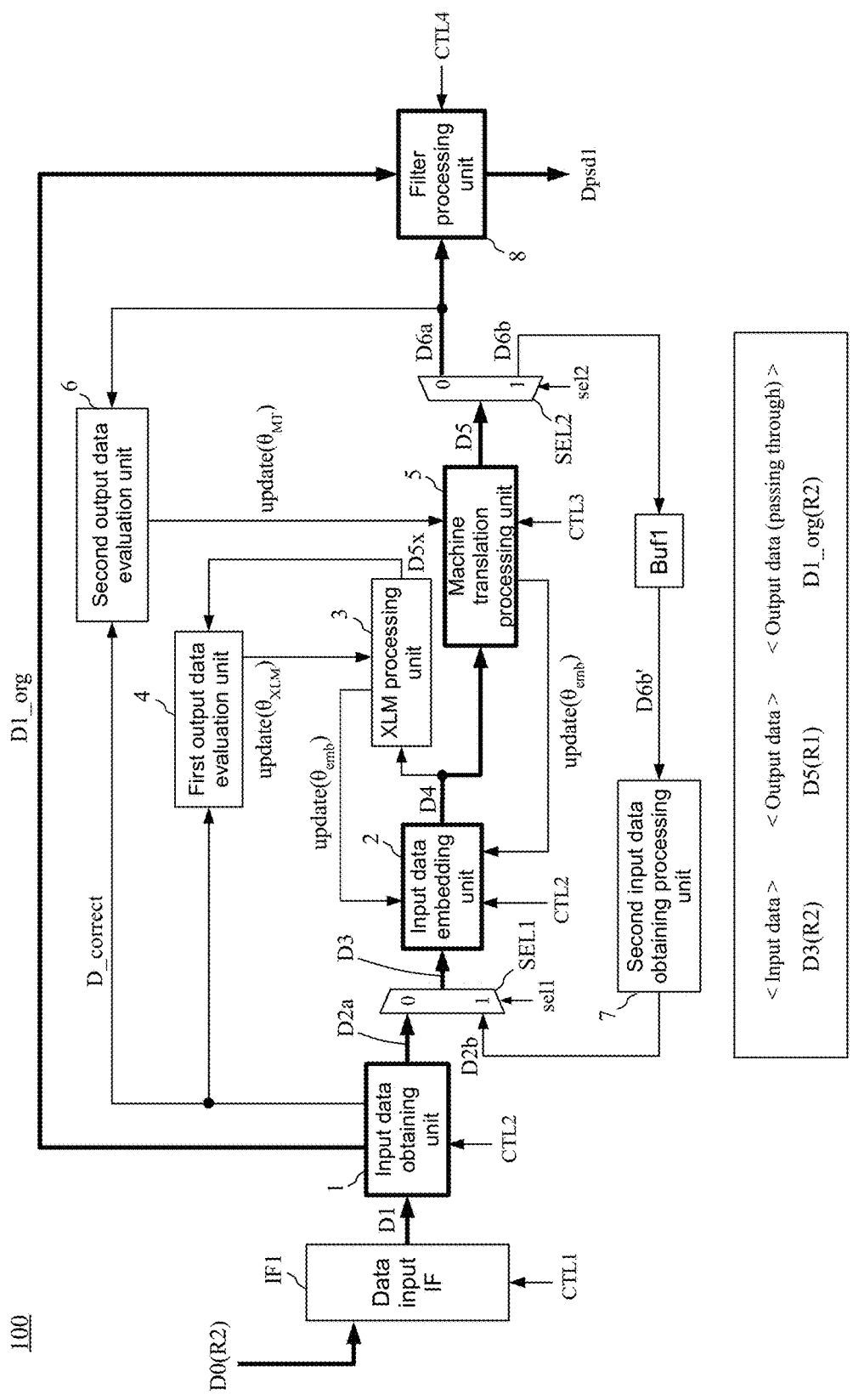
FIG. 14 is a diagram for explaining processing performed by the pseudo parallel translation data generation apparatus 100.

FIGS. 12 to 14 are diagrams for explaining the processing (pseudo parallel translation data generation processing) performed by the pseudo parallel translation data generation apparatus 100.

The operation of the machine translation system 1000 will now be described with reference to the drawings.

1.2.1: Pre-Training Processing

First, for pre-training processing performed in the pseudo parallel translation data generation apparatus 100 of the machine translation system 1000 (pre-training processing for an NMT model for generating pseudo parallel translation data (a model provided by using the input data embedding unit 2 (corresponding to the embedding layer) and the MT neural network model 51 of the machine translation processing unit 5)(step S1 in the flowchart in FIG. 5), training processing for the XLM and training processing for the NMT model for generating pseudo parallel translation data will be described separately.

1.2.1.1: XLM Training Processing

First, the training processing for XLM will be described. As shown in FIG. 6, the training processing for XLM includes:

(A) processing for a masking language model (MLM) (step S111);

(B) processing for a translation language model (TLM) (step S112);

(C) loss calculation processing (step S113); and (D) update processing of parameters ($\theta_{XLM}$, $\theta_{emb}$) (step S114).

As shown in the flowchart of FIG. 6, the processing of steps S111 to S114 is repeatedly performed until the termination condition is satisfied (loop processing (loop 1) S110 to S115 of FIG. 6).

1.2.1.1A: Masked Language Model (MLM) Processing

Figure 7:
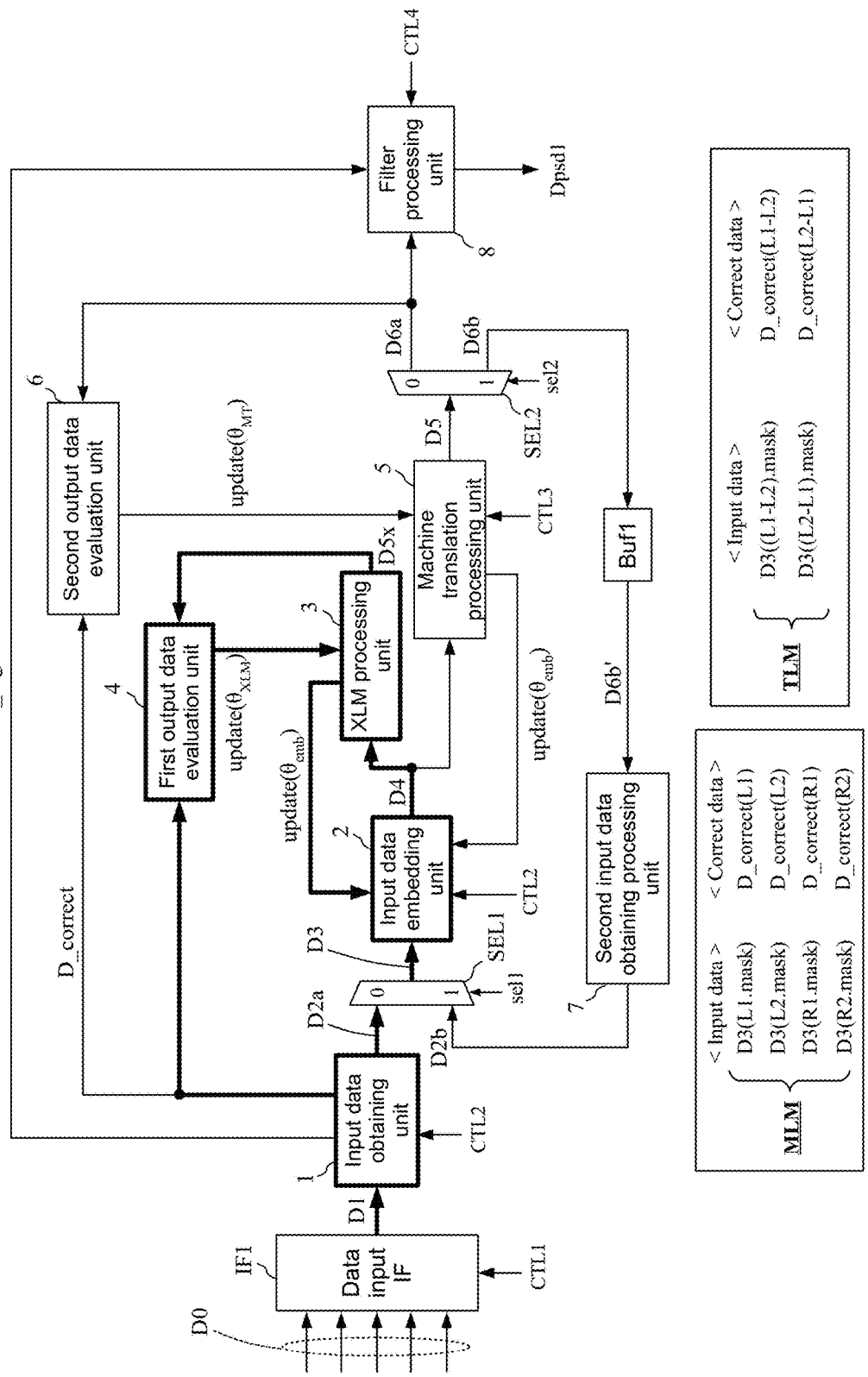
FIG. 7 is a diagram for explaining processing performed by the pseudo parallel translation data generation apparatus 100.

In processing of the masked language model (MLM), as shown in FIG. 7, the pseudo parallel translation data generation apparatus 100 sets an input to the input data embedding unit 2 as masked data and correct data as original data (non-masked data), and then performs training processing.

<<M1: MLM Processing (L1.Mask->L1)>>

Specifically, the data input interface IF1 reads out the monolingual data D0(L1) of the other-domains first language from the first monolingual data storage unit DBm (L1), and transmits the read-out monolingual data as data D1(L1) to the input data obtaining unit 1.

The first input data obtaining processing unit 11 of the input data obtaining unit 1 obtains, from the data D1 (other-domains first language data D1(L1)), (1) token data $xi0_{token}$ ($=xi0_{token}(L1)$), (2) position data $xi_{pos}$ ($=xi_{pos}(L1)$) for specifying the position of the token, and (3) language data $xi_{lang}$ ($=xi_{lang}(L1)$) for specifying the language of the token.

The input data obtaining unit 1 then transmits the token data $xi0_{token}$ obtained as described above to the masking processing unit 12.

A control unit (not shown) generates a control signal CTL2 that instructs the masking processing unit 12 of the input data obtaining unit 1 to perform masking processing, and transmits the control signal CTL2 to the masking processing unit 12.

In accordance with the control signal CTL2, the masking processing unit 12 performs masking processing that converts some tokens of the token data $xi0_{token}$ inputted from the first input data obtaining processing unit 11 into mask tokens (for example, sets some tokens to data (tokens) to which the label "[mask]" is attached). The masking processing unit 12 then transmits the masked token data as token data $xi_{token}$ to the first selector SEL1.

Also, the first input data obtaining processing unit 11 transmits position data $xi_{pos}$ ($=xi_{pos}(L1)$) to the first selector SEL1, and transmits language data $xi_{lang}$ ($=xi_{lang}(L1)$) to the first selector SEL1. In other words, the input data obtaining unit 1 transmits the data obtained as described above to the first selector SEL1 as data D2a ($=D2a(L1.mask)=\{xi_{token}(L1), xi_{pos}(L1), xi_{lang}(L1)\}$).

Note that parentheses are added to the end of variables indicating data, thereby indicating the type of the data. For example, $xi_{token}(L1)$ indicates that the data is derived from the data of the other-domains first language (L1) (the same applies hereafter). In addition, the notation ".mask" in the above-described parentheses indicates that the data includes masked token data; for example, "L1.mask" indicates that the data indicated with "L1.mask" includes data obtained by performing mask processing on token data derived from data of other-domains first language (L1).

In accordance with the control signal CTL2, the correct data obtaining unit 13 generates, from the data D1 ($=D1(L1)$), correct data D_correct($=D\_correct(L1)$) used for training processing (training processing for XLM) in the input data embedding unit 2 and the XLM processing unit 3. The correct data obtaining unit 13 then transmits the generated data to the first output data evaluation unit 4 as correct data D_correct ($=D\_correct(L1)$).

The control unit generates the selection signal sel1 that selects the terminal "0" of the first selector SEL1, and transmits the selection signal sel1 to the first selector SEL1.

The first selector SEL1 selects the terminal "0" in accordance with the selection signal sel1, and transmits the data D2a (L1.mask) transmitted from the input data obtaining unit 1 as data D3 ($=D3(L1.mask)$) to the input data embedding unit 2.

The token embedding unit 21 of the input data embedding unit 2 receives the token data $xi_{token}$ included in the data D3(L1.mask), and performs processing according to the following formula to obtain embedding representation data of the received token data $xi_{token}$, for example.

$$xi'_{token} = xi_{token} \cdot W_{token}$$

$xi_{token}$: a vector representing each token (input data) or each sequence of characters (for example, a 1×n1 matrix (n1—dimensional vector) (n1 is a natural number))

$W_{token}$: a matrix for obtaining embedding representation data (for example, n1×m1 matrix (n1, m1 are each natural numbers))

$xi'_{token}$: embedding representation data of input data $xi_{token}$ (for example, 1×m1 matrix (m1—dimensional vector) (m1 is a natural number))

The position embedding unit 22 of the input data embedding unit 2 receives the position data $xi_{pos}$ included in the data D3(L1.mask), and performs processing according to the following formula to obtain embedding representation data of the received position data $xi_{pos}$, for example.

$$xi'_{pos} = xi_{pos} \cdot W_{pos}$$

$xi_{pos}$: a vector representing the position of each token (input data) (for example, a 1×n2 matrix (n2—dimensional vector) (n2 is a natural number))

$W_{pos}$: a matrix for obtaining embedding representation data (for example, n2×m2 matrix (n2, m2 are each natural numbers))

$xi'_{pos}$: embedding representation data of input data $xi_{pos}$ (for example, 1×m2 matrix (m2—dimensional vector) (m2 is a natural number))

The language embedding unit 23 of the input data embedding unit 2 receives the language data $xi_{lang}$ included in the data D3(L1.mask), and performs processing according to the following formula to obtain embedding representation data of the received language data $xi_{lang}$, for example.

$$xi'_{lang} = xi_{lang} \cdot W_{lang}$$

$xi_{lang}$: a vector representing the language of each token (input data) (for example, a 1×n3 matrix (n3—dimensional vector) (n3 is a natural number))

$W_{lang}$: a matrix for obtaining embedding representation data (for example, n3×m3 matrix (n3, m3 are each natural numbers))

$xi'_{lang}$: embedding representation data of input data $xi_{lang}$ (for example, 1×m3 matrix (m3—dimensional vector) (m3 is a natural number))

The input data embedding unit 2 transmits the obtained embedding representation data to the XLM processing unit 3 as data D4(L1.mask). Note that the method of embedding the token character sequences and the language identifier and the method of embedding the positions should not be limited to those described above, and other methods may be used.

The XLM neural network model 31 of the XLM processing unit 3 performs XLM processing on the data D4(L1.mask) transmitted from the input data embedding unit 2 to obtain data D5x (=D5x(L1.mask)). The XLM processing unit 3 then transmits the data D5x obtained as described above to the first output data evaluation unit 4.

The first output data evaluation unit 4 receives data D5x(L1.mask) transmitted from the XLM processing unit 3 and correct data D_correct (=D_correct(L1)) transmitted from the input data obtaining unit 1. The first output data evaluation unit 4 obtains the loss from the data D5(L1.mask) transmitted from the XLM processing unit 3 and its correct data D_correct(L1).

<<M2: MLM processing (L2.mask->L2)>>

Next, the data input interface IF1 of the pseudo parallel translation data generation apparatus 100 reads out the other-domains second language monolingual data D0(L2) from the second monolingual data storage unit DBm(L2), and transmits the read-out monolingual data to the input data obtaining unit 1 as data D1(L2). The same processing as described above is then performed. In other words, the input data into the input data embedding unit 2 is set to data D3(L2.mask), that is, $$D3(L2.mask) = \{xi_{token}(L2), xi_{pos}(L2), xi_{lang}(L2)\}$$

$xi_{token}(L2)$: masked token data obtained by performing masking processing that replaces some tokens of the token data $xi0_{token}(L2)$ of the monolingual data D1(L2) read from the second monolingual data storage DBm(L2) with mask tokens $xi_{pos}(L2)$: data (position data) indicating the position of the token data of the monolingual data D1(L2) read from the second monolingual data storage unit DBm(L2)

$xi_{lang}(L2)$: data (language data) indicating the language of the token of the monolingual data D1(L2) read from the second monolingual data storage unit DBm(L2), and the correct data is set to D_correct(L2) (=original data (non-masked data)), and then the same processing as described above is performed.

<<M3: MLM Processing (R1.Mask->R1)>>

Next, the data input interface IF1 of the pseudo parallel translation data generation apparatus 100 reads out the first-language monolingual data D0(R1) of the adaptation target domain from the third monolingual data storage unit DBm(R1), and transmits the reads-out monolingual data to the input data obtaining unit 1 as data D1(R1). The same processing as described above is then performed. In other words, the input data into the input data embedding unit 2 is set to data D3(R1.mask), that is, $$D3(R1.mask) = \{xi_{token}(R1), xi_{pos}(R1), xi_{lang}(R1)\}$$

$xi_{token}(R1)$: masked token data obtained by performing masking processing that replaces some tokens of the token data $xi0_{token}(R1)$ of the monolingual data D1(R1) read from the third monolingual data storage unit DBm(R1) with mask tokens $xi_{pos}(R1)$: data (position data) indicating the position of the token data of the monolingual data D1(R1) read from the third monolingual data storage unit DBm(R1)

$xi_{lang}(R1)$: data (language data) indicating the language of the token data of the monolingual data D1(R1) read from the third monolingual data storage unit DBm(R1), and the correct data is set to D_correct(R1) (=original data (non-masked data)), and then the same processing as above is performed.

<<M4: MLM Processing (R2.Mask->R2)>>

Next, the data input interface IF1 of the pseudo parallel translation data generation apparatus 100 reads out the second-language monolingual data D0(R2) of the adaptation target domain from the fourth monolingual data storage unit DBm(R2), and transmits the reads-out monolingual data D0(R2) to the input data obtaining unit 1 as data D1. The same processing as described above is then performed. In other words, the input data into the input data embedding unit 2 is set to data D3(R2.mask), that is, $$D3(R2.mask) = \{xi_{token}(R2), xi_{pos}(R2), xi_{lang}(R2)\}$$

$xi_{token}(R2)$: masked token data obtained by performing masking processing that replaces some tokens of the token data $xi0_{token}(R2)$ of the monolingual data D1(R2) read from the fourth monolingual data storage unit DBm(R2) with mask tokens $xi_{pos}(R2)$: data (position data) indicating the position of the token data of the monolingual data D1(R2) read from the fourth monolingual data storage unit DBm(R2)

$xi_{lang}(R2)$: data (language data) indicating the language of the token data of the monolingual data D1(R2) read from the fourth monolingual data storage unit DBm (R2), and the correct data is set to D_correct(R2) (=original data (non-masked data)), and then the same processing as above is performed.

1.2.1.1B: Translation Language Model (TLM) Processing

Next, in the processing for a translation language model (TLM), the pseudo parallel translation data generation apparatus 100 sets an input (parallel translation data) into the input data embedding unit 2 as masked data and sets correct data to original data (non-masked data), as shown in FIG. 7, and then performs training processing.

<<T1: TLM Processing ((L1-L2).Mask->L1-L2)>>

Specifically, the data input interface IF1 reads out the parallel translation data D0(L1-L2) of other domains from the parallel translation data storage unit DBp(L1-L2), and transmits the read-out parallel translation data as data D1(L1-L2) to the input data obtaining unit 1.

The first input data obtaining processing unit 11 of the input data obtaining unit 1 obtains, from the data D1 (parallel translation data D1(L1-L2) obtained by pairing a sentence in the first language of other domains and a translated sentence in the second language of the sentence in the first language), (1) token data $xi0_{token}$ (=$xi0_{token}$(L1-L2)), (2) position data $xi_{pos}$ (=$xi_{pos}$(L1-L2)), and (3) language data $xi_{lang}$ (=$xi_{lang}$(L1-L2)) for specifying the language of the token.

The input data obtaining unit 1 then transmits the token data $xi0_{token}$(L1-L2) obtained as described above to the masking processing unit 12.

The control unit (not shown) generates a control signal CTL2 that instructs the masking processing unit 12 of the input data obtaining unit 1 to perform masking processing, and transmits the control signal CTL2 to the masking processing unit 12.

In accordance with the control signal CTL2, the masking processing unit 12 performs masking processing that replaces some tokens of the token data $xi0_{token}$(L1-L2) inputted from the first input data obtaining processing unit 11 with mask tokens (for example, sets data (token) obtained by setting a sequence of characters to artificial tokens "[MASK]"). The masking processing unit 12 transmits the masked token data to the first selector SEL1 as token data $xi_{token}$((L1-L2).mask). Note that data obtained by masking parallel translation data L1-L2 (parallel translation data obtained by pairing a sentence in the first language of other domains and a translated sentence in the second language of the sentence in the first language) is expressed as "(L1-L2) .mask" (the same applies hereafter).

Further, the first input data obtaining processing unit 11 transmits the position data $xi_{pos}$ (=$xi_{pos}$) $xi_{pos}$(L1-L2)) to the first selector SEL1, and transmits the language data $xi_{lang}$ (=$xi_{lang}$) (=$xi_{lang}$(L1-L2)) to the first selector SEL1.

In other words, the input data obtaining unit 1 transmits the data obtained as described above to the first selector SEL1 as data D2a (=D2a((L1-L2).mask)={$xi_{token}$((L1-L2).mask), $xi_{pos}$(L1-L2), $xi_{lang}$(L1-L2)}).

In accordance with the control signal CTL2, the correct data obtaining unit 13 generates, from the data D1, correct data D_correct (=D_correct(L1-L2)) used for training processing (training processing for XLM) in the input data embedding unit 2 and the XLM processing unit 3. The correct data obtaining unit 13 then transmits the generated data to the first output data evaluation unit 4 as correct data D_correct(L1-L2).

The control unit generates a selection signal sel1 that selects the terminal "0" of the first selector SEL1, and transmits the selection signal sel1 to the first selector SEL1.

The first selector SEL1 selects the terminal "0" in accordance with the selection signal sel1, and transmits the data D2a((L1-L2).mask) transmitted from the input data obtaining unit 1 as data D3((L1-L2).mask).mask) to the input data embedding unit 2.

The token embedding unit 21 of the input data embedding unit 2 receives the token data $xi_{token}$ (=$xi_{token}$((L1-L2) .mask)) included in the data D3((L1-L2).mask) and performs the same processing as described in the above MLM processing to obtain embedding representation data $xi'_{token}$ of the received token data $xi_{token}$.

The position embedding unit 22 of the input data embedding unit 2 receives the position data $xi_{pos}$ (=$xi_{pos}$(L1-L2)) included in the data D3((L1-L2).mask), performs the same processing as described in the above MLM processing to obtain embedding representation data $xi'_{pos}$ of the received position data $xi_{pos}$.

The language embedding unit 23 of the input data embedding unit 2 receives the language data $xi_{lang}$ (=$xi_{lang}$(L1-L2)) included in the data D3((L1-L2).mask), and performs the same processing as described in the above MLM processing to obtain embedding representation data $xi'_{lang}$ of the received language data $xi_{lang}$.

The input data embedding unit 2 transmits the embedding representation data obtained as described above to the XLM processing unit 3 as data D4((L1-L2).mask).

The XLM neural network model 31 of the XLM processing unit 3 performs XLM processing on the data D4((L1-L2).mask) transmitted from the input data embedding unit 2 to obtain data D5x (=D5x((L1-L2).mask)). The XLM processing unit 3 then transmits the data D5x((L1-L2).mask) obtained as described above to the first output data evaluation unit 4.

The first output data evaluation unit 4 receives the data D5x((L1-L2).mask) transmitted from the XLM processing unit 3 and the correct data D_correct(L1-L2) transmitted from the input data obtaining unit 1. The first output data evaluation unit 4 obtains the loss from the data D5x((L1-L2).mask) transmitted from the XLM processing unit 3 and its correct data D_correct(L1-L2).

<<T2: TLM Processing ((L2-L1).Mask->L2-L1)>>

Next, the data input interface IF1 of the pseudo parallel translation data generation apparatus 100 reads out the parallel translation data D0(L1-L2) of other domains from the parallel translation data storage unit DBp(L1-L2), and transmits data obtained by exchanging the first language data and the second language data that are each included in the read-out parallel translation data to the input data obtaining unit 1 as data D1(L2-L1). The first input data obtaining processing unit 11 of the input data obtaining unit 1 obtains, from the data D1 (parallel translation data D1(L2-L1)) (the data D1(L2-L1) obtained by pairing an other-domains second language sentence and its translated sentence in the first language), (1) token data $xi_{token}$ (=$xi_{token}$(L2-L1)), (2) position data $xi_{pos}$ (=$xi_{pos}$(L2-L1)), and (3) language data $xi_{lang}$ (=$xi_{lang}$(L2-L1)) for specifying the language of the token.

The input data obtaining unit 1 then transmits the token data $xi_{token}$(L2-L1) obtained as described above to the masking processing unit 12 as token data $xi0_{token}$(L2-L1).

The control unit (not shown) generates a control signal CTL2 that instructs the masking processing unit 12 of the input data obtaining unit 1 to perform masking processing, and transmits the control signal CTL2 to the masking processing unit 12.

In accordance with the control signal CTL2, the masking processing unit 12 performs masking processing that replaces some tokens of the token data $xi0_{token}$(L2-L1) inputted from the first input data obtaining processing unit 11 with mask tokens (for example, sets data (token) obtained by setting a sequence of characters to artificial tokens "[MASK]"). The masking processing unit 12 then transmits the masked token data to the first selector SEL1 as token data $xi_{token}$((L2-L1).mask). Note that data obtained by masking parallel translation data L2-L1 (parallel translation data obtained by pairing a sentence in the second language of other domains and a translated sentence in the first language of the sentence in the second language) is expressed as "(L2-L1).mask" (the same applies hereafter).

Further, the first input data obtaining processing unit 11 transmits the position data $xi_{pos}$ (=$xi_{pos}$) $xi_{pos}$(L2-L1)) to the first selector SEL1, and transmits the language data $xi_{lang}$ (=$xi_{lang}$) (=$xi_{lang}$(L2-L1)) to the first selector SEL1.

In other words, the input data obtaining unit 1 transmits the data obtained as described above to the first selector SEL1 as data D2a (=D2a((L2-L1).mask)={$xi_{token}$((L2-L1).mask), $xi_{pos}$(L2-L1), $xi_{lang}$(L2-L1)}).

The correct data obtaining unit 13 generates correct data D_correct (=D_correct(L2-L1)) used for training processing (training processing for XLM) in the input data embedding unit 2 and the XLM processing unit 3 from the data D1 in accordance with the control signal CTL2. The correct data obtaining unit 13 then transmits the generated data to the first output data evaluation unit 4 as correct data D_correct (L2-L1).

The control unit generates a selection signal sel1 that selects the terminal "0" of the first selector SEL1, and transmits the selection signal sel1 to the first selector SEL1.

The first selector SEL1 selects the terminal "0" in accordance with the selection signal sel1, and transmits the data D2a((L2-L1).mask) transmitted from the input data obtaining unit 1 to the input data embedding unit 2 as the data D3((L2-L1).mask).mask).

The token embedding unit 21 of the input data embedding unit 2 receives the token data $xi_{token}$ (=$xi_{token}$(L2-L1)) included in the data D3(L2-L1.mask), and performs the same processing as described in the above MLM processing to obtain embedding representation data $xi'_{token}$ of the received token data $xi_{token}$.

The position embedding unit 22 of the input data embedding unit 2 receives the position data $xi_{pos}$ (=$xi_{pos}$(L2-L1)) included in the data D3((L2-L1).mask), and performs the same processing as described in the above MLM processing to obtain embedding representation data $xi'_{pos}$ of the received position data $xi_{pos}$.

The language embedding unit 23 of the input data embedding unit 2 receives the language data $xi_{lang}$ (=$xi_{lang}$(L2-L1)) included in the data D3((L2-L1).mask), and performs the same processing as described in the above MLM processing to obtain embedding representation data $xi'_{lang}$ of the received language $xi_{lang}$.

The input data embedding unit 2 transmits the embedding representation data obtained as described above to the XLM processing unit 3 as data D4((L2-L1).mask).

The XLM neural network model 31 of the XLM processing unit 3 performs XLM processing on the data D4((L2-L1).mask) transmitted from the input data embedding unit 2 to obtain data D5x (=D5x((L2-L1).mask)). The XLM processing unit 3 then transmits the data D5x((L2-L1).mask) obtained as described above to the first output data evaluation unit 4.

The first output data evaluation unit 4 receives the data D5x((L2-L1).mask) transmitted from the XLM processing unit 3 and the correct data D_correct(L2-L1) transmitted from the input data obtaining unit 1. The first output data evaluation unit 4 obtains the loss from the data D5x((L2-L1).mask) transmitted from the XLM processing unit 3 and its correct data D_correct(L2-L1).

1.2.1.1C: Loss Calculation Processing

After performing the above processing, that is, (A) MLM processing (using four types of monolingual data) (step S111) and (B) TLM processing (using L1-L2 parallel translation data) (step S112), the first output data evaluation unit 4 performs loss calculation processing. Assuming that when the loss is calculated for every M sentences (M sentences, M is a natural number), the number of subwords included in the i-th sentence in the M sentences is $N_i$ ($1 \leq i \leq M$), and data corresponding to a j-th subword (j is a natural number satisfying $1 \leq j \leq N_i$) of the output data $D5x(X_{in})$ for the i-th sentence transmitted from the XLM processing unit 3 is $D5x((X_{in} \rightarrow X_{out}), j)$ ("$X_{in} \rightarrow X_{out}$" indicates that the input data is $X_{in}$ and the output data is $X_{out}$), the first output data evaluation unit 4 calculates loss from the data transmitted from the XLM processing unit 3 and the correct data as shown in the following formulas:

$$\text{Loss} = \text{Loss\_MLM} + \text{Loss\_TLM} \qquad \text{Formula 1}$$

$$\text{Loss\_MLM} = \qquad \text{Formula 2}$$
$$\sum_{i=1}^{M}\sum_{j=1}^{N_i} \text{loss}(D\_\text{correct}'(L1, i, j), D5x((L1.\text{mask} \rightarrow L1), i, j)) +$$

$$\sum_{i=1}^{M}\sum_{j=1}^{N_i} \text{loss}(D\_\text{correct}'(L2, i, j), D5x((L2.\text{mask} \rightarrow L2), i, j)) +$$

$$\sum_{i=1}^{M}\sum_{j=1}^{N_i} \text{loss}(D\_\text{correct}'(R1, i, j), D5x((R1.\text{mask} \rightarrow R1), i, j)) +$$

$$\sum_{i=1}^{M}\sum_{j=1}^{N_i} \text{loss}(D\_\text{correct}'(R2, i, j), D5x((R2.\text{mask} \rightarrow R2), i, j))$$

$$\text{Loss\_TLM} = \sum_{i=1}^{M}\sum_{j=1}^{N_i} \text{loss}(D\_\text{correct}'(L1 - L2, i, j), \qquad \text{Formula 3}$$
$$D5x(((L1 - L2).\text{mask} \rightarrow (L1 - L2)), i, j)) +$$
$$\sum_{i=1}^{M}\sum_{j=1}^{N_i} \text{loss}(D\_\text{correct}'(L2 - L1, i, j),$$
$$D5x(((L2 - L1).\text{mask} \rightarrow (L2 - L1)), i, j))$$

$$\text{loss}(p, q) = -\sum_{k=1}^{V} p(k)\log(q(k)) \qquad \text{Formula 4}$$

V: the size of subword vocabulary (the number of dimensions of vector representing each token (input data) sequence)

p: probability distribution (p(k) indicates the probability of the k-th (k-th dimension) element)

q: probability distribution (q(k) indicates the probability of the k-th (k-th dimension) element)

In the above formulas, D_correct'(x, i, j) is data (vector) obtained from the j-th subword in the i-th sentence of the correct data D_correct(x) by the first output data evaluation unit 4, and is a vector (n1—dimensional vector) with the same number of dimensions as the size of the subword vocabulary (=the number (let this number be n1) of dimensions of the vector representing each token (input data) sentence). For example, D_correct'(x, i, j) is a one-hot vector in which a value is "1" only in one of the n1 dimensions (only one value of the element corresponding to the correct subword among the elements of the n1 dimension vector is "1")), and the others are "0".

Further, in the above formula, for example, D5$x$ ((L1.mask->L1), j) is an n1—dimensional real number vector (a real number vector in which each dimensional data (each element of the vector) indicates the probability of the corresponding subword), is obtained by normalizing data with the softmax function (obtained by normalizing data so that the sum of values of all the elements included in the real number vector is "1"). D5$x$((L1.mask->L1), i, j) is output data from the XLM processing unit 3 when the input data is set to L1.mask, and is data corresponding to the j-th subword of the i-th sentence.

Also, in the above formula, loss(p, q) is a formula for obtaining a cross-entropy error, thereby allowing the difference between probability distributions (probability distributions p, q in the above formula) to be quantified.

In this way, the first output data evaluation unit 4 obtains the loss Loss by performing the processing corresponding to the above formulas.

1.2.1.1D: Parameter Update Processing

The first output data evaluation unit 4 generates data update ($\theta_{XLM}$) for updating the parameters $\theta_{XLM}$ of the XLM neural network model 31 of the XLM processing unit 3 based on the loss calculated on training data as described above (training loss), and then transmits the data update ($\theta_{XLM}$) to the XLM processing unit 3.

The XLM neural network model 31 of the XLM processing unit 3 updates the parameters $\theta_{XLM}$ based on the data update ($\theta_{XLM}$).

After updating the parameters of the XLM neural network model 31, the XLM neural network model 31 generates parameter update data update ($\theta_{emb}$) for updating parameters of the embedding layer (the token embedding unit 21, the position embedding unit 22, and the language embedding unit 23 of the input data embedding unit 2), and transmits the parameter update data update ($\theta_{emb}$) to the input data embedding unit 2.

The input data embedding unit 2 updates parameters of the embedding layer (corresponding to the token embedding unit 21, the position embedding unit 22, and the language embedding unit 23 of the input data embedding unit 2) based on the parameter update data update ($\theta_{emb}$). For example, the input data embedding unit 2 updates the elements (the values of the elements) of transformation matrices (e.g., matrices $W_{token}$, $W_{pos}$, and $W_{lang}$) based on the parameter update data update ($\theta_{emb}$).

The pseudo parallel translation data generation apparatus 100 repeatedly performs the above processing (the processing of loop 1 in FIG. 6) until a predetermined termination condition is satisfied. At this time, for example, the loss (test loss) calculated by the first output data evaluation unit 4 for adjustment data different from the data used for training is referred to as an evaluation value.

The pseudo parallel translation data generation apparatus 100 then terminates the training processing for XLM when the termination condition of the above processing (the processing of loop 1 in FIG. 6) is satisfied.

This completes the initialization of the input data embedding unit 2.

In other words, the parameters (for example, transformation matrices $W_{token}$, $W_{pos}$, and $W_{lang}$) for obtaining the embedding representation data that have been set when the XLM training processing has been completed are set to initial values (initial parameters) for training processing for the pseudo translation data generation NMT model (a model provided by using the input data embedding unit 2 (corresponding to the embedding layer) and the MT neural network model 51 of the machine translation processing unit 5).

In other words, in the pseudo parallel translation data generation apparatus 100, the state in which the parameters have been set at the time when the XLM training processing has been completed (the state of the input data embedding unit 2) is set to an initial state of training processing for the pseudo parallel translation data generation NMT model, and then the training processing for the pseudo parallel translation data generation NMT model is started.

Note that the termination condition of the loop processing (loop 1) in the flowchart in FIG. 6 is, for example, set as follows:

(1) Loop processing (loop 1) has been performed for the predetermined number of iterations.

(2) In the training processing for the cross-lingual language model (XLM), the evaluation value in the first output data evaluation unit 4 did not change by a certain amount (a predetermined value or more).

(3) In the training processing for the cross-lingual language model (XLM), the evaluation value in the first output data evaluation unit 4 fell below a predetermined value.

(4) In the training processing for the cross-lingual language model (XLM), the evaluation value in the first output data evaluation unit 4 was not updated a predetermined number of times.

If the above-described termination condition is satisfied, the pseudo parallel translation data generation apparatus 100 determines that the XLM training processing is completed, and then terminates the XLM training processing.

With the parameters set to the initial values as described above, the pseudo parallel translation data generation apparatus 100 performs training processing for the pseudo parallel translation data generation NMT model (a model provided by using the input data embedding unit 2 (corresponding to the embedding layer) and the MT neural network model 51 of the machine translation processing unit5), which will be described below.

1.2.1.2: Training Processing for Pseudo Parallel Translation Data Generation NMT Model Next, the pseudo parallel translation data generation apparatus 100 performs training processing for the pseudo parallel translation data generation NMT model (steps S120 to S126).

As shown in FIG. 6, the training processing for the pseudo parallel translation data generation NMT model for generating includes:

(A) auto-encoding processing (step S121);

(B) zero-shot round-trip machine translation processing (step S122);

(C) supervised machine translation processing (step S123);

(D) loss calculation processing (step S124); and (E) parameter ($\theta_{MT}$, $\theta_{emb}$) update processing (step S125).

As shown in the flowchart of FIG. 6, the processing of steps S121 to S125 is repeatedly performed until a termination condition is satisfied (loop processing (loop 2) S120 to S126 of FIG. 6).

1.2.1.2A: Auto-Encoding Processing

Figure 8:
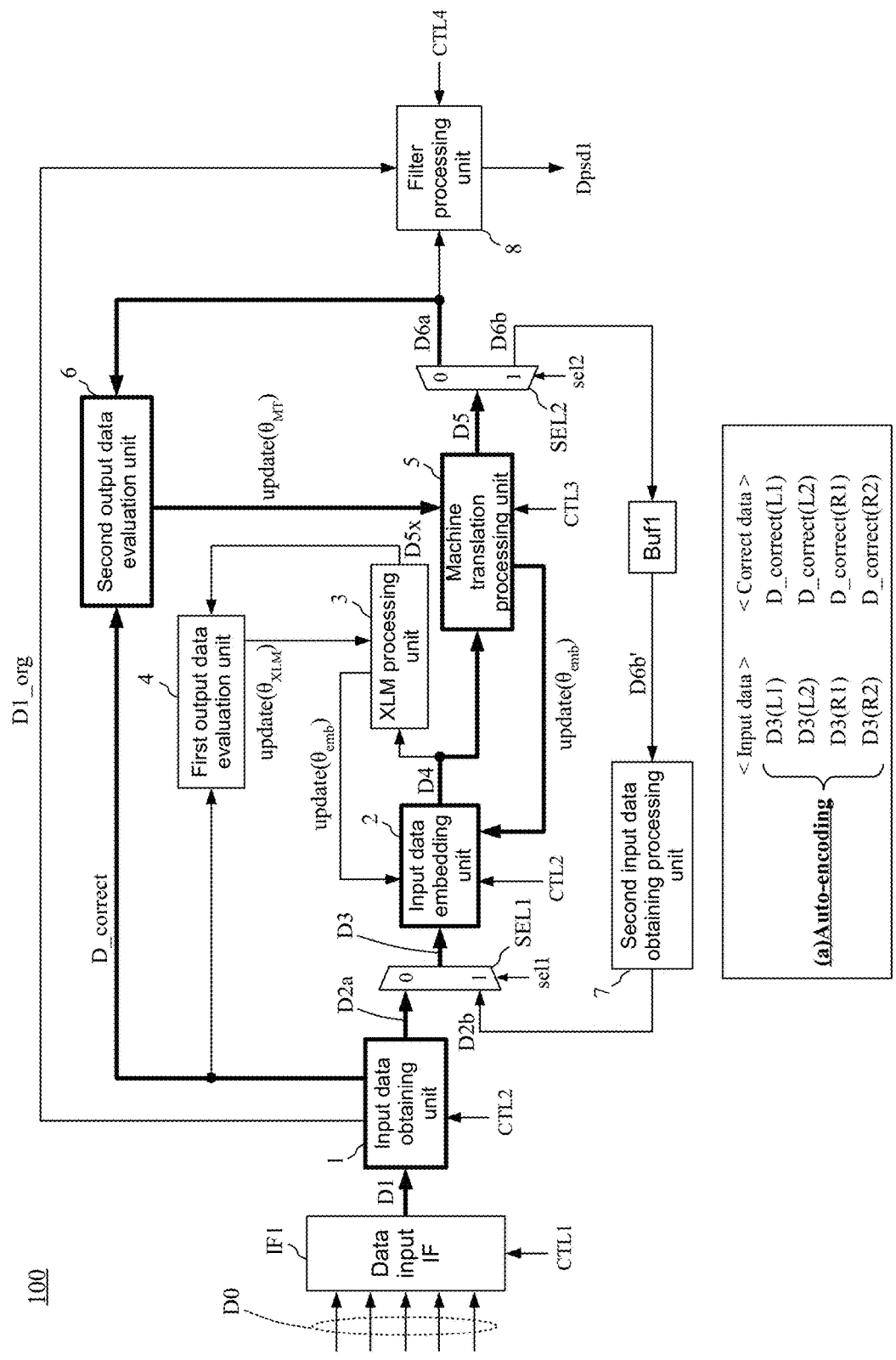
FIG. 8 is a diagram for explaining processing performed by the pseudo parallel translation data generation apparatus 100.

In the auto-encoding processing, the pseudo parallel translation data generation apparatus 100 performs training processing (training processing for pseudo parallel translation data generation NMT model) so that the same output data as an input data to the input data embedding unit 2 is outputted as shown in FIG. 8. In other words, in the auto-encoding processing, correct data is set to the same data as the input data. That is, in the auto-encoding processing, the pseudo parallel translation data generation apparatus 100 performs training processing (optimization processing for parameters in the auto-encoding processing) with data set as follows:

(1) Let an input to the input data embedding unit 2 be D3(L1), and let correct data of the output data D5(L1) of the machine translation processing unit 5 be D_correct(L1);

(2) Let an input to the input data embedding unit 2 be D3(L2), and let correct data of the output data D5(L2) of the machine translation processing unit 5 be D_correct(L2);

(3) Let an input to the input data embedding unit 2 be D3(R1), and let correct data of the output data D5(R1) of the machine translation processing unit 5 be D_correct(R1); and (4) Let an input to the input data embedding unit 2 be D3(R2), and let correct data of the output data D5(R2) of the machine translation processing unit 5 be D_correct(R2).

<<A1: Auto-Encoding Processing (L1->L1)>>

A case will be described where the input to the input data embedding unit 2 is D3(L1) and the correct data of the output data D5(L1) of the machine translation processing unit 5 is D_correct(L1).

The data input interface IF1 reads out the monolingual data D0(L1) of the other-domains first language from the first monolingual data storage unit DBm(L1), and transmits the read-out monolingual data as data D1 (=D1 (L1)) to the input data obtaining unit 1.

The first input data obtaining processing unit 11 of the input data obtaining unit 1 obtains, from the data D1 (data D1(L1) in the first language of other domains) (data D1(L1) forming a sentence in the first language of other domains), (1) token data $xi0_{token}$, (2) position data $xi_{pos}$ for specifying the position of the token, and (3) language data $xi_{lang}$ for specifying the language of the token.

The input data obtaining unit 1 then transmits the token data $xi0_{token}$ obtained as described above to the masking processing unit 12.

The control unit (not shown) generates a control signal CTL2 that instructs the masking processing unit 12 of the input data obtaining unit 1 not to perform masking processing, and transmits the control signal CTL2 to the masking processing unit 12.

The masking processing unit 12 transmits the token data $xi0_{token}$ received from the first input data obtaining processing unit 11 as the token data $xi_{token}$ to the first selector SEL1 in accordance with the control signal CTL2.

Also, the first input data obtaining processing unit 11 transmits the position data $xi_{pos}$, ($=xi_{pos}$(L1)) to the first selector SEL1, and transmits the language data $xi_{lang}$ ($=xi_{lang}$) ($=xi_{lang}$(L1)) to the first selector SEL1.

In other words, the input data obtaining unit 1 transmits the data obtained as described above to the first selector SEL1 as data D2a (=D2a(L1)={$xi_{token}$(L1), $xi_{pos}$(L1), $xi_{lang}$(L1)}).

In accordance with the control signal CTL2, the correct data obtaining unit 13 generates, from the data D1(=D1 (L1)), correct data D_correct (=D_correct(L1)) used for training processing for the pseudo parallel translation data generation NMT model (a model provided by using the input data embedding unit 2 (corresponding to the embedding layer) and the MT neural network model 51 of the machine translation processing unit 5). Specifically, the correct data obtaining unit 13 sets the same data as the input data D2a(L1) into the first selector SEL1 to the correct data D_correct(L1). The correct data obtaining unit 13 then transmits the correct data D_correct(L1) generated as described above to the second output data evaluation unit 6.

The control unit generates a selection signal sel1 that selects the terminal "0" of the first selector SEL1, and transmits the selection signal sel1 to the first selector SEL1.

The first selector SEL1 selects the terminal "0" in accordance with the selection signal sel1, and transmits the data D2a(L1) transmitted from the input data obtaining unit 1 to the input data embedding unit 2 as data D3(L1).

The token embedding unit 21 of the input data embedding unit 2 receives the token data $xi_{token}$ included in the data D3(L1), and performs the same processing as described in the processing for MLM to obtain embedding representation data $xi'_{token}$ of the received token data $xi_{token}$.

The position embedding unit 22 of the input data embedding unit 2 receives the position data $xi_{pos}$ included in the data D3(L1), and performs the same processing as described in the processing for MLM to obtain embedding representation data $xi'_{pos}$ of the received position data $xi_{pos}$.

The language embedding unit 23 of the input data embedding unit 2 receives the language data $xi_{lang}$ included in the data D3(L1), and performs the same processing as described in the processing for MLM to obtain embedding representation data $xi'_{lang}$ of the received language data $xi_{lang}$.

The input data embedding unit 2 transmits the embedding representation data obtained as described above to the machine translation processing unit 5 as data D4(L1).

The MT neural network model 51 of the machine translation processing unit 5 receives the data D4(L1) transmitted from the input data embedding unit 2 (embedding representation data D4(L1) (={$xi'_{token}$, $xi'_{pos}$, $xi'_{lang}$})) and the control signal CTL3 transmitted from the control unit.

The control unit generates a control signal CTL3 instructing to output L1 data from the MT neural network model 51 and transmits the control signal CTL3 to the machine translation processing unit 5.

The MT neural network model 51 performs machine translation processing on the data D4(L1) transmitted from the input data embedding unit 2 to obtain data D5(L1). Note that the MT neural network model 51 sets the type of output data to L1 (other domains, first language) in accordance with the control signal CTL3.

The MT neural network model 51 transmits the data D5(L1) obtained as described above to the second selector SEL2.

The control unit generates a selection signal sel2 that selects the terminal "0" of the second selector SEL2, and transmits the selection signal sel2 to the second selector SEL2.

The second selector SEL2 selects the terminal "0" in accordance with the selection signal sel2, and transmits the data D5 (data D5(L1)) transmitted from the machine translation processing unit 5 to the second output data evaluation unit 6 as data D6a (data D6a(L1)).

The second output data evaluation unit 6 receives, via the second selector SEL2, the data D5(L1) (=data D6a(L1)) transmitted from the machine translation processing unit 5 and the correct data D_correct(L1) transmitted from the input data obtaining unit 1. The second output data evaluation unit 6 obtains the loss from the data D5(L1) transmitted from the machine translation processing unit 5 and its correct data D_correct(L1).

<<A2: Auto-Encoding Processing (L2->L2)>>

Even when an input to the input data embedding unit 2 is D3(L2) and the correct data of the output data D5(L2) of the machine translation processing unit 5 is D_correct(L2), the pseudo parallel translation data generation apparatus 100 performs the same processing as above. In other words, the pseudo parallel translation data generation apparatus 100 performs the same processing as the above-described processing with D3(L1) replaced with D3(L2) and with the correct data D_correct(L1) replaced with the correct data D_correct(L2).

<<A3: Auto-Encoding Processing (R1->R1)>>

Even when an input to the input data embedding unit 2 is D3(R1) and the correct data of the output data D5(R1) of the machine translation processing unit 5 is D_correct(R1), the pseudo parallel translation data generation apparatus 100 performs the same processing as above. In other words, in the above processing, the pseudo parallel translation data generation apparatus 100 performs the same processing as the above-described processing with D3(L1) replaced with D3(R1) and with the correct data D_correct(L1) replaced with the correct data D_correct(R1).

<<A4: Auto-Encoding Processing (R2->R2)>>

Even when an input to the input data embedding unit 2 is D3(R2) and the correct data of the output data D5(R2) of the machine translation processing unit 5 is D_correct(R2), the pseudo parallel translation data generation apparatus 100 performs the same processing as above. In other words, in the above processing, the pseudo parallel translation data generation apparatus 100 performs the same processing as the above-described processing with D3(L1) replaced with D3(R2) and with the correct data D_correct(L1) replaced with the correct data D_correct(R2).

1.2.1.2B: Zero-Shot Round-Trip Machine Translation Processing

Figure 9:
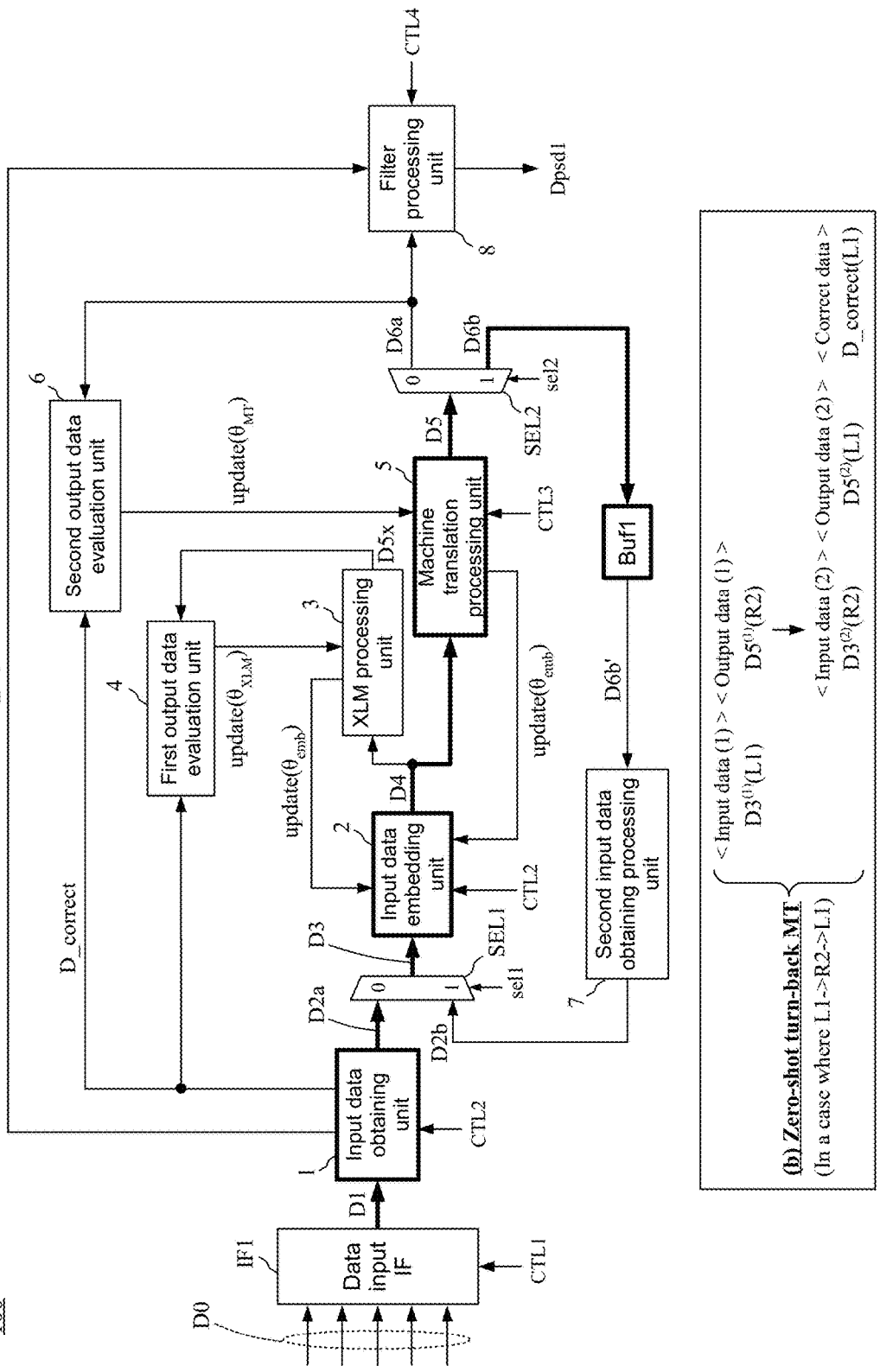
FIG. 9 is a diagram for explaining processing performed by the pseudo parallel translation data generation apparatus 100.
Figure 10:
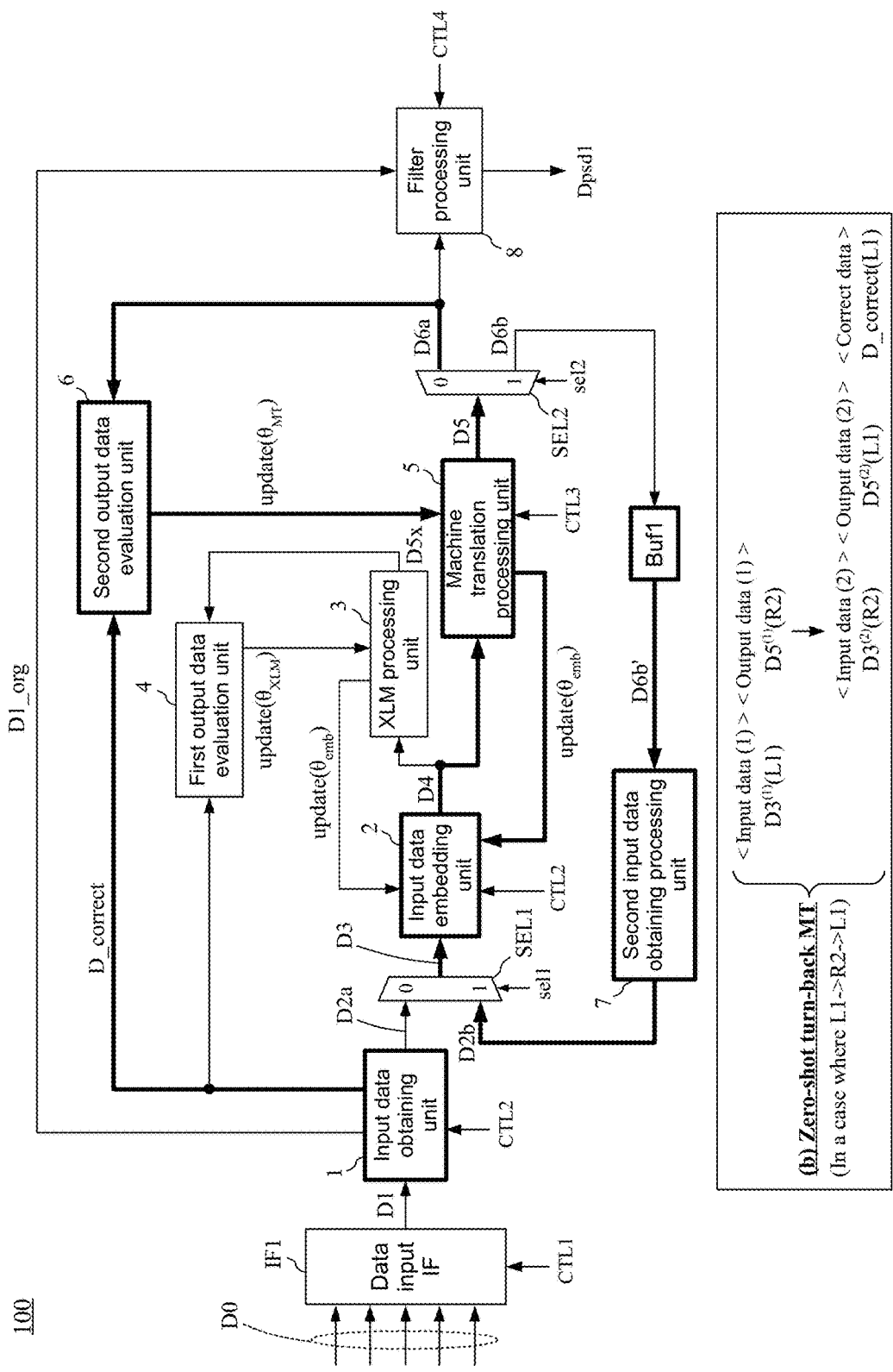
FIG. 10 is a diagram for explaining processing performed by the pseudo parallel translation data generation apparatus 100.

As shown in FIGS. 9 and 10, in zero-shot round-trip machine translation processing, the pseudo parallel translation data generation apparatus 100 performs (1) machine translation processing (machine translation processing by the pseudo parallel translation data generation NMT model (a model provided by using the input data embedding unit 2 (corresponding to the embedding layer) and the MT neural network model 51 of the machine translation processing unit 5) (first machine translation processing), outputs data in a language different from the language of the input data (zero-shot machine translation data), and (2) performs machine translation processing on the output data (machine translation processing by the pseudo parallel translation data NMT model) (second machine translation processing), thereby performing training processing so that the same data as the input data is outputted. In other words, in the zero-shot round-trip machine translation processing, the correct data is set to the same data as the input data.

Specifically, in the zero-shot round-trip machine translation processing, the pseudo parallel translation data generation apparatus 100 performs the following processes (1) to (6).

(1) L1->R2->L1:

In the first machine translation processing, the input to the input data embedding unit 2 is set to $D3^{(1)}(L1)$, in the second machine translation processing, the input to the input data embedding unit 2 is set to $D3^{(2)}(R2)$ (=$D5^{(1)}(R2)$), the output from the machine translation processing unit 5 is set to $D5^{(2)}(L1)$, and the correct data is set to D_correct(L1).

Note that the input data to the input data embedding unit 2 in the first machine translation processing is expressed as $D3^{(1)}(x)$, the output data from the input data embedding unit 2 is expressed as $D4^{(1)}(x)$, the input data to the input data embedding unit 2 in the second machine translation processing is expressed as $D3^{(2)}(x)$, and the output data from the input data embedding unit 2 is expressed as $D4^{(2)}(x)$ (the same applies hereafter).

(2) R1->L2->R1:

In the first machine translation processing, the input to the input data embedding unit 2 is set to $D3^{(1)}(R1)$, in the second machine translation processing, the input to the input data embedding unit 2 is set to $D3^{(2)}(L2)$ (=$D5^{(1)}(L2)$), the output from the machine translation processing unit 5 is set to $D5^{(2)}(L2)$, and the correct data is set to D_correct(R1).

(3) R1->R2->R1:

In the first machine translation processing, the input to the input data embedding unit 2 is set to $D3^{(1)}(R1)$, the output from the machine translation processing unit 5 is set to $D5^{(1)}(R2)$, in the second machine translation processing, the input to the input data embedding unit 2 is set to $D3^{(2)}(R2)$ (=$D5^{(1)}(R2)$), the output from the machine translation processing unit 5 is set to $D5^{(2)}(R2)$, and the correct data is set to D_correct(R1).

(4) L2->R1->L2:

In the first machine translation processing, the input to the input data embedding unit 2 is set to $D3^{(1)}(L2)$, the output from the machine translation processing unit 5 is set to $D5^{(1)}(R1)$, in the second machine translation processing, the input to the input data embedding unit 2 is set to $D3^{(2)}(R1)$ (=$D5^{(1)}(R1)$), the output from the machine translation processing unit 5 is set to $D5^{(2)}(L2)$, and the correct data is set to D_correct(L2).

(5) R2->L1->R2:

In the first machine translation processing, the input to the input data embedding unit 2 is set to $D3^{(1)}(R2)$, the output from the machine translation processing unit 5 is set to $D5^{(1)}(L1)$, in the second machine translation processing, the input to the input data embedding unit 2 is set to $D3^{(2)}(L1)$ (=$D5^{(1)}(L1)$), the output from the machine translation processing unit 5 is set to $D5^{(2)}(R2)$, and the correct data is set to D_correct(R2).

(6) R2->R1->R2:

In the first machine translation processing, the input to the input data embedding unit 2 is set to $D3^{(1)}(R2)$, the output from the machine translation processing unit 5 is set to $D5^{(1)}(R1)$, in the second machine translation processing, the input to the input data embedding unit 2 is set to $D3^{(2)}(R1)$ (=$D5^{(1)}(R1)$), the output from the machine translation processing unit 5 is set to $D5^{(2)}(R2)$, and correct data is set to D_correct(R1).

<<B1: Zero-Shot Round-Trip Machine Translation Processing (L1->R2->L1)>>

A case where the first input to the input data embedding unit 2 is $D3^{(1)}(L1)$, the first output from the machine translation processing unit 5 is $D5^{(1)}(R2)$, the second input to the input data embedding unit 2 is $D3^{(2)}(R2)$ (=$D5^{(1)}(R2)$), the second output from the machine translation processing unit 5 is $D5^{(2)}(L1)$, and the correct data is D_correct(L1) will be described.

The data input interface IF1 reads out the monolingual data D0(L1) of the first language of other domains from the first monolingual data storage unit DBm(L1), and transmits the read-out monolingual data as data D1 (=D1(L1)) to the input data obtaining unit 1.

The first input data obtaining processing unit 11 of the input data obtaining unit 1 obtains, from the data D1 (other-domains first language data D1(L1)) (data D1(L1) forming a sentence in the first language of other domains), (1) token data $xi0_{token}$, (2) position data $xi_{pos}$ for specifying the position of the token, and (3) language data $xi_{lang}$ for specifying the language of the token.

The input data obtaining unit 1 then transmits the token data $xi0_{token}$ obtained as described above to the masking processing unit 12.

The control unit (not shown) generates a control signal CTL2 that instructs the masking processing unit 12 of the input data obtaining unit 1 not to perform masking processing, and transmits the control signal CTL2 to the masking processing unit 12.

The masking processing unit 12 transmits the token data $xi0_{token}$ received from the first input data obtaining processing unit 11 as the token data $xi_{token}$ to the first selector SEL1 in accordance with the control signal CTL2.

Also, the first input data obtaining processing unit 11 transmits position data $xi_{pos}$ (=$xi_{pos}$(L1)) to the first selector SEL1, and transmits language data $xi_{lang}$ (=$xi_{lang}$(L1)) to the first selector SEL1.

In other words, the input data obtaining unit 1 transmits the data obtained as described above to the first selector SEL1 as data D2a (=D2a(L1)={$xi_{token}$(L1), $xi_{pos}$(L1), $xi_{lang}$(L1)}).

In accordance with the control signal CTL2, the correct data obtaining unit 13 generates, from the data D1 (=D1(L1)), correct data D_correct (=D_correct(L1)) used for training processing for the pseudo translation data generation NMT model (a model provided by using the input data embedding unit 2 (corresponding to the embedding layer) and the MT neural network model 51 of the machine translation processing unit 5). Specifically, the correct data obtaining unit 13 sets the same data as the input data D2a(L1) into the first selector SEL1 as the correct data D_correct(L1). The correct data obtaining unit 13 then transmits the correct data D_correct(L1) generated as described above to the second output data evaluation unit 6.

The control unit generates a selection signal sel1 that selects the terminal "0" of the first selector SEL1, and transmits the selection signal sel1 to the first selector SEL1.

The first selector SEL1 selects the terminal "0" in accordance with the selection signal sel1, and transmits the data D2a(L1) transmitted from the input data obtaining unit 1 to the input data embedding unit 2 as the data $D3^{(1)}$(L1).

The token embedding unit 21 of the input data embedding unit 2 receives the token data $xi_{token}$ included in the data $D3^{(1)}$(L1), and performs the same processing as the above-described processing in the MLM processing to obtain embedding representation data $xi'_{token}$ of the received token data $xi_{token}$.

The position embedding unit 22 of the input data embedding unit 2 receives the position data $xi_{pos}$ included in the data $D3^{(1)}$(L1), and performs the same processing as the above-described processing in the MLM processing to obtain embedding representation data $xi'_{pos}$ of the received position data $xi_{pos}$.

The language embedding unit 23 of the input data embedding unit 2 receives the language data $xi_{lang}$ included in the data $D3^{(1)}$(L1), and performs the same processing as the above-described processing in the MLM processing to obtain embedding representation data $xi'_{lang}$ of the received language data $xi_{lang}$.

The input data embedding unit 2 transmits the embedding representation data obtained as described above to the machine translation processing unit 5 as data $D4^{(1)}$(L1).

The MT neural network model 51 of the machine translation processing unit 5 receives the data $D4^{(1)}$(L1) (embedding representation data $D4^{(1)}$(L1) (={$xi'_{token}$, $xi'_{pos}$, $xi'_{lang}$})) transmitted from the input data embedding unit 2 and the control signal CTL3 transmitted from the control unit.

The control unit generates a control signal CTL3 that instructs the MT neural network model 51 to output the data of R2, and transmits the control signal CTL3 to the machine translation processing unit 5.

The MT neural network model 51 performs machine translation processing on the data $D4^{(1)}$(L1) transmitted from the input data embedding unit 2 to obtain data $D5^{(1)}$(R2). Note that the MT neural network model 51 sets the type of output data to R2 (adaptation target domain, second language) in accordance with the control signal CTL3.

The MT neural network model 51 transmits the data $D5^{(1)}$(R2) obtained above to the second selector SEL2.

The control unit generates a selection signal sel2 that selects the terminal "1" of the second selector SEL2, and transmits the selection signal sel2 to the second selector SEL2.

The second selector SEL2 selects the terminal "1" in accordance with the selection signal sel2, and the data D5 (data $D5^{(1)}$(R2)) transmitted from the machine translation processing unit 5 is stored in the first buffer Buf1 as data D6b (data $D6b^{(1)}$(R2)) (see FIG. 9).

Next, the second input data obtaining processing unit 7 receives the data D6b' (data $D6b^{(1)}$(R2)) transmitted from the first buffer Buf1) and obtains (generates) data (={$xi_{token}$(R2), $xi_{pos}$(R2), $xi_{lang}$(R2)}) to be inputted into the input data embedding unit 2. The second input data obtaining processing unit 7 then transmits the obtained data to the first selector SEL1 as data D2b (data $D2b^{(2)}$(R2) (={$xi_{token}$(R2), $xi_{pos}$(R2), $xi_{lang}$(R2)})).

The control unit generates a selection signal sel1 for selecting the terminal "1" of the first selector SEL1, and transmits the selection signal sel1 to the first selector SEL1.

The first selector SEL1 selects the terminal "1" in accordance with the selection signal sel1, and transmits the data $D2b^{(2)}$(R2) transmitted from the second input data obtaining processing unit 7 to the input data embedding unit 2 as the data $D3^{(2)}$(R2).

The token embedding unit 21 of the input data embedding unit 2 receives the token data $xi_{token}$ included in the data $D3^{(2)}$(R2), and performs the same processing as the above-described processing in the MLM processing to obtain embedding representation data $xi'_{token}$ of the input token data $xi_{token}$.

The position embedding unit 22 of the input data embedding unit 2 receives the position data $xi_{pos}$ included in the data $D3^{(2)}$(R2), and performs the same processing as the above-described processing in the MLM processing to obtain embedding representation data $xi'_{pos}$ of the received position data $xi_{pos}$.

The language embedding unit 23 of the input data embedding unit 2 receives the language data $xi_{lang}$ included in the data $D3^{(2)}$(R2), and performs the same processing as the above-described processing in the MLM processing to obtain embedding representation data $xi'_{lang}$ of the received language data $xi_{lang}$.

The input data embedding unit 2 transmits the embedding representation data obtained as described above to the machine translation processing unit 5 as data $D4^{(2)}$(R2).

The MT neural network model 51 of the machine translation processing unit 5 receives the data $D4^{(2)}(R2)$ (embedding representation data $D4^{(2)}(R2)$ (={$xi'_{token}$, $xi'_{pos}$, $xi'_{lang}$})) transmitted from the input data embedding unit 2 and the control signal CTL3 transmitted from the control unit.

The control unit generates a control signal CTL3 instructing to output L1 data from the MT neural network model 51 and transmits the control signal CTL3 to the machine translation processing unit 5.

The MT neural network model 51 performs machine translation processing on the data $D4^{(2)}(R2)$ transmitted from the input data embedding unit 2 to obtain data $D5^{(2)}(L1)$. Note that the MT neural network model 51 sets the type of output data to L1 (other-domains, first language) in accordance with the control signal CTL3.

The MT neural network model 51 transmits the data $D5^{(2)}(L1)$ obtained above to the second selector SEL2.

The control unit generates a selection signal sel2 that selects the terminal "0" of the second selector SEL2, and transmits the selection signal sel2 to the second selector SEL2.

The second selector SEL2 selects the terminal "0" in accordance with the selection signal sel2, and transmits the data $D5^{(2)}(L1)$ transmitted from the machine translation processing unit 5 to the second output data evaluation unit 6 as data $D6a^{(2)}(L1)$.

The second output data evaluation unit 6 receives the data $D6a^{(2)}(L1)$ (=$D5^{(2)}(L1)$)) transmitted from the second selector SEL2 and the correct data D_correct(L1) transmitted from the input data obtaining unit 1. The second output data evaluation unit 6 obtains the loss from the data $D5^{(2)}(L1)$ transmitted from the machine translation processing unit 5 and its correct data D_correct(L1).

<<B2: Zero-Shot Round-Trip Machine Translation Processing (R1->L2->R1)>>

The pseudo parallel translation data generation apparatus 100 performs the same processing as above for a case where the first input to the input data embedding unit 2 is $D3^{(1)}(R1)$, the first output from the machine translation processing unit 5 is $D5^{(1)}(L2)$, the second input to the input data embedding unit 2 is $D3^{(2)}(L2)$ (=$D5^{(1)}(L2)$), the second output from the machine translation processing unit 5 is $D5^{(2)}(R1)$, and the correct data is D_correct(R1).

In other words, the pseudo parallel translation data generation apparatus 100 performs the same processing as the above-described processing with the first input $D3^{(1)}(L1)$ into the input data embedding unit 2 replaced with $D3^{(1)}(R1)$, with the output $D5^{(1)}(R2)$ replaced with $D5^{(1)}(L2)$, with the second input $D3^{(2)}(R2)$ into the input data embedding unit 2 replaced with $D3^{(2)}(L2)$, with the output $D5^{(2)}(L1)$ from the machine translation processing unit 5 replaced with $D5^{(2)}(R1)$, and with the correct data D_correct(L1) replaced with the correct data D_correct(R1) in the above processing.

<<B3: Zero-Shot Round-Trip Machine Translation Processing (R1->R2->R1)>>

The pseudo parallel translation data generation apparatus 100 performs the same processing as above for a case where the first input to the input data embedding unit 2 is $D3^{(1)}(R1)$, the first output from the machine translation processing unit 5 is $D5^{(1)}(R2)$, the second input to the input data embedding unit 2 is $D3^{(2)}(R2)$ (=$D5^{(1)}(R2)$), the second output from the machine translation processing unit 5 is $D5^{(2)}(R1)$, and the correct data is D_correct(R1).

In other words, the pseudo parallel translation data generation apparatus 100 performs the same processing as the above-described processing with the first input $D3^{(1)}(L1)$ into the input data embedding unit 2 replaced with $D3^{(1)}(R1)$, with the output $D5^{(1)}(R2)$ set to the same data $D5^{(1)}(R2)$, with the second input $D3^{(2)}(R2)$ into the input data embedding unit 2 set to the same data $D3^{(2)}(R2)$, with the output $D5^{(2)}(L1)$ from the machine translation processing unit 5 replaced with $D5^{(2)}(R1)$, and with the correct data D_correct(L1) replaced with the correct data D_correct(R1).

<<B4: Zero-Shot Round-Trip Machine Translation Processing (L2->R1->L2)>>

The pseudo parallel translation data generation apparatus 100 performs the same processing as above for a case where the first input to the input data embedding unit 2 is $D3^{(1)}(L2)$, the first output from the machine translation processing unit 5 is $D5^{(1)}(R1)$, the second input to the input data embedding unit 2 is $D3^{(2)}(R1)$ (=$D5^{(1)}(R1)$), the second output from the machine translation processing unit 5 is $D5^{(2)}(L2)$, and the correct data is D_correct(L2).

In other words, the pseudo parallel translation data generation apparatus 100 performs the same processing as the above-described processing with the first input $D3^{(1)}(L1)$ into the input data embedding unit 2 replaced with $D3^{(1)}(L2)$, with the output $D5^{(1)}(R2)$ from the machine translation processing unit 5 replaced with $D5^{(1)}(R1)$, with the second input $D3^{(2)}(R2)$ into the input data embedding unit 2 replaced with $D3^{(2)}(R1)$, with the output $D5^{(2)}(L1)$ from the machine translation processing unit 5 replaced with $D5^{(2)}(L2)$, and with the correct data D_correct(L1) replaced with the correct data D_correct(L2) in the above processing.

<<B5: Zero-Shot Round-Trip Machine Translation Processing (R2->L1->R2)>>

The pseudo parallel translation data generation apparatus 100 performs the same processing as above for a case where the first input to the input data embedding unit 2 is $D3^{(1)}(R2)$, the first output from the machine translation processing unit 5 is $D5^{(1)}(L1)$, the second input to the input data embedding unit 2 is $D3^{(2)}(L1)$ (=$D5^{(1)}(L1)$), the second output from the machine translation processing unit 5 is $D5^{(2)}(R2)$, and the correct data is D_correct(R2).

In other words, the pseudo parallel translation data generation apparatus 100 performs the same processing as the above-described processing with the first input $D3^{(1)}(L1)$ into the input data embedding unit 2 replaced with $D3^{(1)}(R2)$, with the output $D5^{(1)}(R2)$ from the machine translation processing unit 5 replaced with $D5^{(1)}(L1)$, with the second input $D3^{(2)}(R2)$ into the input data embedding unit 2 replaced with $D3^{(2)}(L1)$, with the output $D5^{(2)}(L1)$ from the machine translation processing unit 5 replaced with $D5^{(2)}(R2)$, and with the correct data D_correct(L1) replaced with the correct data D_correct(R2) in the above processing.

<<B6: Zero-Shot Return Machine Translation Processing (R2->R1->R2)>>

The pseudo parallel translation data generation apparatus 100 performs the same processing as above for a case where the first input to the input data embedding unit 2 is $D3^{(1)}(R2)$, the first output from the machine translation processing unit 5 is $D5^{(1)}(R1)$, the second input to the input data embedding unit 2 is $D3^{(2)}(R1)$ (=$D5^{(1)}(R1)$), the second output from the machine translation processing unit 5 is $D5^{(2)}(R2)$, and the correct data is D_correct(R2).

In other words, the pseudo parallel translation data generation apparatus 100 performs the same processing as the above-described processing with the first input $D3^{(1)}(L1)$ into the input data embedding unit 2 replaced with $D3^{(1)}(R2)$, with the output $D5^{(1)}(R2)$ from the machine translation processing unit 5 replaced with $D5^{(1)}(R1)$, with the second input $D3^{(2)}(R2)$ into the input data embedding unit 2 replaced with $D3^{(2)}(R1)$, with the output $D5^{(2)}(L1)$ from the machine translation processing unit 5 replaced with $D5^{(2)}$ (R2), and with the correct data D_correct(L1) replaced with the correct data D_correct(R2) in the above processing.

As described above, the pseudo parallel translation data generation apparatus 100 performs zero-shot round-trip machine translation processing for the following six patterns (cases with six types).

(1) L1->R2->L1
(2) R1->L2->R1
(3) R1->R2->R1
(4) L2->R1->L2
(5) R2->L1->R2
(6) R2->R1->R2

1.2.1.2C: Supervised Machine Translation Processing

Figure 11:
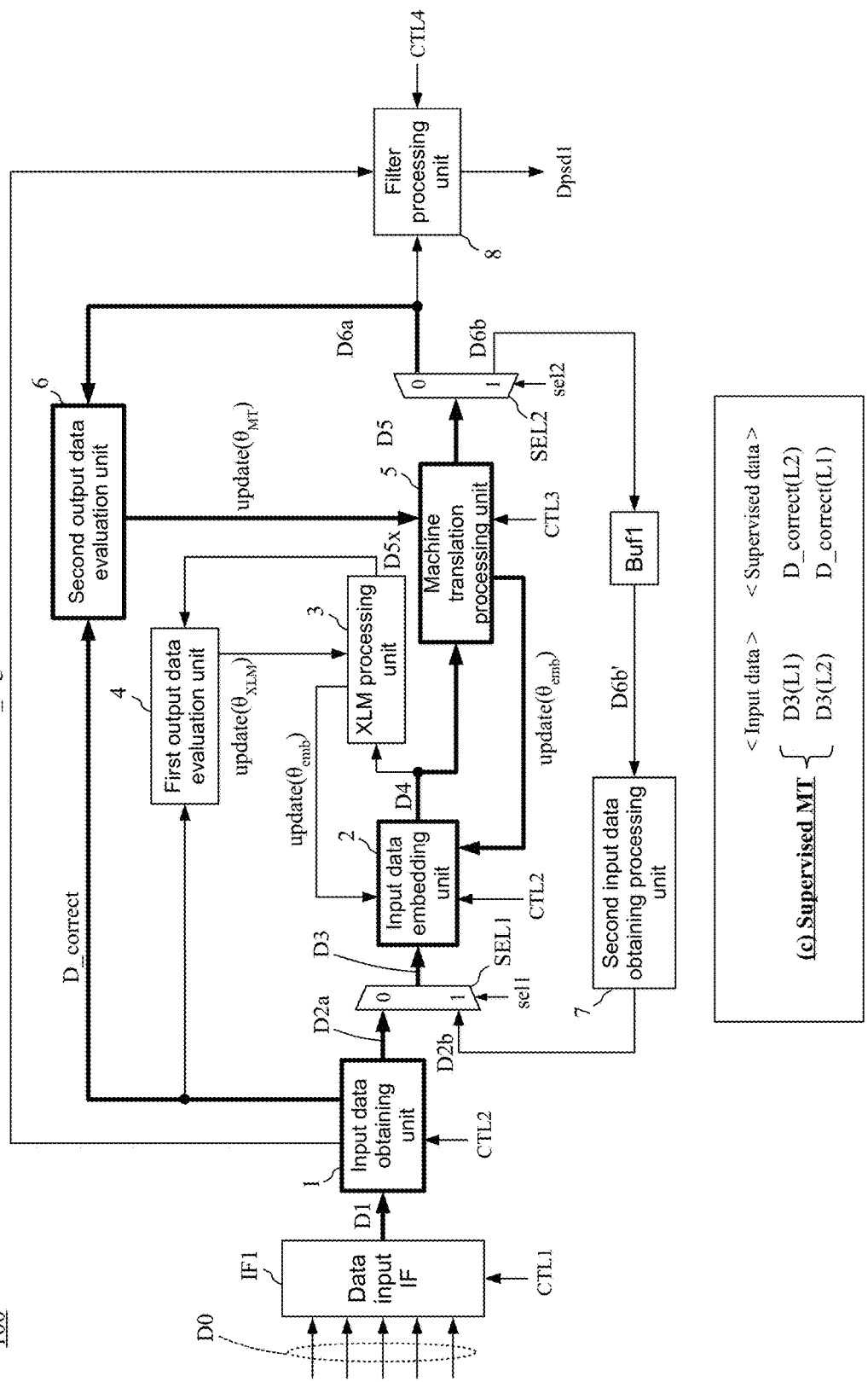
FIG. 11 is a diagram for explaining processing performed by the pseudo parallel translation data generation apparatus 100.

For supervised machine translation processing, the pseudo parallel translation data generation apparatus 100, as shown in FIG. 11, sets one language data included in the parallel translation data D0(L1-L2) obtained from the parallel translation data storage unit DBp(L1-L2) as the input data into the input data embedding unit 2, and then performs training processing so that parallel translation data corresponding to the input data is outputted. In other words, in supervised machine translation processing, the correct data is set based on the parallel translation data D0(L1-L2) read from the parallel translation data storage unit DBp(L1-L2).

In supervised machine translation processing,
(1) the pseudo parallel translation data generation apparatus 100 sets the input into the XLM processing unit 3 to D3(L1) and sets the correct data to D_correct(L2), or
(2) the pseudo parallel translation data generation apparatus 100 sets the input into the XLM processing unit 3 to D3 (L2), and sets the correct data to D_correct(L1).

The pseudo parallel translation data generation apparatus 100 then performs training processing (parameter optimization processing) for the pseudo parallel translation data generation NMT model (a model provided by using the input data embedding unit 2 (corresponding to the embedding layer) and the MT neural network model 51 of the machine translation processing unit 5).

<<C1: Supervised Machine Translation Processing (L1->L2)>>

A case will be described where the input to the input data embedding unit 2 is D3(L1) and the correct data is D_correct (L2).

The data input interface IF1 reads out the parallel translation data D0(L1-L2) of other domains from the parallel translation data storage unit DBp(L1-L2), and transmits the read-out parallel translation data to the input data obtaining unit 1 as data D1(L1-L2).

The first input data obtaining processing unit 11 of the input data obtaining unit 1 extracts first language data as data D1(L1) from data D1 (other-domains parallel translation data D1(L1-L2)), and then obtains, from the first language data (language data) D1(L1) (data D1(L1) forming a sentence of other domains in first language), (1) token data $xi0_{token}$, (2) position data for specifying the position of the token Data $xi_{pos}$, and (3) language data $xi_{lang}$ for specifying the language of the token.

The input data obtaining unit 1 then transmits the token data $xi0_{token}$ obtained as described above to the masking processing unit 12.

The control unit (not shown) generates a control signal CTL2 that instructs the masking processing unit 12 of the input data obtaining unit 1 not to perform masking processing, and transmits the control signal CTL2 to the masking processing unit 12.

The masking processing unit 12 transmits the token data $xi0_{token}$ received from the first input data obtaining processing unit 11 as token data $xi_{token}$ to the first selector SEL1 in accordance with the control signal CTL2.

Also, the first input data obtaining processing unit 11 transmits the position data $xi_{pos}$ ($=xi_{pos}(L1)$) to the first selector SEL1, and transmits the language data $xi_{lang}$ ($=xi_{lang}(L1)$) to the first selector SEL1.

In other words, the input data obtaining unit 1 transmits the data obtained as described above to the first selector SEL1 as data D2a ($=D2a(L1)=\{xi_{token}(L1), xi_{pos}(L1), xi_{lang}(L1)\}$).

In accordance with the control signal CTL2, the correct data obtaining unit 13 extracts data in the second language from the data D1 (other-domains parallel translation data D1(L1-L2)) as D1(L2) (data corresponding to parallel translation data of the data D1(L1) (other-domains first language data) extracted from the other-domains parallel translation data D1(L1-L2)), and then generates correct data D_correct ($=D\_correct(L2)$) used for training processing for pseudo parallel translation data generation NMT model from the extracted data D1(L2). The correct data obtaining unit 13 then transmits the correct data D_correct ($=D\_correct(L2)$) to the second output data evaluation unit 6.

The control unit generates a selection signal sel1 that selects the terminal "0" of the first selector SEL1, and transmits the selection signal sel1 to the first selector SEL1.

The first selector SEL1 selects the terminal "0" in accordance with the selection signal sel1, and transmits the data D2a(L1) transmitted from the input data obtaining unit 1 to the input data embedding unit 2 as data D3(L1).

The token embedding unit 21 of the input data embedding unit 2 receives the token data $xi_{token}$ included in the data D3(L1), and performs the same processing as the above-described processing in the MLM processing to obtain embedding representation data $xi'_{token}$ of the received token data $xi_{token}$.

The position embedding unit 22 of the input data embedding unit 2 receives the position data $xi_{pos}$ included in the data D3(L1), and performs the same processing as the above-described processing in the MLM processing to obtain embedding representation data $xi'_{pos}$ of the received position data $xi_{pos}$.

The language embedding unit 23 of the input data embedding unit 2 receives the language data $xi_{lang}$ included in the data D3(L1), and performs the same processing as the above-described processing in the MLM processing to obtain embedding representation data $xi'_{lang}$ of the received language data $xi_{lang}$.

The input data embedding unit 2 transmits the embedding representation data obtained as described above to the machine translation processing unit 5 as data D4(L1).

The MT neural network model 51 of the machine translation processing unit 5 receives the embedding representation data D4(L1) ($=\{xi'_{token}, xi'_{pos}, xi'_{lang}\}$) transmitted from the input data embedding unit 2, and the control signal CTL3 transmitted from the control unit.

The control unit generates a control signal CTL3 instructing to output L2 data from the MT neural network model 51 and transmits the control signal CTL3 to the machine translation processing unit 5.

The MT neural network model 51 performs machine translation processing on the data D4(L1) transmitted from the input data embedding unit 2 to obtain data D5(L2). Note that the MT neural network model 51 sets the type of output data to L2 (other domains, second language) in accordance with the control signal CTL3.

The MT neural network model 51 transmits the data D5(L2) obtained above to the second selector SEL2.

The control unit generates a selection signal sel2 that selects the terminal "0" of the second selector SEL2, and transmits the selection signal sel2 to the second selector SEL2.

The second selector SEL2 selects the terminal "0" in accordance with the selection signal sel2, and transmits the data D5 (data D5(L2)) transmitted from the machine translation processing unit 5 to the second output data evaluation unit 6 as data D6a (data D6a(L2)).

The second output data evaluation unit 6 receives the data D5(L2) (=data D6a(L2)) transmitted from the machine translation processing unit 5 via the second selector SEL2 and the correct data D_correct(L2) transmitted from the input data obtaining unit 1. The second output data evaluation unit 6 obtains the loss from the data D5(L2) transmitted from the machine translation processing unit 5 and its correct data D_correct(L2).

<<C2: Supervised Machine Translation Processing (L2->L1)>>

Even when the input to the input data embedding unit 2 is D3(L2) and the correct data is D_correct(L1), the pseudo parallel translation data generation apparatus 100 performs the same processing as above. In other words, the pseudo parallel translation data generation apparatus 100 performs the same prospect as the above-described processing with D3(L1) replaced with D3(L2), and with the correct data D_correct(L2) replaced with the correct data D_correct(L1) in the above processing.

1.2.1.2D: Loss Calculation Processing

After the above processing, that is,
(A) auto-encoding processing (step S121),
(B) zero-shot round-trip machine translation processing (step S122), and
(C) supervised machine translation processing (step S123) are performed, the second output data evaluation unit 6 performs loss calculation processing.

Assuming that when the loss is calculated for every M sentences (M sentences, M is a natural number), the number of subwords included in the i-th sentence in the M sentences is $N_i$ ($1 \leq i \leq M$), and data corresponding to a j-th subword (j is a natural number satisfying $1 \leq j \leq N_i$) of the output data $D5(X_{in})$ for the i-th sentence transmitted from the machine translation processing unit 5 is $D5((X_{in} \to X_{out}), i, j)$ ("$X_{in} \to X_{out}$" indicates that the input data is $X_{in}$ and the output data is $X_{out}$) or $D5((X_{in} \to X_m \to X_{out}), i, j)$ ("$X_{in} \to X_m \to X_{out}$" indicates that the input data is $X_{in}$, the first output data is $X_m$, the second input is $X_m$, and the second output is $X_{out}$), the second output data evaluation unit 6 calculates loss from the data transmitted from the machine translation processing unit 5 and the correct data as shown in the following formulas:

$$\text{Loss} = \text{Loss\_self} + \text{Loss\_zero} + \text{Loss\_mt} \quad \text{Formula 5}$$

$$\text{Loss\_self} = \quad \text{Formula 6}$$

$$\sum_{i=1}^{M}\sum_{j=1}^{N_i} \text{loss}(D\_correct'(L1, i, j), D5((L1 \to L1), i, j)) +$$

$$\sum_{i=1}^{M}\sum_{j=1}^{N_i} \text{loss}(D\_correct'(L2, i, j), D5((L2 \to L2), i, j)) +$$

$$\sum_{i=1}^{M}\sum_{j=1}^{N_i} \text{loss}(D\_correct'(R1, i, j), D5((R1 \to R1), i, j)) +$$

$$\sum_{i=1}^{M}\sum_{j=1}^{N_i} \text{loss}(D\_correct'(R2, i, j), D5((R2 \to R2), i, j))$$

$$\text{Loss\_zero} = \quad \text{Formula 7}$$

$$\sum_{i=1}^{M}\sum_{j=1}^{N_i} \text{loss}(D\_correct'(L1, i, j), D5((L1 \to R2 \to L1), i, j)) +$$

$$\sum_{i=1}^{M}\sum_{j=1}^{N_i} \text{loss}(D\_correct'(R1, i, j), D5((R1 \to L2 \to R1), i, j)) +$$

$$\sum_{i=1}^{M}\sum_{j=1}^{N_i} \text{loss}(D\_correct'(R1, i, j), D5((R1 \to R2 \to R1), i, j)) +$$

$$\sum_{i=1}^{M}\sum_{j=1}^{N_i} \text{loss}(D\_correct'(L2, i, j), D5((L2 \to R1 \to L2), i, j)) +$$

$$\sum_{i=1}^{M}\sum_{j=1}^{N_i} \text{loss}(D\_correct'(R2, i, j), D5((R2 \to L1 \to R2), i, j)) +$$

$$\sum_{i=1}^{M}\sum_{j=1}^{N_i} \text{loss}(D\_correct'(R2, i, j), D5((R2 \to R1 \to R2), i, j))$$

$$\text{Loss\_mt} = \quad \text{Formula 8}$$

$$\sum_{i=1}^{M}\sum_{j=1}^{N_i} \text{loss}(D\_correct'(L2, i, j), D5((L1 \to L2), i, j)) +$$

$$\sum_{i=1}^{M}\sum_{j=1}^{N_i} \text{loss}(D\_correct'(L1, i, j), D5((L2 \to L1), i, j))$$

$$\text{loss}(p, q) = -\sum_{k=1}^{V} p(k)\log(q(k)) \quad \text{Formula 9}$$

V: the size of subword vocabulary (the number of dimensions of vector representing each token (input data) sequence)

p: probability distribution (p(k) indicates the probability of the k-th (k-th dimension) element)

q: probability distribution (q(k) indicates the probability of the k-th (k-th dimension) element)

In the above formulas, D_correct'(x, i, j) is data (vector) obtained from the j-th subword in the i-th sentence of the correct data D_correct(x) by the second output data evaluation unit 6, and is a vector (n1—dimensional vector) with the same number of dimensions as the size of the subword vocabulary (=the number (let this number be n1) of dimensions of the vector representing each token (input data) sentence). For example, D_correct'(x, j) is a one-hot vector in which a value is "1" only in one of the n1 dimensions (only one value of the element corresponding to the correct subword among the elements of the n1 dimension vector is "1")), and the others are "0".

Further, in the above formula, for example, D5 ((L1->L2), i, j) is an n1—dimensional real number vector (a real number vector in which each dimensional data (each element of the vector) indicates the probability of the corresponding subword), is obtained by normalizing data with the softmax function (obtained by normalizing data so that the sum of values of all the elements included in the real number vector is "1"). D5((L1->L2), i, j) is output data from the machine translation processing unit 5 when the input data is set to L1 and the type of the output data from the machine translation processing unit 5 is set to L2, and is data corresponding to the j-th subword of the i-th sentence.

In the above formulas, for example, D5((L1->R2->L1), i, j) indicates the type of input data and the type of translation processing result data (output data) in a clear manner; (L1->R2->L1) indicates that data with such notation is data obtained in a case where, in the first processing, data of type L1 is outputted as data of type R2, in the second processing, the first output is set to an input for the second processing, and data of type L1 is outputted.

Also, in the above formula, loss(p, q) is a formula for obtaining a cross-entropy error, thereby allowing the difference between probability distributions (probability distributions p, q in the above formula) to be quantified.

In this way, the second output data evaluation unit 6 obtains the loss Loss by performing processing corresponding to the above formulas.

1.2.1.2E: Parameter Update Processing

The second output data evaluation unit 6 generates data update ($\theta_{MT}$) for updating the parameters $\theta_{MT}$ of the MT neural network model 51 of the XLM processing unit 3 based on the loss (training loss) calculated with the predetermined training data as described above, and then transmits the data update ($\theta_{MT}$) to the machine translation processing unit 5.

The MT neural network model 51 of the machine translation processing unit 5 updates the parameters $\theta_{MT}$ based on the data update ($\theta_{MT}$).

In addition, after updating the parameters of the MT neural network model 51, the MT neural network model 51 generates parameter update data update ($\theta_{emb}$) for updating parameters of the embedding layer (corresponding to the token embedding unit 21, the position embedding unit 22, and the language embedding unit 23 of the input data embedding unit 2), and then transmits the parameter update data update ($\theta_{emb}$) to the input data embedding unit 2.

Based on the parameter update data update ($\theta_{emb}$), the input data embedding unit 2 updates the parameters of the embedding layer (corresponding to the token embedding unit 21, the position embedding unit 22, and the language embedding unit 23 of the input data embedding unit 2). For example, the input data embedding unit 2 updates the elements (the values of the elements) of transformation matrices (e.g., matrices $W_{token}$, $W_{pos}$, and $W_{lang}$) based on the parameter update data update ($\theta_{emb}$).

The pseudo parallel translation data generation apparatus 100 repeatedly performs the above processing (the processing of loop 2 in FIG. 6) until a predetermined termination condition is satisfied. At this time, for example, the loss (test loss) calculated by the second output data evaluation unit 6 for adjustment data different from the data used for training is referred to as an evaluation value.

The pseudo parallel translation data generation apparatus 100 then terminates the training processing for the pseudo parallel translation data generation NMT model when the termination condition of the above processing (the processing of loop 2 in FIG. 6) is satisfied.

The termination condition of the loop processing (loop 2) in the flowchart of FIG. 6 is set as follows, for example.
(1) Loop processing (loop 2) has been performed for a predetermined number of iterations.
(2) In the training processing for the pseudo parallel translation data generation NMT model, the evaluation value in the second output data evaluation unit 6 did not change by a certain amount (a predetermined value or more).
(3) In the training processing for the pseudo parallel translation data generation NMT model, the evaluation value in the second output data evaluation unit 6 fell below a predetermined value.
(4) In the training processing for the pseudo parallel translation data generation NMT model, the evaluation value in the second output data evaluation unit 6 was not updated a predetermined number of times.

If the termination condition is satisfied, the pseudo parallel translation data generation apparatus 100 determines that the training processing for the pseudo parallel translation data generation NMT model is completed, and terminates the processing.

As described above, the pseudo parallel translation data generation apparatus 100 sets the parameters at the time of completion of the pre-training process for the pseudo parallel translation data generation NMT model (a model provided by using the input data embedding unit 2 (corresponding to the embedding layer) and the MT neural network model 51 of the machine translation processing unit 5) as parameters in the initial state (a state in which initial parameters are set (a state in which the parameters of input data embedding unit 2 (corresponding to embedding layer) have been optimized by XLM training processing)), and then performs training processing (parameter optimization processing) for the pseudo parallel translation data generation NMT model by the above processing.

1.2.2: Pseudo Parallel Translation Data Generation Processing

Next, the pseudo parallel translation data generation processing (step S2 in FIG. 4) will be described.

Using the pseudo parallel translation data generation NMT model (a model provided by using the input data embedding unit 2 (corresponding to the embedding layer) and the MT neural network model 51 of the machine translation processing unit 5) obtained by the above pre-training processing), the pseudo parallel translation data generation apparatus 100 automatically generates pseudo parallel translation data in the adaptation target domains.

Specifically, the pseudo parallel translation data generation apparatus 100 performs pseudo parallel translation data generation processing using the following methods (1) and (2).
(1) a method of modifying parallel translation data (L1-L2) of other domains for the adaptation target domain (first method)
(2) a method of machine-translating monolingual data (R1 or R2) of the adaptation target domain (second method)

Pseudo parallel translation data generation processing by the above two methods will be described below.

1.2.2.1: Pseudo Parallel Translation Data Generation Processing (First Method) (Using Other-Domains Parallel Translation Data))

First, the first method (a method using other-domains parallel translation data) will be described.

The data input interface IF1 reads out the parallel translation data D0(L1-L2) of other domains from the parallel translation data storage unit DBp(L1-L2), and transmits the read-out parallel translation data as data D1(L1-L2) to the input data obtaining unit 1.

The first input data obtaining processing unit 11 of the input data obtaining unit 1 generates, from the data D1 (other-domains parallel translation data D1(L1-L2)), (1) token data $xi0_{token}$ ($=xi0_{token}(L1)$), (2) position data $xi_{pos}$ ($=xi_{pos}(L1)$) for specifying the position of the token, and (3) language data $xi_{lang}$ ($=xi_{lang}(L1)$) for specifying the language of the token.

The input data obtaining unit 1 then transmits the token data $xi0_{token}(L1)$ obtained as described above to the masking processing unit 12.

The control unit (not shown) generates a control signal CTL2 that instructs the masking processing unit 12 of the input data obtaining unit 1 not to perform masking processing, and transmits the control signal CTL2 to the masking processing unit 12.

The masking processing unit 12 transmits the token data $xi0_{token}(L1)$ received from the first input data obtaining processing unit 11 to the first selector SEL1 as the token data $xi_{token}(L1)$ in accordance with the control signal CTL2.

Also, the first input data obtaining processing unit 11 transmits the position data $xi_{pos}$ ($=xi_{pos}(L1)$) to the first selector SEL1, and transmits the language data $xi_{lang}$ ($=xi_{lang}(L1)$) to the first selector SEL1.

In other words, the input data obtaining unit 1 transmits the data obtained as described above to the first selector SEL1 as data D2a ($=D2a(L1)=\{xi_{token}(L1), xi_{pos}(L1), xi_{lang}(L1)\}$).

The control unit generates a selection signal sel1 that selects the terminal "0" of the first selector SEL1, and transmits the selection signal sel1 to the first selector SEL1.

The first selector SEL1 selects the terminal "0" in accordance with the selection signal sel1, and transmits the data D2a(L1) transmitted from the input data obtaining unit 1 to the input data embedding unit 2 as data D3(L1).

The input data embedding unit 2 obtains embedding representation data D4(L1) ($=\{xi'_{token}(L1), xi'_{pos}(L1), xi'_{lang}(L1)\}$) from (1) the token data $xi_{token}(L1)$, (2) the position data $xi_{pos}(L1)$, and (3) the language data $xi_{lang}(L1)$ included in the data D3(L1), and then transmits the obtained embedding representation data D4(L1) to the machine translation processing unit 5.

The MT neural network model 51 of the machine translation processing unit 5 receives the data D4(L1) transmitted from the input data embedding unit 2 (the embedding representation data D4(L1) ($=\{xi'_{token}(L1), xi'_{pos}(L1), xi'_{lang}(L1)\}$)) and the control signal CTL3 transmitted from the control unit.

The control unit generates a control signal CTL3 that instructs the MT neural network model 51 to output the data of R2, and transmits the control signal CTL3 to the machine translation processing unit 5.

The MT neural network model 51 performs machine translation processing on data D4(L1) transmitted from input data embedding unit 2 to obtain data D5(R2) and hold the data D5(R2). Note that the MT neural network model 51 sets the type of output data to R2 (adaptation target domain, second language) in accordance with the control signal CTL3.

Further, the first input data obtaining processing unit 11 of the input data obtaining unit 1 extracts L2 data as data D1(L2) from the data D1 (other-domains parallel translation data D1(L1-L2)), and obtains, from the data D1(L2), (1) token data $xi0_{token}$ ($=xi0_{token}(L2)$), (2) position data $xi_{pos}$ ($=xi_{pos}(L2)$) for specifying the position of the token, and (3) language data $xi_{lang}$ ($=xi_{lang}(L2)$) for specifying the language of the token.

The input data obtaining unit 1 then transmits the token data $xi0_{token}(L2)$ obtained as described above to the masking processing unit 12.

The control unit (not shown) generates a control signal CTL2 that instructs the masking processing unit 12 of the input data obtaining unit 1 not to perform masking processing, and transmits the control signal CTL2 to the masking processing unit 12.

The masking processing unit 12 transmits the token data $xi0_{token}(L2)$ received from the first input data obtaining processing unit 11 to the first selector SEL1 as the token data $xi_{token}(L2)$ in accordance with the control signal CTL2.

The first input data obtaining processing unit 11 also transmits the position data $xi_{pos}$ ($=xi_{pos}(L2)$) to the first selector SEL1, and transmits the language data $xi_{lang}$ ($=xi_{lang}(L2)$) to the first selector SEL1.

In other words, the input data obtaining unit 1 transmits the data obtained as described above to the first selector SEL1 as data D2a ($=D2a(L2)=\{xi_{token}(L2), xi_{pos}(L2), xi_{lang}(L2)\}$).

The control unit generates a selection signal sel1 that selects the terminal "0" of the first selector SEL1, and transmits the selection signal sel1 to the first selector SEL1.

The first selector SEL1 selects the terminal "0" in accordance with the selection signal sel1, and transmits the data D2a(L2) transmitted from the input data obtaining unit 1 to the input data embedding unit 2 as data D3(L2).

The input data embedding unit 2 obtains embedding representation data D4(L2) ($=\{xi'_{token}(L2), xi'_{pos}(L2), xi'_{lang}(L2)\}$) from (1) the token data $xi_{token}(L2)$, (2) the position data $xi_{pos}(L2)$, and (3) the language data $xi_{lang}(L2)$ included in data D3(L2), and then transmits the obtained embedding representation data D4(L2) to the machine translation processing unit 5.

The MT neural network model 51 of the machine translation processing unit 5 receives the data D4(L2) transmitted from the input data embedding unit 2 (the embedding representation data D4(L2) ($=\{xi'_{token}(L2), xi'_{pos}(L2), xi'_{lang}(L2)\}$)) and the control signal CTL3 transmitted from the control unit.

The control unit generates a control signal CTL3 that instructs the MT neural network model 51 to output the data of R1, and transmits the control signal CTL3 to the machine translation processing unit 5.

The MT neural network model 51 performs machine translation processing on the data D4(L2) transmitted from the input data embedding unit 2 to obtain data D5(R1). Note that the MT neural network model 51 sets the type of output data to R1 (adaptation target domain, first language) in accordance with the control signal CTL3.

The machine translation processing unit 5 pairs the data D5(R2) and the data D5(R1) obtained by the above processing, and transmits it as the data D5(R2-R1) to the second selector SEL2.

The control unit generates a selection signal sel2 that selects the terminal "0" of the second selector SEL2, and transmits the selection signal sel2 to the second selector SEL2.

The second selector SEL2 selects the terminal "0" in accordance with the selection signal sel2, and transmits the data D5 (data D5(R2-R1)) transmitted from the machine translation processing unit 5 as data D6a(R2-R1) to the filter processing unit 8 (see FIG. 12).

The control unit generates a control signal CTL4 that instructs the filter processing unit 8 to perform filter processing on the R2-R1 pseudo parallel translation data, and transmits the control signal to the filter processing unit 8.

The filter processing unit 8 performs filter processing on the received data D6a(R2-R1) (pseudo parallel translation data of R2 and R1) in accordance with control signal CTL4.

Here, the pseudo parallel translation data (D6a(R2-R1)) of the adaptation target domain obtained by the above processing is data obtained by using a neural network model trained to output the parallel translation data of the adaptation target domain for which no teacher data (supervised data) exists; and thus, the quality of the pseudo parallel translation data (D6a(R2-R1)) of the adaptation target domain obtained by the above processing may be low.

Thus, the filter processing unit 8 performs filter processing on the pseudo parallel translation data (D6a(R2-R1)) of the adaptation target domain obtained by the above processing. For example, the filter processing unit 8 assigns confidence to each sentence pair of the pseudo parallel translation data (D6a(R2-R1)) of the adaptation target domain obtained by the above processing, and then performs filtering based on the assigned confidence.

For example, it is conceivable to refer to the original L1-L2 parallel translation data (the parallel translation data D0(L1-L2) obtained from the parallel translation data storage unit DBp(L1-L2)). More specifically, the filter processing unit 8 calculates the confidence for a sentence pair b1-b2 of pseudo parallel translation data of adaptation target domain R1-R2, which is obtained by machine-translating a sentence pair a1-a2 in the parallel translation data L1-L2 (D0(L1-L2)), based on the similarity between a1 and b1 and the similarity between a2 and b2, and then determines whether the confidence is higher than a predetermined threshold. It is assumed that the filter processing unit 8 can obtain the sentence pair a1-a2 in the parallel translation data L1-L2 (D0(L1-L2)) from the parallel translation data storage unit DBp(L1-L2) (for example, it can be obtained via the data input interface IF1).

The filter processing unit 8 then obtains only the pseudo parallel translation data (R1-R2) whose confidence calculated as described above is higher than the predetermined threshold value Th by filtering. The pseudo parallel translation data obtained by the filtering is transmitted to the pseudo parallel translation data storage unit DB1 as pseudo parallel translation data Dpsd1(R1-R2, #1).

1.2.2.2: Pseudo Parallel Translation Data Generation Processing (Second Method) (Using Adaptation Target Domain Monolingual Data))

Next, the second method (method of using monolingual data for the adaptation target domain) will be described.

As shown in FIG. 13, the data input interface IF1 reads out the first-language monolingual data D0(R1) of the adaptation target domain from the third monolingual data storage unit DBm(R1), and transmits the read-out first language data to the input data obtaining unit 1 as data D1(R1).

The first input data obtaining processing unit 11 of the input data obtaining unit 1 obtains, from the first language data D1(R1) (data D1(R1) forming a sentence of the adaptation target domain in the first language), (1) token data $xi0_{token}$ ($=xi'_{token}(R1)$), (2) position data $xi_{pos}$ ($=xi_{pos}(R1)$) for specifying the position of the token, and (3) language data ($xi_{lang}(R1)$) for specifying the language of the token.

The input data obtaining unit 1 then transmits the token data $xi0_{token}(R1)$ obtained as described above to the masking processing unit 12.

The control unit (not shown) generates a control signal CTL2 that instructs the masking processing unit 12 of the input data obtaining unit 1 not to perform masking processing, and transmits the control signal CTL2 to the masking processing unit 12.

The masking processing unit 12 transmits the token data $xi0_{token}$ (R1) received from the first input data obtaining processing unit 11 to the first selector SEL1 as the token data $xi_{token}$ (R1) in accordance with the control signal CTL2.

Also, the first input data obtaining processing unit 11 transmits the position data $xi_{pos}$ ($=xi_{pos}(R1)$) to the first selector SEL1, and transmits the language data $xi_{lang}$ ($=xi_{lang}$ (R1)) to the first selector SEL1.

In other words, the input data obtaining unit 1 transmits the data obtained as described above to the first selector SEL1 as data D2a ($=D2a(R1)=\{xi_{token}(R1), xi_{pos}(R1), xi_{lang}(R1)\}$).

The control unit generates a selection signal sel1 that selects the terminal "0" of the first selector SEL1, and transmits the selection signal sel1 to the first selector SEL1.

The first selector SEL1 selects the terminal "0" in accordance with the selection signal sel1, and transmits the data D2a(R1) transmitted from the input data obtaining unit 1 to the input data embedding unit 2 as data D3(R1).

The input data embedding unit 2 obtains embedding representation data D4(R1) ($=\{xi'_{token}(R1), xi'_{pos}(R1), xi'_{lang}(R1)\}$) from (1) the token data $xi_{token}$, (2) the position data $xi_{pos}$, and (3) the language data $xi_{lang}$ included in the data D3(R1), and then transmits the obtained embedding representation data D4(R1) to the machine translation processing unit 5.

The MT neural network model 51 of the machine translation processing unit 5 receives the embedding representation data D4(R1) ($=\{xi'_{token}(R1), xi'_{pos}(R1), xi'_{lang}(R1)\}$) transmitted from the input data embedding unit 2 and the control signal CTL3 transmitted from the control unit.

The control unit generates a control signal CTL3 that instructs the MT neural network model 51 to output the data of R2, and transmits the control signal CTL3 to the machine translation processing unit 5.

The MT neural network model 51 performs machine translation processing on the data D4(R1) transmitted from the input data embedding unit 2 to obtain data D5(R2). Note that the MT neural network model 51 sets the type of output data to R2 (adaptation target domain, second language) in accordance with the control signal CTL3.

The MT neural network model 51 transmits the data D5 (R2) obtained above to the second selector SEL2.

The control unit generates a selection signal sel2 that selects the terminal "0" of the second selector SEL2, and transmits the selection signal sel2 to the second selector SEL2.

The second selector SEL2 selects the terminal "0" in accordance with the selection signal sel2, and transmits the data D5 (data D5(R2)) transmitted from the machine translation processing unit 5 as data D6a (R2) to the filter processing unit 8 (see FIG. 13).

The control unit generates a control signal CTL4 that instructs the filter processing unit 8 to perform filter processing on the R1-R2 pseudo parallel translation data, and transmits the control signal to the filter processing unit 8.

In addition, the input data obtaining unit 1 transmits the language data D0(R1) of the adaptation target domain obtained from the third monolingual data storage unit DBm (R1) (data used as an input for machine translation processing) as data D1_org(R1) to the filter processing unit 8.

The filter processing unit 8 then obtains associates (1) the received data D1_org(R1) (data used as an input for machine translation processing) with (2) the received data D6a(R2) (machine translation data of data D3(R1)) to obtain the pseudo parallel translation data (R1-R2) of the adaptation target domain. The filter processing unit 8 performs filter processing on the pseudo parallel translation data (R1-R2) in accordance with the control signal CTL4.

Here, the pseudo parallel translation data (R1-R2) of the adaptation target domain obtained by the above processing is data obtained by using a neural network model trained to output the monolingual data of the adaptation target domain for which no teacher data (supervised data) exists; and thus, the quality of the pseudo parallel translation data (R1-R2) of the adaptation target domain obtained by the above processing may be low.

Thus, the filter processing unit 8 performs filter processing on the pseudo parallel translation data (R1-R2) of the adaptation target domain obtained by the above processing. For example, using a technique for estimating quality of machine translation disclosed in Document D below, the filter processing unit 8 assigns confidence to the pseudo parallel translation data (R1-R2) in the adaptation target domain obtained by the above processing.
(Document D): Lucia Specia, Carolina Scarton, and Gustavo Henrique Paetzold (2018). Quality Estimation for Machine Translation. Morgan & Claypool.

The filter processing unit 8 then performs filter processing based on the assigned confidence. For example, the filter processing unit 8 obtains only the pseudo parallel translation data (R1-R2) whose confidence calculated as described above is greater than a predetermined threshold value Th by filtering. The filter processing unit 8 transmits the pseudo parallel translation data obtained by the filtering to the pseudo parallel translation data storage unit DB1 as pseudo parallel translation data Dpsd1(R1-R2, #2).

In the above description, the data D1_org is data in the first language of the adaptation target domain (R1 data (=D1_org(R1))), and the translation data obtained by performing machine translation processing on the data D3(R1) is the data D5(R2) (the data D6a(R2)) of the adaptation target domain in the second language (a case shown in FIG. 13); however, as shown in FIG. 14, the data D1_org is set to the data (R2 data (=D1_org(R2))) of the adaptation target domain in the second language, and the translation data obtained by performing machine translation processing on the data D3(R2) is set to the data D5(R1) (the data D6a(R2)) of the adaptation target domain in the second language, and then pseudo parallel translation data (data Dpsd1(R1-R2, #2)) may be generated by performing the same processing as above.

<<Summary of the Embodiment>>

As described above, using
(1) large-scale (the large number of parallel translation data) high-precision parallel translation data in other domains (parallel translation data stored in the parallel translation data storage unit DBp(L1-L2)),
(2) first language data of other domains (monolingual data stored in the first monolingual data storage unit DBm(L1)),
(3) second language data of other domains (monolingual language data stored in the second monolingual language data storage unit DBm(L2)),
(4) first language data of the adaptation target domain (monolingual language data stored in the third monolingual language data storage unit DBm(R1)), and
(5) second language data of the adaptation target domain (monolingual language data stored in the fourth monolingual language data storage unit DBm(R2)), the pseudo parallel translation data generation apparatus 100 optimizes the cross-lingual language model (XLM) (the model provided by using the input data embedding unit 2 (corresponding to the embedding layer) and the XLM neural network model 31) (initialization by pre-training processing).

The pseudo parallel translation data generation apparatus 100 sets the state of the pseudo parallel translation data generation NMT model including the input data embedding unit 2 (corresponding to the embedding layer) (parameters obtained by optimizing the XLM (e.g., the state of the input data embedding unit 2 in which the transformation matrices $W_{token}$, $W_{pos}$, and $W_{lang}$ are set) after optimizing (pre-training) the XLM model and the MT neural network model 51 of the machine translation processing unit before training to an initial state, and then performs parameter optimization processing for the pseudo parallel translation data generation NMT model. This allows the pseudo parallel translation data generation apparatus 100 to obtain a model (trained model) that generates pseudo parallel translation data (R1-R2) of the adaptation target domain first language and the adaptation target domain second language even when there exists no parallel translation data in the adaptation target domain (the target domain for machine translation).

1.2.3: Translation Model Training Processing

Next, the translation model training processing (step S3 in FIG. 5) will be described.

The machine translation apparatus MT1 includes an NMT model and performs machine translation using the NMT model. The machine translation apparatus MT1 is generated by the pseudo parallel translation data generation apparatus 100, and performs training processing for the machine translation model (NMT model) for performing machine translation for the adaptation target domain using the pseudo parallel translation data stored in the pseudo parallel translation data storage unit DB1.

Specifically, for example, the machine translation apparatus MT1 performs training processing for the machine translation model (NMT model) for performing machine translation for the adaptation target domain by any of the following methods (1) to (3).

(1) Fine-Tuning Method:

The machine translation apparatus MT1 obtains the parallel translation data D0'(L1-L2) of other domains from the parallel translation data storage unit DBp(L1-L2), and performs training processing for the NMT model of the machine translation apparatus MT1 using the parallel translation data D0'(L1-L2) of other domains. Subsequently, the machine translation apparatus MT1 reads out the pseudo parallel translation data (parallel translation data of R1-R2) of the adaptation target domain generated by the pseudo parallel translation data generation apparatus 100 from the pseudo parallel translation data storage unit DB1 as pseudo parallel translation data Dpsd2(R1-R2), performs training processing (fine-tuning of parameters) of the NMT model of the machine translation apparatus MT1 using the read-out pseudo parallel translation data Dpsd2(R1-R2) of the adaptation target domain.

(2) Data Mixing Method:

The machine translation apparatus MT1 obtains parallel translation data D0'(L1-L2) of other domains from the parallel translation data storage DBp(L1-L2), and obtains pseudo parallel translation data Dpsd2(R1-R2) of the adaptation target domain from the pseudo parallel translation data storage unit DB1. The machine translation apparatus MT1 then generates data by mixing the parallel translation data D0'(L1-L2) of other-domains (L1-L2) with the pseudo parallel translation data Dpsd2(R1-R2) of the adaptation target domain (R1-R2), and then trains the NMT model of the machine translation apparatus MT1 using the generated data. Note that in mixing the parallel translation data D0' (L1-L2) of other-domains (L1-L2) and the pseudo parallel translation data Dpsd2(R1-R2) of the adaptation target-domain (R1-R2), the two types of parallel translation data may be distinguished by tags. Also, before mixing the two types of parallel translation data, one or both of them may be oversampled or undersampled to change the mixing ratio of the two types of parallel translation data.

(3) Data Mixing Fine-Tuning Method:

The machine translation apparatus MT1 obtains the parallel translation data D0'(L1-L2) of other-domains from the parallel translation data storage unit DBp(L1-L2), and then performs training processing for the NMT model of the machine translation apparatus MT1 using the parallel translation data D0'(L1-L2). Subsequently, the machine translation apparatus MT1 generates data obtained by mixing parallel translation data D0'(L1-L2) that is the same as the parallel translation data used in the training processing for the NMT model of the machine translation apparatus MT1 with pseudo parallel translation data (R1-R2) of the adaptation target domain (pseudo parallel translation data Dpsd2 (R1-R2)) of the adaptation target domain read out from the parallel translation data storage unit DB1). The machine translation apparatus MT1 then performs training processing (fine-tuning of parameters) of the NMT model of the machine translation apparatus MT1 using the generated data (data obtained by mixing the two types of parallel translation data). Note that in mixing the parallel translation data D0'(L1-L2) of other-domains (L1-L2) and the pseudo parallel translation data Dpsd2(R1-R2) of the adaptation target domain (R1-R2), the two types of parallel translation data may be distinguished by tags. Also, before mixing the two types of parallel translation data, one or both of them may be oversampled or undersampled to change the mixing ratio of the two types of parallel translation data.

The machine translation apparatus MT1 performs training processing for the NMT model using one of the methods (1) to (3) above to obtain the optimum parameters of the NMT model. Using the NMT model (trained model) in which the optimum parameters has been set, machine translation of the adaptation target domain is performed. In other words, as shown in FIG. 1, when receiving source language data Din_e of the adaptation target domain, the machine translation apparatus MT1 performs machine translation processing on the data Din_e to obtain target language data Dout_j (machine-translated data).

FIG. 15 shows an example of data obtained by the machine translation apparatus MT1. The upper part of FIG. 15 is an original text (original language data), and the lower part of FIG. 15 is machine translation data obtained by the machine translation system 1000 of the present invention. Also, for comparison, the middle part of FIG. 15 shows the result data of the machine translation processing with the conventional technologies (the result data of the machine translation by the NMT model obtained without training with the parallel translation data of the adaptation target domain). Note that the output data in the lower part of FIG. 15 is data (machine translation resultant data) when Japanese-English parallel translation data (parallel translation data of other-domains) is used as the parallel translation data of other-domains, and the SNS (Social Networking Service) domain is set to the adaptation target domain.

As can be seen from FIG. 15, the machine translation data obtained by machine translation (conventional machine translation) without the adaptation target domain is not correctly translated; conversely, the machine translation data obtained by the machine translation system 1000 of the present invention is better than the conventional machine translation result.

<<Summary of the Embodiment>>

As described above, even when there exists no parallel translation data in the adaptation target domain (target domain), the pseudo parallel translation data generation apparatus 100 can generate the pseudo parallel translation data in the adaptation target domain, and can train the NMT model of the machine translation apparatus MT1 using the pseudo parallel translation data generated by the pseudo parallel translation data generation apparatus 100. Furthermore, the machine translation system 1000 performs machine translation processing using the NMT model trained with the pseudo parallel translation data generated by the pseudo parallel translation data generation apparatus 100, thereby allowing for machine translation in the adaptation target domain with high reliability even when there exists no parallel translation data in the adaptation target domain (target domain).

The machine translation system 1000 does not use normal parallel translation data of the adaptation target domain at all in all of the training for the XLM, the training for the pseudo parallel translation data generation machine translation model, and the training for the NMT model for the adaptation target domain in the machine translation apparatus MT1. In this respect, the machine translation system 1000 is greatly different from the conventional technologies. Note that the machine translation system 1000 may extract parts whose confidence is the highest from the pseudo parallel translation data, and use them as translation data for fine-tuning.

The machine translation system 1000 exhibits significant advantageous effect for a case in which there exists no parallel translation data in the adaptation target domain (target domain), but there exists a large-scale set of parallel translation data in other domain(s) and a large-scale set of monolingual data in the adaptation target domain.

OTHER EMBODIMENTS

Each block of the machine translation system 1000, pseudo parallel translation data generation apparatus 100, and the machine translation apparatus MT1 described in the above embodiment may be formed using a single chip with a semiconductor device, such as LSI, or some or all of the blocks of the machine translation system 1000, pseudo parallel translation data generation apparatus 100, and the machine translation apparatus MT1 may be formed using a single chip.

Note that although the term LSI is used here, it may also be called IC, system LSI, super LSI, or ultra LSI depending on the degree of integration.

The circuit integration technology employed should not be limited to LSI, but the circuit integration may be achieved using a dedicated circuit or a general-purpose processor. A field programmable gate array (FPGA), which is an LSI circuit programmable after manufactured, or a reconfigurable processor that can reconfigure connections and settings of circuit cells inside the LSI may be used.

All or part of the processes performed by the functional blocks described in the above embodiment may be implemented using programs. All or part of the processes performed by the functional blocks described in the above embodiment is implemented by a central processing unit (CPU) included in a computer. The programs for these processes may be stored in a storage device, such as a hard disk or a ROM, and may be executed from the ROM or be read into a RAM and then executed.

The processes described in the above embodiment may be implemented by using either hardware or software (including use of an operating system (OS), middleware, or a predetermined library), or may be implemented using both software and hardware.

Figure 16:
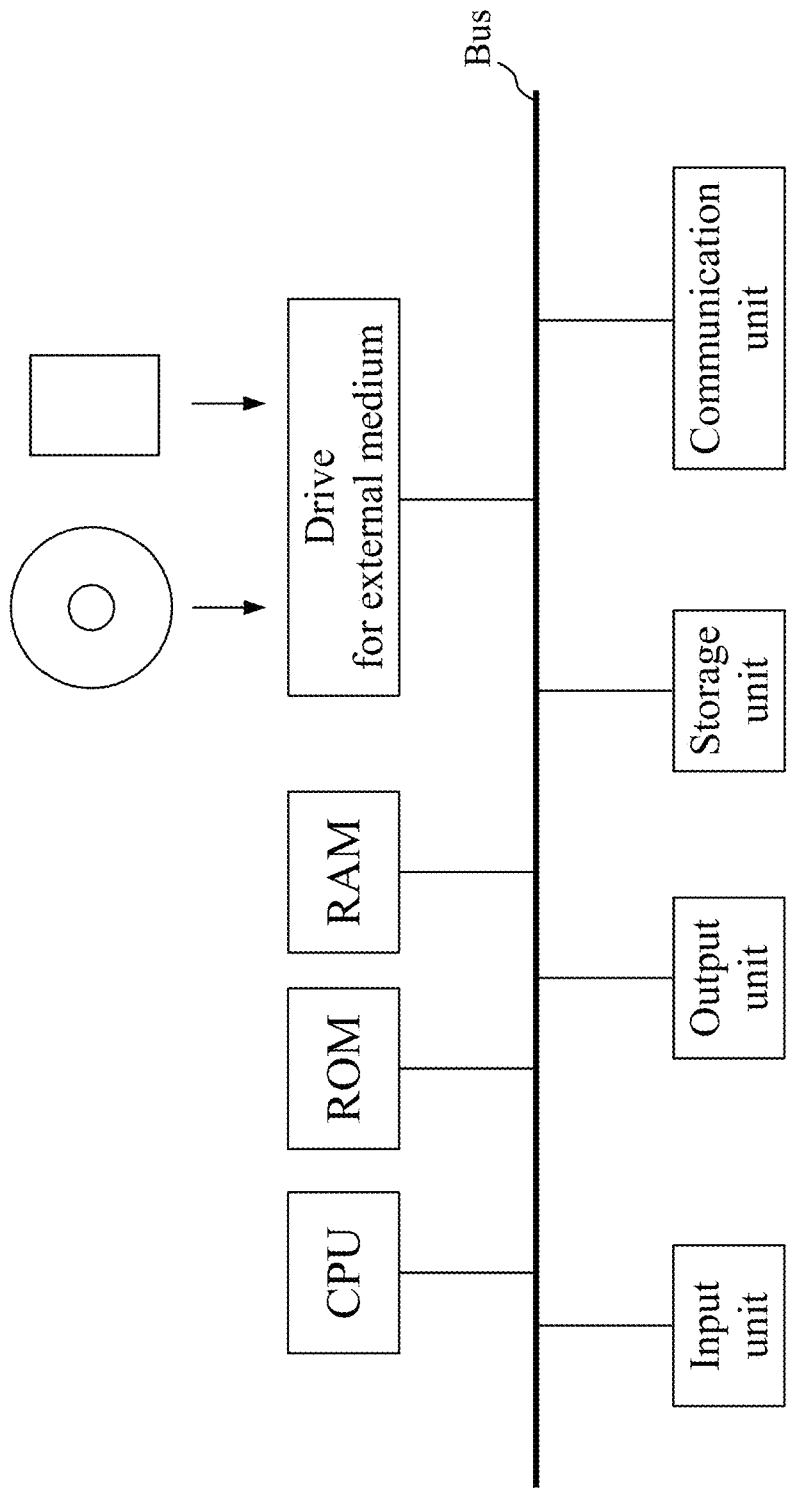
FIG. 16 is a diagram showing a CPU bus configuration.

For example, when each functional unit of the above embodiment is achieved by using software, the hardware structure (the hardware structure including CPU(s) (or it may be GPU(s)), ROM, RAM, an input unit, an output unit, a communication unit, a storage unit (e.g., a storage unit achieved by using HDD, SSD, or the like), a drive for external media or the like, each of which is connected to a bus) shown in FIG. 16 may be employed to achieve the functional units by using software.

When each functional unit of the above embodiment is achieved by using software, the software may be achieved by using a single computer having the hardware configuration shown in FIG. 16, and may be achieved by using distributed processes using a plurality of computers.

The processes described in the above embodiment may not be performed in the order specified in the above embodiment. The order in which the processes are performed may be changed without departing from the scope and the spirit of the invention.

The present invention may also include a computer program enabling a computer to implement the method described in the above embodiment and a computer readable recording medium on which such a program is recorded. Examples of the computer readable recording medium include a flexible disk, a hard disk, a CD-ROM, an MO, a DVD, a DVD-ROM, a DVD-RAM, a large capacity DVD, a next-generation DVD, and a semiconductor memory.

The computer program should not be limited to one recorded on the recording medium, but may be transmitted via an electric communication line, a wireless or wired communication line, a network represented by the Internet, or the like.

In addition, in the description in this specification and the description in the scope of claims, "optimization" refers to making the best state, and the parameters for "optimizing" a system (a model) refers to parameters when the value of the objective function for the system is the optimum value. The "optimal value" is the maximum value when the system is in a better state as the value of the objective function for the system increases, whereas it is the minimum value when the system is in a better state as the objective function value for the system decreases. Also, the "optimal value" may be an extremum value. In addition, the "optimal value" may allow a predetermined error (measurement error, quantization error, or the like) and may be a value within a predetermined range (a range for which sufficient convergence for the value can be considered to be achieved).

The specific structures described in the above embodiment are mere examples of the present invention, and may be changed and modified variously without departing from the scope and the spirit of the invention.

REFERENCE SIGNS LIST 1000 machine translation system
100 pseudo parallel translation data generation apparatus
1 input data obtaining unit
11 first input data obtaining processing unit
12 masking processing unit
2 input data embedding unit
21 token embedding unit
22 position embedding unit
23 language embedding unit
3 XLM processing unit
31 XLM neural network model
5 machine translation processing unit
51 MT neural network model
8 filter processing unit
MT1 machine translation apparatus
DBp(L1-L2) parallel translation data storage unit
DBm(L1) first monolingual data storage unit (for monolingual data of other-domains (first language))
DBm(L2) second monolingual data storage unit (for monolingual data of other-domains (second language))
DBm(R1) third monolingual data storage unit (for monolingual data of the adaptation target domain (first language))
DBm(R2) fourth monolingual data storage unit (for monolingual data of the adaptation target domain (second language))
DB1 pseudo parallel translation data storage unit

What is claimed is:

1. A training and inferring method for a machine translation model, which is configured to perform training processing by setting parameters and includes an input data embedding portion and a machine translation processing portion, for generating pseudo parallel translation data, which is performed with a processor and a memory that the processor can access, the method comprising:
(i) an initialization step of, using the processor, obtaining optimal parameters for a cross-lingual language model (XLM), which is configured to perform training processing and includes the input data embedding portion and an XLM processing portion, and setting optimal parameters that have been set in the input data embedding portion of the XLM model in which the optimal parameters have been set to initial parameters for parameters of the input data embedding portion, using:
an other-domains parallel translation data set Dsetp (L1-L2) containing a plurality of pieces of parallel translation data comprising other-domains first language data, which is data for a domain other than an adaptation target domain that is a domain for which pseudo parallel translation data is to be generated, and other-domains second language data, which is translated data in a second language of the other-domains first language data,
an other-domains monolingual data set Dsetm (L1) containing a plurality of pieces of first language data for a domain other than the adaptation target domain,
an other-domains monolingual data set Dsetm (L2) containing a plurality of pieces of second language data for a domain other than the adaptation target domain,
an adaptation target domain monolingual data set Dsetm (R1) containing a plurality of pieces of data of the first language of the adaptation target domain, and
an adaptation target domain monolingual data set Dsetm (R2) containing a plurality of pieces of data of the second language of the adaptation target domain, and wherein obtaining optimal parameters for the XML model includes performing:
- (A) training processing with masking processing that sets masked data obtaining by masking a part of sequences of monolingual input data included in the other-domains monolingual data set Dsetm (L1), the other-domains monolingual data set Dsetm (L2), the adaptation target domain monolingual data set Dsetm (R1), and the adaptation target domain monolingual data set Dsetm (R2) as input data for the XLM model, sets the monolingual input data as correct data, and then performs training processing so that a loss between the correct data and data outputted from the XLM model is reduced; and
- (B) training processing with supervised data that sets one of the first language data for the domain other than the adaptation target domain and the second language data for the domain other than the adaptation target domain of parallel translation data contained in the other-domains parallel translation data set Dsetp (L1-L2) as input data for the XLM model, sets the other of the first language data for the domain other than the adaptation target domain and the second language data for the domain other than the adaptation target domain of the parallel translation data as correct data, and then performs training processing so that loss between the correct data and data outputted from the XLM model is reduced;

(ii) an optimization step of, using the processor, obtaining optimum parameters for the machine translation model, which includes the input data embedding portion and the machine translation processing portion, for generating pseudo parallel translation data by performing training processing using at least one of:
- (1) auto-encoding processing that sets correct data to the same data as input data and then performs training processing for the machine translation model for generating pseudo parallel translation data with the initial parameters set,
- (2) zero-shot round-trip machine translation processing that inputs again output data from the machine translation model for generating pseudo parallel translation data for the input data into the machine translation model for generating pseudo parallel translation data, and then performs training processing for the machine translation model for generating pseudo parallel translation data so that the output from the machine translation model for generating pseudo parallel translation data becomes the same data as the input data, for the machine translation model for generating pseudo parallel translation data with the initial parameters set, and
- (3) supervised machine translation processing that sets one of first language data and second language data included in an other-domains translation data set Dsetp (L1-L2) to an input into the machine translation model for generating pseudo parallel translation data and sets the other to correct data, and then performs training processing for the machine translation model for generating pseudo parallel translation data with the initial parameters set;

(iii) a first machine translation step of, using the processor, setting the machine translation model, which has been set with the optimum parameters, by the control signal so that the machine translation model outputs the adaptation target domain second language data, and then performing machine translation processing on first language data obtained from the other-domains parallel translation data set Dsetp (L1-L2) using the machine translation model for generating pseudo parallel translation data to obtain pseudo parallel translation data for the adaptation target domain second language, which is a machine translation processing resultant data for the other-domains first language data; and (iv) a second machine translation step of, using the processor, setting the machine translation model, which has been set with the optimum parameters, by the control signal so that the machine translation model outputs the adaptation target domain first language data, and then performing machine translation processing on second language data obtained from the other-domains parallel translation data set Dsetp (L1-L2) using the machine translation model for generating pseudo parallel translation data to obtain pseudo parallel translation data for the adaptation target domain in the first language, which is machine translation processing resultant data for the other-domains second language data;

wherein the machine translation model is configured to output data of a specified type in accordance with a control signal and is set so that one of (1) the other-domains first language data, (2) the other-domains second language data, (3) adaptation target domain first language data which is the first language data of the adaptation target domain, and (4) adaptation target domain second language data which is the second language data of the adaptation target domain, as specified by the control signal, is outputted.

2. A pseudo parallel translation data obtaining method for obtaining pseudo parallel translation data for an adaptation target domain using the machine translation model for generating pseudo parallel translation data obtained by training processing for the machine translation model for generating pseudo parallel translation data according to claim 1, the pseudo parallel translation data obtaining method, which is performed by the processor and the memory that the processor can access, comprising:

the first machine translation step of, using the processor, performing machine translation processing on first language data obtained from the other-domains parallel translation data set Dsetp (L1-L2) using the machine translation model for generating pseudo parallel translation data with a type of an output set to the adaptation target domain second language to obtain pseudo parallel translation data for the adaptation target domain second language, which is a machine translation processing resultant data for the other-domains first language data;

the second machine translation step of, using the processor, performing machine translation processing on second language data obtained from the other-domains parallel translation data set Dsetp (L1-L2) using the machine translation model for generating pseudo parallel translation data with a type of an output set to the adaptation target domain first language to obtain pseudo parallel translation data for the adaptation target domain in the first language, which is machine translation processing resultant data for the other-domains second language data; and a pseudo parallel translation data obtaining step of, using the processor, pairing second language pseudo translated data of the adaptation target domain obtained in the first machine translation step with first language pseudo translated data of the adaptation target domain obtained in the second machine translation step to obtain pseudo parallel translation data of the adaptation target domain.

3. A pseudo parallel translation data obtaining method for obtaining pseudo parallel translation data for an adaptation target domain using the machine translation model for generating pseudo parallel translation data obtained by training processing for the machine translation model for generating pseudo parallel translation data according to claim 1, the pseudo parallel translation data obtaining method, which is performed with the processor and the memory that the processor can access, comprising:

a monolingual language data machine translation step of, using the processor, setting the machine translation model by the control signal so that the machine translation model outputs the adaptation target domain first language data or the adaptation target domain second language data, and then performing machine translation processing on first language data obtained from the adaptation target domain monolingual language data set Dsetm (R1) or second language data obtained from the adaptation target domain monolingual language data set Dsetm (R2) using the machine translation model for generating pseudo parallel translation data to obtain pseudo parallel translation data for the adaptation target domain second language, which is a machine translation processing resultant data for the adaptation target domain first language data or pseudo parallel translation data for the adaptation target domain first language data, which is a machine translation processing resultant data for the adaptation target domain second language data; and a pseudo parallel translation data obtaining step of, using the processor, pairing first language data of the adaptation target domain that has been set to the input into the machine translation model for generating pseudo parallel translation data with the adaptation target domain second language pseudo translated data obtained in the monolingual language data machine translation step, or pairing second language data of the adaptation target domain that has been set to the input into the machine translation model for generating pseudo parallel translation data with the adaptation target domain first language pseudo translated data obtained in the monolingual language data machine translation step, thereby obtaining pseudo parallel translation data of the adaptation target domain.

4. The pseudo parallel translation data obtaining method according to claim 2, further comprising:

a filter processing step of, using the processor, obtaining a confidence degree indicating reliability of a result of machine translation processing for each sentence pair of the adaptation target domain pseudo parallel translation data obtained in the pseudo parallel translation data obtaining step, selecting only pseudo parallel translation data including sentence pairs whose confidence degrees are greater than or equal to a predetermined value, and outputting the selected data.

5. A method for training a machine translation model, which is configured to perform training processing by setting parameters, and obtaining data in a second language by performing machine translation on data in a first language for an adaptation target domain, which is performed with a processor and a memory that the processor can access, the method comprising:

a machine translation model training step of, using the processor, training the machine translation model using:

pseudo translation data of the adaptation target domain obtained by the pseudo parallel translation data obtaining method according to claim 2, and an other-domains parallel translation data set Dsetp (L1-L2) containing a plurality of pieces of translation data including other-domains first language data that is data in the first language for a domain other than the adaptation target domain, and other-domains second language data that is translated data in the second language for the other-domains first language data, thereby obtaining optimal parameters for the machine translation model, and setting the optimal parameters to the machine translation model to obtain a trained machine translation model, wherein training the machine translation model includes performing:

(A) processing that sets the other-domains first language data of the parallel translation data contained in the other-domains parallel translation data set Dsetp (L1-L2) as input data for the machine translation model, sets the other-domains second language data of the parallel translation data contained in the other-domains parallel translation data set Dsetp (L1-L2) as correct data, and then performs training processing so that loss between the correct data and data outputted from the machine translation model is reduced; and (B) processing that sets the adaptation target domain first language data contained in the pseudo translation data as input data for the machine translation model, sets the adaptation target domain second data language data contained in the pseudo translation data as correct data, and then performs training processing so that loss between the correct data and data outputted from the machine translation model is reduced.

6. A machine translation apparatus that performs machine translation processing using a trained machine translation model obtained by a training and inferring method for the machine translation model for generating pseudo parallel translation data, which is performed with a processor and a memory that the processor can access, the training and inferring method comprising:

(i) an initialization step of, using the processor, obtaining optimal parameters for a cross-lingual language model (XLM), which is configured to perform train processing and includes the input data embedding portion and an XLM processing portion, and setting optimal parameters that have been set in the input data embedding portion of the XLM model in which the optimal parameters have been set to initial parameters for parameters of the input data embedding portion, using:

an other-domains parallel translation data set Dsetp (L1-L2) containing a plurality of pieces of parallel translation data including other-domains first language data, which is data for a domain other than an adaptation target domain that is a domain for which pseudo parallel translation data is to be generated, and other-domains second language data, which is translated data in a second language of the other-domains first language data, an other-domains monolingual data set Dsetm (L1) containing a plurality of pieces of first language data for a domain other than the adaptation target domain, an other-domains monolingual data set Dsetm (L2) containing a plurality of pieces of second language data for a domain other than the adaptation target domain, an adaptation target domain monolingual data set Dsetm (R1) containing a plurality of pieces of data of the first language of the adaptation target domain, and an adaptation target domain monolingual data set Dsetm (R2) containing a plurality of pieces of data of the second language of the adaptation target domain, wherein obtaining optimal parameters for the XML model includes performing:

(A) training processing with masking processing that sets masked data obtaining by masking a part of sequences of monolingual input data included in the other-domains monolingual data set Dsetm (L1), the other-domains monolingual data set Dsetm (L2), the adaptation target domain monolingual data set Dsetm (R1), and the adaptation target domain monolingual data set Dsetm (R2) as input data for the XLM model, sets the monolingual input data as correct data, and then performs training processing so that loss between the correct data and data outputted from the XLM model is reduced; and B) training processing with supervised data that sets one of the first language data for the domain other than the adaptation target domain and the second language data for the domain other than the adaptation target domain of parallel translation data contained in the other-domains parallel translation data set Dsetp (L1-L2) as input data for the XLM model, sets the other of the first language data for the domain other than the adaptation target domain and the second language data for the domain other than the adaptation target domain of the parallel translation data as correct data, and then performs training processing so that loss between the correct data and data outputted from the XLM model is reduced;

(ii) an optimization step of, using the processor, obtaining optimum parameters for the machine translation model which includes the input data embedding portion and the machine translation processing portion, for generating pseudo parallel translation data by performing training processing using at least one of:

(1) auto-encoding processing that sets correct data to the same data as input data and then performs training processing for the machine translation model for generating pseudo parallel translation data with the initial parameters set, (2) zero-shot round-trip machine translation processing that inputs again output data from the machine translation model for generating pseudo parallel translation data for the input data into the machine translation model for generating pseudo parallel translation data, and then performs training processing for the machine translation model for generating pseudo parallel translation data so that the output from the machine translation model for generating pseudo parallel translation data becomes the same data as the input data, for the machine translation model for generating pseudo parallel translation data with the initial parameters set, and (3) supervised machine translation processing that sets one of first language data and second language data included in an other-domains translation data set Dsetp (L1-L2) to an input into the machine translation model for generating pseudo parallel translation data and sets the other to correct data, and then performs training processing for the machine translation model for generating pseudo parallel translation data with the initial parameters set;

(iii) a first machine translation step of, using the processor, setting the machine translation model, which has been set with the optimum parameters, by the control signal so that the machine translation model outputs the adaptation target domain second language data, and then performing machine translation processing on first language data obtained from the other-domains parallel translation data set Dsetp (L1-L2) using the machine translation model for generating pseudo parallel translation data to obtain pseudo parallel translation data for the adaptation target domain second language, which is a machine translation processing resultant data for the other-domains first language data; and (iv) a second machine translation step of, using the processor, setting the machine translation model, which has been set with the optimum parameters, by the control signal so that the machine translation model outputs the adaptation target domain first language data, and then performing machine translation processing on second language data obtained from the other-domains parallel translation data set Dsetp (L1-L2) using the machine translation model for generating pseudo parallel translation data to obtain pseudo parallel translation data for the adaptation target domain in the first language, which is machine translation processing resultant data for the other-domains second language data;

wherein the machine translation model is configured to output data of a specified type in accordance with a control signal and is set so that one of (1) the other-domains first language data, (2) the other-domains second language data, (3) adaptation target domain first language data which is the first language data of the adaptation target domain, and (4) adaptation target domain second language data which is the second language data of the adaptation target domain, as specified by the control signal, is outputted.

7. A machine translation apparatus that performs machine translation processing using a trained machine translation model obtained by the method for training a machine translation model according to claim 5.

* * * * *